US010257845B2

(12) United States Patent
Tsuda et al.

(10) Patent No.: US 10,257,845 B2
(45) Date of Patent: Apr. 9, 2019

(54) RADIO COMMUNICATION APPARATUS, INFORMATION PROCESSING APPARATUS, COMMUNICATION SYSTEM, AND METHOD OF CONTROLLING A RADIO COMMUNICATION APPARATUS ACCORDING TO INFORMATION CONTROLLING A CONDITION IN WHICH AN ACCESS REQUEST IS TO BE EXECUTED

(71) Applicant: Sony Corporation, Tokyo (JP)

(72) Inventors: Shinichiro Tsuda, Kanagawa (JP); Kazuhisa Takamura, Chiba (JP); Takashi Usui, Tokyo (JP); Shinichiro Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/612,310

(22) Filed: Jun. 2, 2017

(65) Prior Publication Data
US 2017/0273093 A1 Sep. 21, 2017

Related U.S. Application Data

(63) Continuation of application No. 14/929,576, filed on Nov. 2, 2015, now Pat. No. 9,699,799, which is a (Continued)

(30) Foreign Application Priority Data

May 26, 2011 (JP) .................................. 2011-117582
Jan. 10, 2012 (JP) .................................. 2012-001776

(51) Int. Cl.
*H04L 29/06* (2006.01)
*H04W 72/10* (2009.01)
(Continued)

(52) U.S. Cl.
CPC ........... *H04W 72/10* (2013.01); *H04L 67/325* (2013.01); *H04W 8/18* (2013.01); *H04W 28/24* (2013.01)

(58) Field of Classification Search
CPC ......... H04L 67/42; H04L 67/06; H04L 65/60; H04L 65/80; H04W 84/12; H04W 88/02;
(Continued)

(56) References Cited

U.S. PATENT DOCUMENTS 6,529,946 B2  3/2003 Yokono et al.
6,538,761 B1  3/2003 Yokono et al.
(Continued)

FOREIGN PATENT DOCUMENTS

JP   09-215056 A    8/1997
JP   2002-112347 A  4/2002
(Continued)

*Primary Examiner* — Ronald Eisner
(74) *Attorney, Agent, or Firm* — Wolf, Greenfield & Sacks, P.C.

(57) ABSTRACT

A radio communication apparatus includes a receiving unit configured to receive information controlling a timing at which an access request for accessing an access destination over a network is to be executed. The radio communication apparatus also includes a control unit configured to control execution of the access request with a timing controlled based at least in part on the information. An associated method, medium and an information processing apparatus are also described.

20 Claims, 54 Drawing Sheets

Related U.S. Application Data continuation of application No. 13/472,710, filed on May 16, 2012, now Pat. No. 9,185,605.

(51) Int. Cl.
*H04W 28/24* (2009.01)
*H04L 29/08* (2006.01)
*H04W 8/18* (2009.01)

(58) Field of Classification Search
CPC ............... H04W 4/02; H04W 28/0247; H04W 28/0289
USPC .... 455/414.1–414.3, 418–420, 422.1, 456.3; 705/14.64; 725/62
See application file for complete search history.

(56) References Cited

U.S. PATENT DOCUMENTS

| | | | |
|---|---|---|---|
| 7,486,635 B2 | 2/2009 | Okanoue et al. | |
| 7,499,982 B2 | 3/2009 | Yoshimine et al. | |
| 7,921,181 B2 | 4/2011 | Kawasaki | |
| 8,175,571 B2 | 5/2012 | Kamatani et al. | |
| 8,682,722 B1 | 3/2014 | Des Jardins et al. | |
| 8,707,353 B2 | 4/2014 | Nakagawa | |
| 9,185,605 B2 | 11/2015 | Tsuda et al. | |
| 9,699,799 B2 | 7/2017 | Tsuda et al. | |
| 2002/0073140 A1 | 6/2002 | Chae | |
| 2002/0091652 A1 | 7/2002 | Nagahara | |
| 2002/0141405 A1 | 10/2002 | Bouet | |
| 2003/0061009 A1* | 3/2003 | Davis | H04W 16/18 702/189 |
| 2003/0186706 A1* | 10/2003 | Bergins | H04L 1/1887 455/452.2 |
| 2004/0085909 A1 | 5/2004 | Soliman | |
| 2004/0242224 A1* | 12/2004 | Janik | G06F 1/263 455/426.1 |
| 2005/0148319 A1* | 7/2005 | Himeno | H04L 12/1485 455/406 |
| 2006/0080464 A1 | 4/2006 | Kozuki | |
| 2006/0205434 A1 | 9/2006 | Tom et al. | |
| 2006/0246878 A1* | 11/2006 | Khoury | H04M 1/72569 455/412.2 |
| 2007/0266107 A1 | 11/2007 | Friend et al. | |
| 2008/0134043 A1 | 6/2008 | Georgis et al. | |
| 2008/0178224 A1 | 7/2008 | Laude et al. | |
| 2008/0214103 A1 | 9/2008 | Nelson et al. | |
| 2008/0256217 A1* | 10/2008 | Park | G06F 15/16 709/218 |
| 2009/0019240 A1 | 1/2009 | Kawasaki | |
| 2009/0247216 A1 | 10/2009 | Kamatani et al. | |
| 2010/0061346 A1* | 3/2010 | Wang | H04L 1/0021 370/336 |
| 2010/0077094 A1* | 3/2010 | Howarter | G06F 17/30017 709/231 |
| 2010/0260474 A1 | 10/2010 | Sakurai | |
| 2011/0029611 A1 | 2/2011 | Hutchison et al. | |
| 2011/0107137 A1 | 5/2011 | Lam et al. | |
| 2011/0154208 A1 | 6/2011 | Horii | |
| 2012/0169608 A1* | 7/2012 | Forutanpour | G09G 3/342 345/173 |
| 2012/0302218 A1 | 11/2012 | Tsuda et al. | |
| 2013/0288704 A1* | 10/2013 | Wirola | H04W 64/00 455/456.1 |
| 2014/0164077 A1 | 6/2014 | Nakagawa | |
| 2016/0057763 A1 | 2/2016 | Tsuda et al. | |

FOREIGN PATENT DOCUMENTS

| | | | |
|---|---|---|---|
| JP | 2002-268990 A | | 9/2002 |
| JP | 2002-300649 A | | 10/2002 |
| JP | 2004-184107 A | | 7/2004 |
| JP | 2004-297479 A | | 10/2004 |
| JP | 2004-357214 A | | 12/2004 |
| JP | 2005-521336 A | | 7/2005 |
| JP | 2007-274024 A | | 10/2007 |
| JP | 2008-288777 A | | 11/2008 |
| JP | 2010-109771 A | | 5/2010 |
| JP | 2011-193163 A | | 9/2011 |
| WO | WO 2005/006669 | * | 1/2005 |
| WO | WO 2005/006669 A1 | | 1/2005 |
| WO | WO 2010/151805 | | 12/2010 |

* cited by examiner

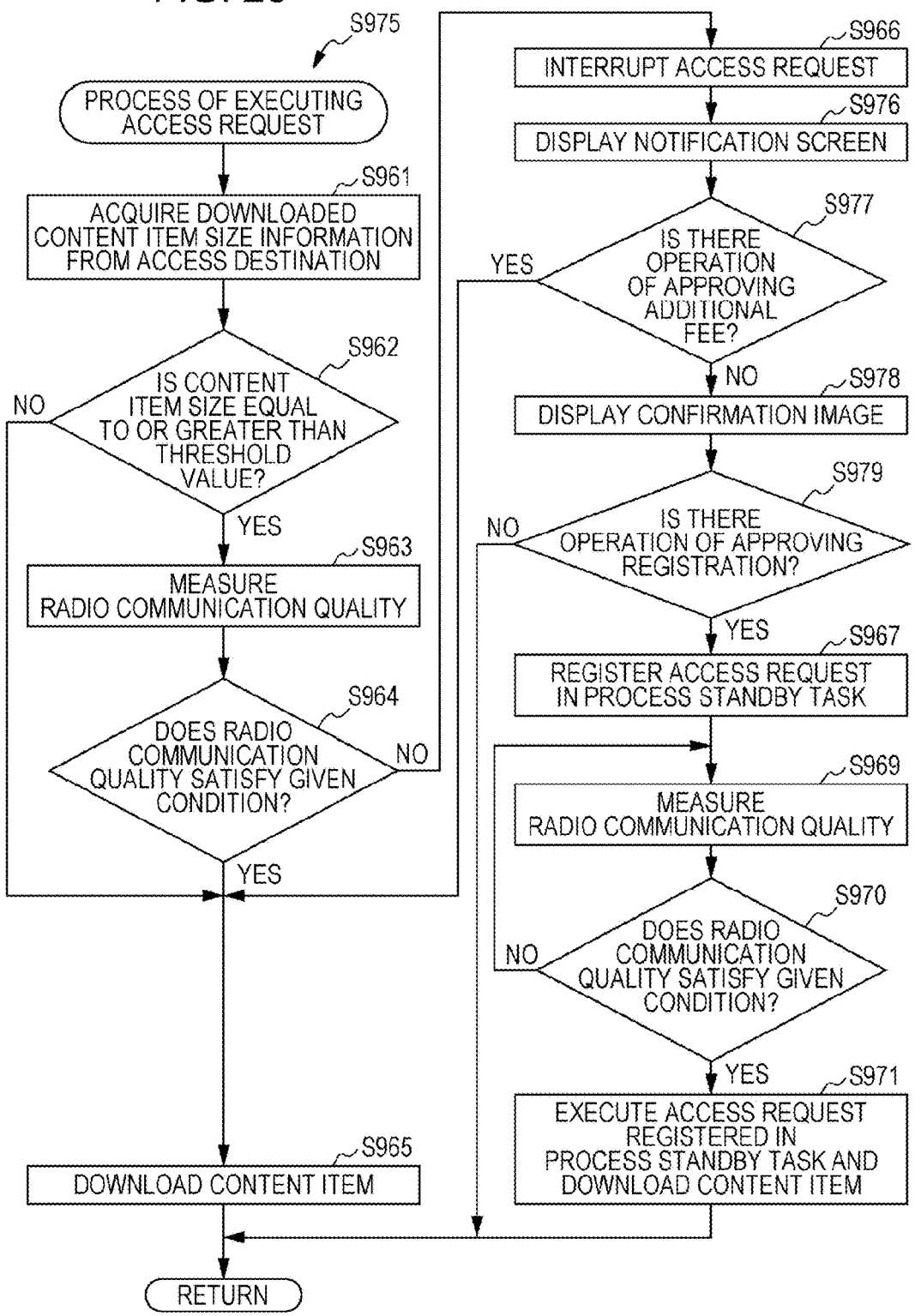

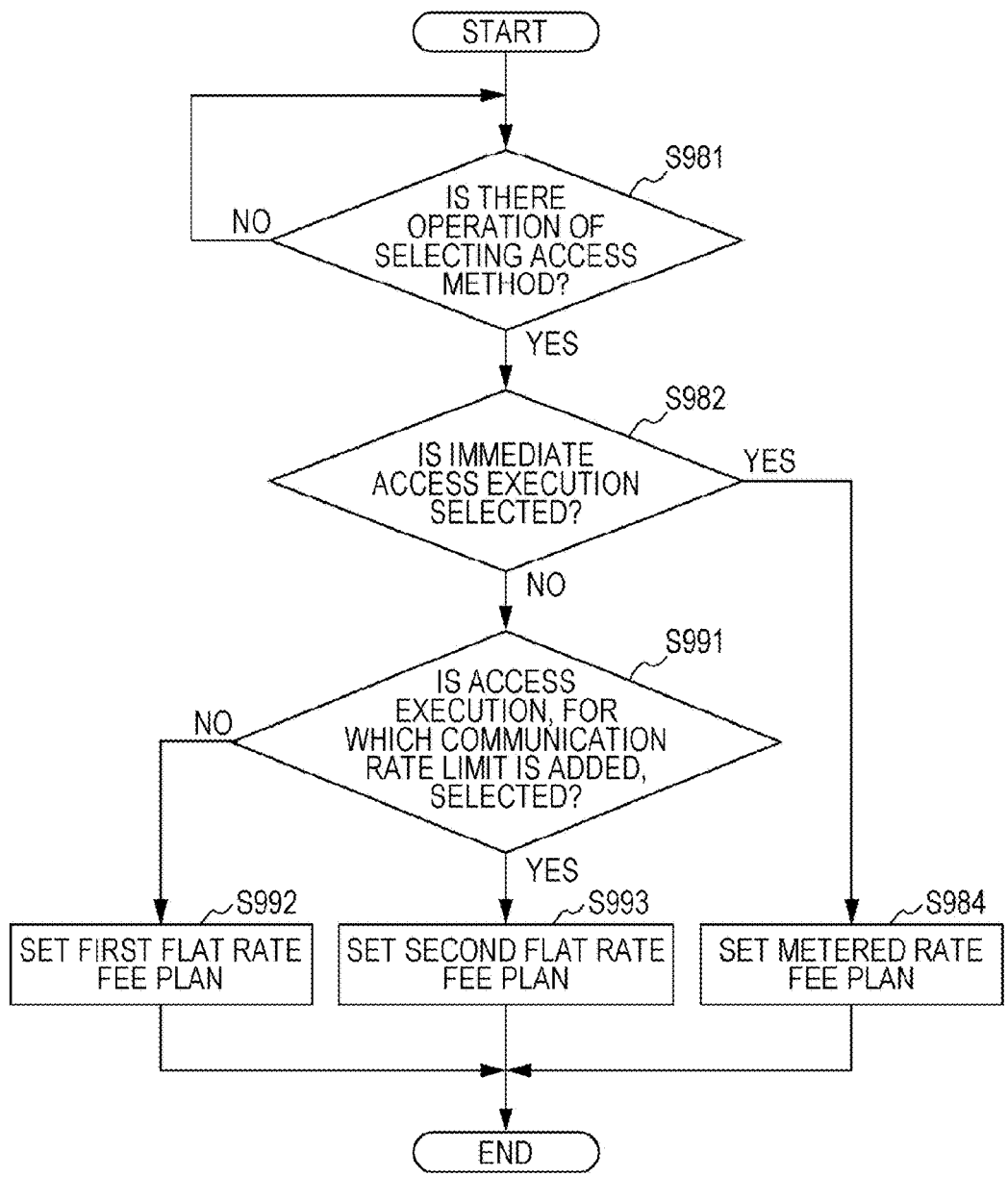

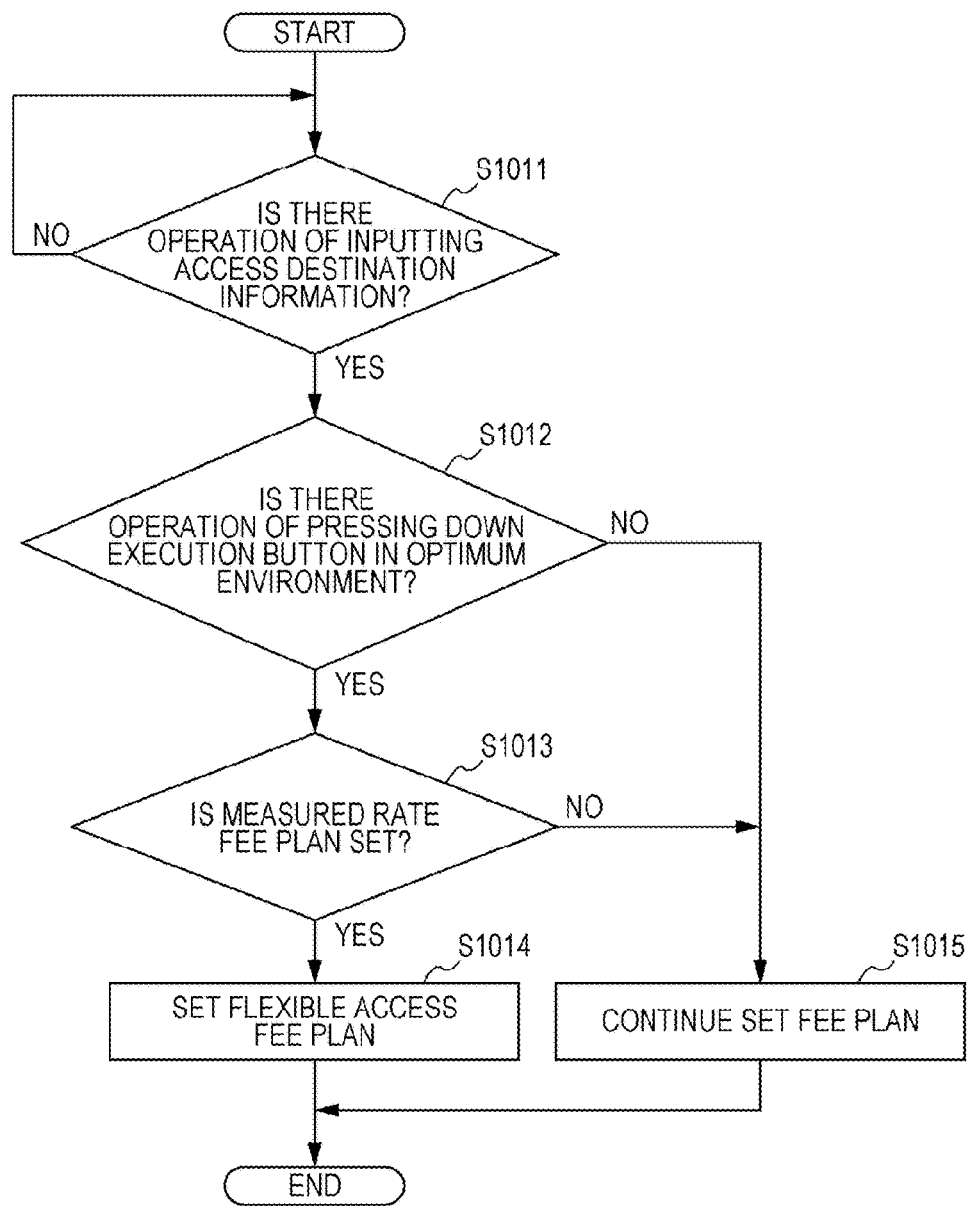

FIG. 45

| | TERMINAL IDENTIFICATION INFORMATION | SHORTEST ARRIVAL PREDICTION TIME | PRIORITY |
|---|---|---|---|
| 1 | #101 | 35 MINUTES | 4 |
| 2 | #153 | 15 MINUTES | 2 |
| 3 | #007 | 55 MINUTES | 5 |
| 4 | #017 | 12 MINUTES | 1 |
| 5 | #809 | 17 MINUTES | 3 |

FIG. 53

| CONTENT ITEM IDENTIFICATION INFORMATION | ACCESS RIGHT NUMBER INFORMATION | TERMINAL IDENTIFICATION INFORMATION |
|---|---|---|
| #0009 | 3 | 80017 |
| | | 90123 |
| | | 57589 |
| #0034 | 2 | 43001 |
| | | 45632 |
| ⋮ | ⋮ | ⋮ |

RADIO COMMUNICATION APPARATUS, INFORMATION PROCESSING APPARATUS, COMMUNICATION SYSTEM, AND METHOD OF CONTROLLING A RADIO COMMUNICATION APPARATUS ACCORDING TO INFORMATION CONTROLLING A CONDITION IN WHICH AN ACCESS REQUEST IS TO BE EXECUTED

CROSS REFERENCE TO RELATED APPLICATIONS

This application claims the benefit under 35 U.S.C. § 120 of U.S. application Ser. No. 14/929,576 entitled "RADIO COMMUNICATION APPARATUS, INFORMATION PROCESSING APPARATUS, COMMUNICATION SYSTEM, AND METHOD OF CONTROLLING A RADIO COMMUNICATION APPARATUS ACCORDING TO INFORMATION CONTROLLING A CONDITION IN WHICH AN ACCESS REQUEST IS TO BE EXECUTED," filed on Nov. 2, 2015, which claims the benefit under 35 U.S.C. § 120 of U.S. application Ser. No. 13/472,710 entitled "RADIO COMMUNICATION APPARATUS, INFORMATION PROCESSING APPARATUS, COMMUNICATION SYSTEM, AND METHOD OF CONTROLLING A RADIO COMMUNICATION APPARATUS ACCORDING TO USER SELECTION" filed on May 16, 2012, which claims priority under 35 U.S.C. § 119 to Japanese Patent Application No. JP 2012-001776 filed Jan. 10, 2012, and to Japanese Patent Application No. JP 2011-117582 filed May 26, 2011, the entire contents of which are incorporated herein by reference.

BACKGROUND

The present technology relates to a radio communication apparatus, and more particularly, to a radio communication apparatus executing radio communication, an information processing apparatus, a communication system including the radio communication apparatus and the information processing apparatus, and a method of controlling the radio communication apparatus.

Hitherto, radio communication apparatuses accessed to a network such as a public radio network have come into wide use. In 2002, a 3G (3rd Generation) mobile phone service (which is called the 3rd generation service in Japan) started. The mobile phone service was a service that initially provided applications for small-capacity packets of voices, mails, or the like. However, as the HSDPA (High Speed Downlink Packet Access) or the like has been introduced, users can download relatively large-capacity packets of music files or moving images to listen to music and view the moving images, so that use behaviors of the users have been changed.

It is supposed that the users are crowded in a specific area (base station) and download large-capacity packets and the traffics are thus concentrated locally. In this case, a problem may arise in that sufficient communication rates may not be obtained.

Accordingly, a delivery system has been suggested in which when a request to deliver a content item from a radio communication apparatus is executed, it is determined whether to deliver the content item depending on the reception environment of the radio communication apparatus (for example, see Japanese Unexamined Patent Application Publication No. 2002-78020).

SUMMARY

In the above-mentioned technique according to the related art, the content item may not be delivered to the radio communication apparatus when the reception environment of the radio communication apparatus is not good. In this case, for example, the delivery of the content item is interrupted. Alternatively, the reception environment is determined after a predetermined period and it is determined again whether to deliver the content item depending on the reception environment.

However, for example, a user may hurry to acquire the content item. Alternatively, a user may want to acquire the content item but may not hurry to acquire the content item. Thus, since the timing at which the user desires to acquire the content item is various, it is important to provide a radio access service at a user preference timing. Even in this case, it is important to efficiently utilize radio communication resources.

It is desirable to provide a technique of using a radio access service at a user preference timing, while efficiently utilizing radio communication resources.

According to an embodiment of the present technology, there is provided a radio communication apparatus, a method of controlling the radio communication apparatus, and a program causing a computer to execute the method.

Some embodiments relate to a radio communication apparatus that includes a receiving unit configured to receive information controlling a timing at which an access request for accessing an access destination over a network is to be executed. The radio communication apparatus also includes a control unit configured to control execution of the access request with a timing controlled based at least in part on the information.

In some embodiments, the information may represent a first type of operation requesting that the access request be executed when a network condition is satisfied.

In some embodiments, the network may be a wireless network and the network condition may be satisfied when a predetermined radio communication quality is available at a location of the radio communication apparatus.

In some embodiments, the radio communication apparatus may be configured to receive area information regarding an area in which the network condition is satisfied and to display a representation of the area in which the network condition is satisfied based on the area information.

In some embodiments, the radio communication apparatus may be configured to execute the access request to access a content item.

In some embodiments, the radio communication apparatus may be configured to determine whether a size of the content item exceeds a threshold and to set the network condition when the size of the content item exceeds the threshold.

In some embodiments, the radio communication apparatus may further include a process standby task information storage unit configured to store process standby information that includes information regarding the network condition.

In some embodiments, the radio communication apparatus may be configured to display the process standby information.

In some embodiments, the receiving unit may be configured to receive a deleting command to delete one or more portions of the process standby information. The process standby task information storage unit may be configured to delete the one or more portions of the process standby information in response to receiving the deleting command.

In some embodiments, the radio communication apparatus may be configured to display an indication that information representing the first type of operation has been received.

In some embodiments, the radio communication apparatus may be configured to receive a notification that the network condition is satisfied from an information processing apparatus when the radio communication apparatus is within an area in which the network condition is satisfied.

In some embodiments, the notification may include communication service provider information regarding a communication service provider providing service in the area.

In some embodiments, the network condition may be satisfied when a fee for accessing the access destination at a location of the radio communication apparatus is below a threshold.

In some embodiments, the radio communication apparatus may be configured to execute the access request to access a content item and to synchronize the content item with a stored content item.

In some embodiments, the radio communication apparatus may be configured to execute the access request to access a content item and to display information regarding a size of the content item.

In some embodiments, the radio communication apparatus may be configured to calculate and display an expected time for downloading a content item from the access destination. Some embodiments relate to a control method for a radio communication apparatus and a computer readable storage apparatus having stored thereon instructions, which, when executed, perform a control method. The method includes receiving information controlling a timing at which an access request for accessing an access destination over a network is to be executed. The method also includes controlling execution of the access request with a timing controlled based at least in part on the information.

Some embodiments relate to an information processing apparatus that includes a control unit and a transmission control unit. The control unit is configured to control acquiring a content item from an access destination and to receive, from a radio communication apparatus, a request for acquiring the content item from the access destination at a timing at which a condition is satisfied. The transmission control unit is configured to control transmitting the content item to the radio communication apparatus at a timing at which the condition is satisfied.

Some embodiments relate to an information processing system that includes a radio communication apparatus and an information processing apparatus. The radio communication apparatus includes a receiving unit configured to receive information controlling a timing at which an access request for accessing an access destination over a network is to be executed. The radio communication apparatus also includes a control unit configured to control execution of the access request with a timing controlled based at least in part on the information. The information processing apparatus includes a control unit and a transmission control unit. The control unit is configured to control acquiring a content item from an access destination and to receive, from a radio communication apparatus, a request for acquiring the content item from the access destination at a timing at which a condition is satisfied. The transmission control unit is configured to control transmitting the content item to the radio communication apparatus at a timing at which the condition is satisfied.

The above-described embodiments may be implemented alone or combined in any suitable combination. Such techniques may be implemented as an apparatus, method, computer readable medium, or system, for example.

According to the embodiments of the present technology, it is possible to obtain the advantage of using the radio access service at the user preference timing, while efficiently utilizing the radio communication resources.

BRIEF DESCRIPTION OF THE DRAWINGS

FIG. 26 is a flowchart illustrating a processing sequence of executing an access request in the communication process performed by the radio communication apparatus according to the first embodiment of the present technology;

FIG. 30 is a flowchart illustrating an example of the processing sequence of a setting process performed by the radio communication apparatus according to the second embodiment of the present technology;

FIG. 34 is a flowchart illustrating an example of the processing sequence of a setting process performed by the radio communication apparatus according to the second embodiment of the present technology;

FIG. 45 is a diagram schematically illustrating an example of stored details of a priority information storage unit according to the fourth embodiment of the present technology;

FIG. 53 is a diagram illustrating an example of stored details of an alternative download list storage unit according to the fourth embodiment of the present technology.

DETAILED DESCRIPTION OF EMBODIMENTS

Hereinafter, modes (hereinafter, referred to as embodiments) for carrying out the present technology will be described. The description will be made in the following order.

1. First Embodiment (Access Control: Selection Example in Which Access Timing Is Selected through User Operation)

2. Second Embodiment (Fee Plan Setting Control: Example in which Access Methods and Fee Plans Are Set in Association Therewith)

3. Third Embodiment (USIM (Universal Subscriber Identity Module) Information Rewriting Control: Communication Example by Rewriting USIM Information of Suitable Communication Service Provider)

4. Fourth Embodiment (Access Control: Example in Which Apparatus Other Than Radio Communication Apparatus Acquires Content Item)

1. First Embodiment

Configuration Example of Communication System

Figure 1:
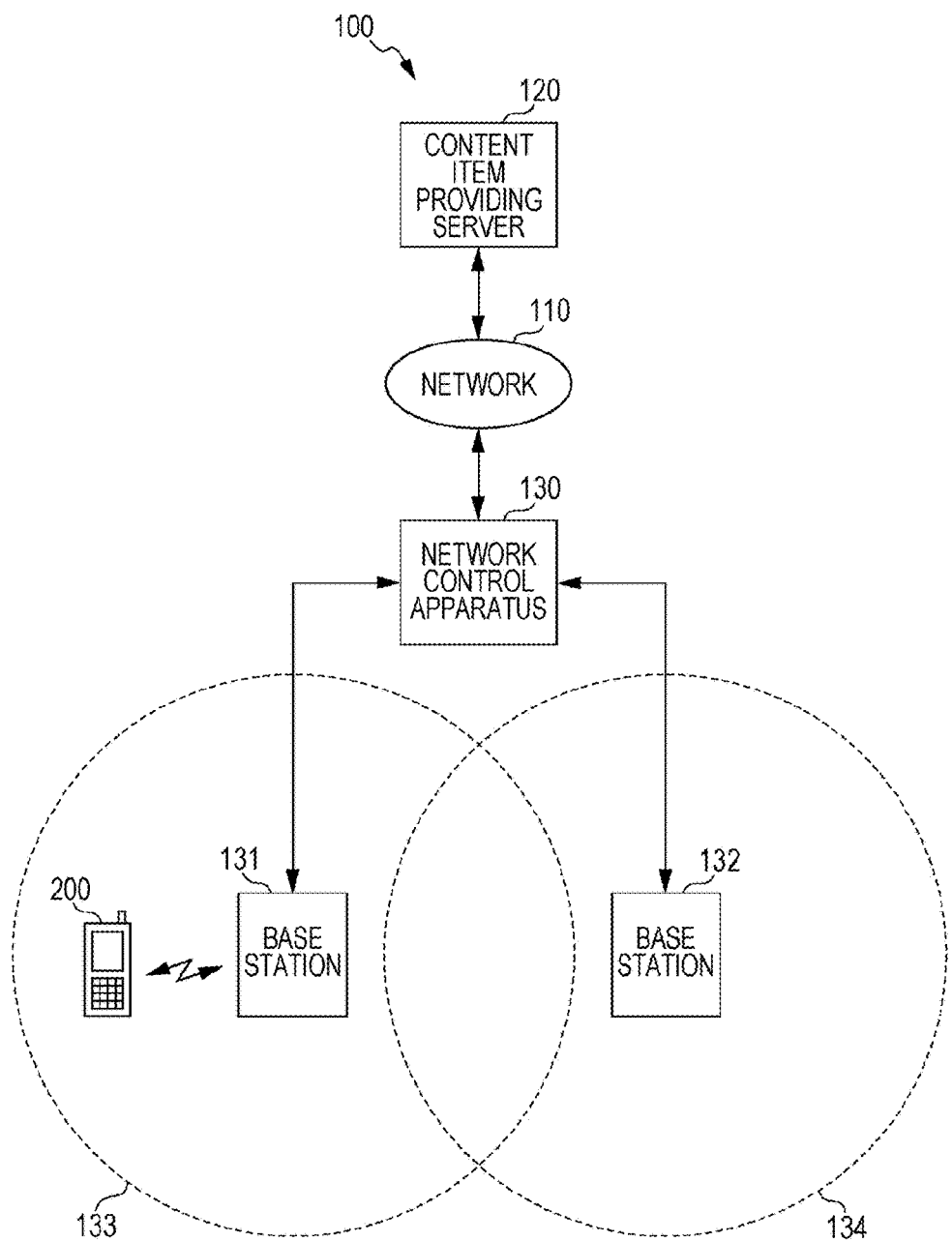
FIG. 1 is a block diagram illustrating an example of the configuration of a communication system according to a first embodiment of the present technology.

FIG. 1 is a block diagram illustrating an example of the configuration of a communication system 100 according to a first embodiment of the present technology.

The communication system 100 includes a network 110, a content item providing server 120, a network control apparatus 130, base stations 131 and 132, and a radio communication apparatus 200.

The network 110 is a communication network (for example, a public line network) such as a telephone network or the Internet. The network 110 and the network control unit 130 are connected to each other via a gateway (not shown).

The content item providing server 120 is an information processing apparatus that provides various kinds of content items via the network 110. The content item providing server 120 provides various kinds of content items to the radio communication apparatus 200 through a radio line. For example, the content item providing server 120 provides content items such as music content items or image content items (still image content items and moving-image content items). The content items include general web sites including image content items. Further, it is assumed that the content item providing server 120 is managed by a communication service provider providing a radio access service, an MVNO (Mobile Virtual Network Operator), or a service provider delivering content items. The MVNO means a business form service provider called a virtual communication service provider.

The network control apparatus 130 is a communication control apparatus that is managed by a first communication service provider that provides a radio access service. The network control apparatus 130 controls authentication of radio communication apparatuses accessed via the base stations 131 and 132. The network control apparatus 130 accesses the authenticated radio communication apparatus to the network 110 via the gateway (not shown). The first communication service provider is, for example, a mobile communication service provider that provides a radio access service.

Here, the network control apparatus 130 authenticates only radio communication apparatuses keeping USIM information (contract authentication information) associated with the first communication service provider among the radio communication apparatuses accessed via the base stations 131 and 132 except for a specific case. An example of the specific case includes a case where a call request is made for emergencies (for example, a call request from a police, a fire station, or the like).

Here, the USIM information is an example of the contract authentication information. The contract authentication information is information that includes telephone subscriber information and authentication information. That is, it is assumed that the user owning the radio communication apparatus 200 makes a contract with the first communication service provider. This contract may be comprehended as contract by which the user owning the radio communication apparatus 200 use the base stations 131 and 132 administrated by the first communication service provider.

The network control apparatus 130 transmits various kinds of information transmitted from the radio communication apparatus 200 via the base stations 131 and 132 to the content item providing server 120. Further, the network control apparatus 130 transmits various kinds of information output from the content item providing server 120 to the radio communication apparatus 200 via the base stations 131 and 132.

The base stations 131 and 132 are base stations that are administrated by the first communication service provider and are mobile communication stations (Node B) that accesses radio communication apparatuses keeping the USIM information of the first communication service provider to the network control apparatus 130 through radio lines. FIG. 1 schematically shows a range (radio communicable range), in which the radio waves of the base station 131 arrive, as a cell 133 and a range, in which the radio waves of the base station 132 arrive, as a cell 134.

In the embodiments of the present technology, the base station means both the base station itself and the cell specified by the base station. For example, the embodiments of the present technology, the contract for using the base station also means contract for using the cell specified by the base station.

The radio communication apparatus 200 is, for example, a cellular phone (such as a cellular phone or a smart phone having a call function and a data communication function) or a data communication apparatus (such as a personal computer) having a radio communication function. Further, based on the contract with the first communication service provider administrating the network control apparatus 130, the radio communication apparatus 200 execute parameter default setting necessary for access to the radio communication network administrated by the first communication service provider. The parameter setting is executed, for example, by rewriting the USIM information necessary for access to the radio communication network administrated by the first communication service provider.

For example, the radio communication apparatus 200 is accessed to the base station 131 through a radio line and is accessed to the network control apparatus 130 via the base station 131. Then, the radio communication apparatus 200 can be accessed to the content item providing server 120 via the network control apparatus 130.

In order to facilitate the description in FIG. 1, only the first communication service provider is illustrated as a communication service provider. However, two or more communication service providers are present, the same is applied. Further, in order to facilitate the description in FIG. 1, only the base stations 131 and 132 are illustrated as base stations administrated by the first communication service provider. However, when three or more base stations administrated by each communication service provider are present, the same is applied.

Here, it is supposed that there are many other radio communication apparatuses accessing the base station 131 which the radio communication apparatus 200 can access and the user of the radio communication apparatus 200 uses a communication service (for example, downloading a moving image) using the radio communication apparatus 200. For example, it is supposed that the number of other radio communication apparatuses accessing the base station 131 which the radio communication apparatus 200 can access is small and the radio communication apparatus 200 can be moved to the side of the base station 132. In this case, it is supposed that when the radio communication apparatus 200 is moved and accesses the base station 132, the user can use the communication service at a relative high speed compared to the case where the radio communication apparatus 200 accesses the base station 131. Further, in this case, it is supposed that the radio resources can be efficiently utilized when the user can use the communication service at a later time but the user does not hurry. Therefore, in the first embodiment of the present technology, an example will be described in which the user uses a desired communication service by selecting an access request timing and executing an access request at the selected timing.

Configuration Example of Radio Communication Apparatus

Figure 2:
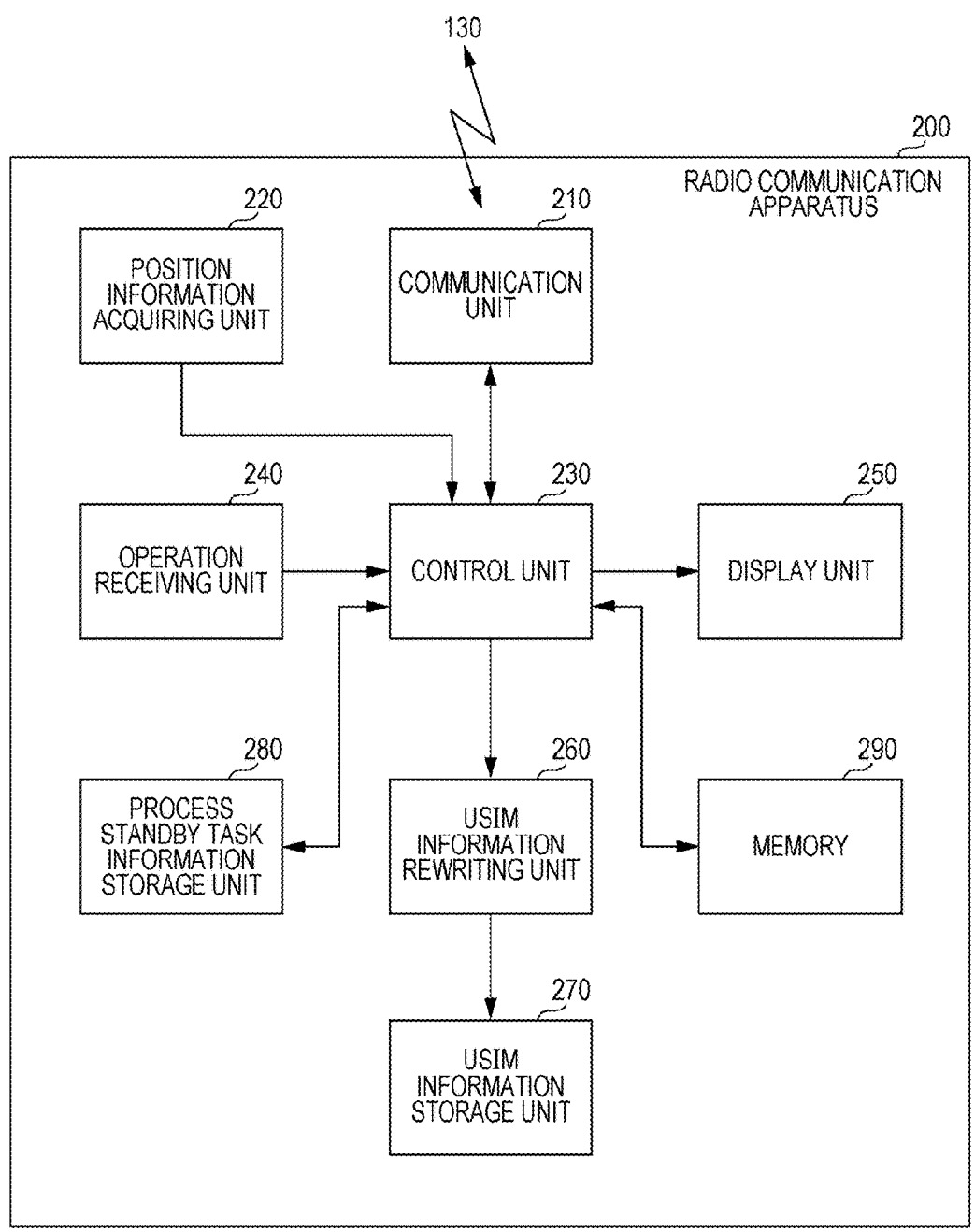
FIG. 2 is a block diagram illustrating an example of the functional configuration of a radio communication apparatus according to the first embodiment of the present technology.

FIG. 2 is a block diagram illustrating an example of the functional configuration of the radio communication apparatus 200 according to the first embodiment of the present technology.

The radio communication apparatus 200 includes a communication unit 210, a position information acquiring unit 220, a control unit 230, an operation receiving unit 240, a display unit 250, a USIM information rewriting unit 260, a USIM information storage unit 270, a process standby task information storage unit 280, and a memory 290. The radio communication apparatus 200 is, for example, a cellular phone that executes telephone call and data communication. A microphone, a speaker, or the like is not shown and will not be described.

The communication unit 210 includes a receiving unit that receives a radio signal transmitted from each base station and a transmitting unit that transmits a radio signal to each base station. The communication unit 210 is a communication unit corresponding to a plurality of radio communication services. For example, the communication unit 210 can execute communication in accordance with CDMA or OFDMA. Further, CDMA is an abbreviation of code division multiple access and OFDMA is an abbreviation of orthogonal frequency division multiple access.

The position information acquiring unit 220 acquires position information indicating the position of the radio communication apparatus 200 and outputs the acquired position information to the control unit 230. The position information acquiring unit 220 can be realized by a GPS unit that calculates the position information based on a GPS signal received through a GPS (Global Positioning System) signal receiving antenna. The calculated position information includes data regarding positions such as latitude, longitude, and height when the GPS signal is received. A position information acquiring apparatus may be used which acquires position information by another position information acquiring method. For example, a position information acquiring apparatus may be used which derives position information using access point information by a radio LAN (Local Area Network) present in the periphery and acquires the position information.

The control unit 230 executes various control processes based on control programs stored in the memory 290. The control unit 230 is configured by, for example, a microprocessor. For example, the control unit 230 is accessed to the communication unit 210 and transmits and receives various kinds of data to and from the network control apparatus 130 accessed via the base stations 131 and 132.

The operation receiving unit 240 is an operation receiving unit that receives an input operation operated by a user. The operation receiving unit 240 outputs a signal generated in response to the received input operation to the control unit 230. The operation receiving unit 240 includes various keys such as numeral keys or alphabet keys.

The display unit 250 is a display unit that displays various kinds of information (character information, time information, and the like) under the control of the control unit 230. For example, the display unit 250 displays each item of information (for example, display screens shown in FIGS. 4 to 9B) used to execute an access request. Further, a display panel such as an organic EL (Electro Luminescence) panel or an LCD (liquid Crystal Display) panel can be used as the display unit 250. The operation receiving unit 240 and the display unit 250 may be integrally formed using a touch panel for which the user can execute an input operation by touching or approximating a display surface with his or her finger.

The USIM information rewriting unit 260 rewrites USIM information (contract authentication information) kept in the USIM information storage unit 270 under the control of the control unit 230. Here, when the USIM information associated with the first communication service provider is kept, it can be understood that the user has an access right to access the base stations 131 and 132 associated with the first communication service provider. For example, the access right can be granted through processes of validating and invalidating the USIM information. Further, the access right can be granted through a process of transmitting the USIM information itself. When the USIM information associated with the first communication service provider is kept, it can be understood that parameters necessary for accessing the base stations 131 and 132 associated with the first communication service provider are set.

The USIM information storage unit 270 is a memory that keeps the USIM information (contract authentication information). For example, as the USIM information storage unit 270, a UICC (Universal Integrated Circuit) card may be used or a dedicated memory may be used to secure the USIM information. When the UICC card is used as the USIM information storage unit 270, the USIM information is not written fixedly, but the processes of validating and invalidating the USIM information are executed for the UICC card. That is, the UICC card for which the USIM information rewriting unit 260 can execute the processes of validating and invalidating the USIM information is used. Further, the UICC card for which a process of rewriting the USIM information can be executed is used. The processes of validating and invalidating the USIM information can be executed in conformity with the regulation defined in the 3GPP (Third Generation Partnership Project). The processes are executed, for example, in cellular phone sale shops. Further, a secure area may be guaranteed in a partial area of the memory 290 and the partial area may be used as a storage area of the USIM information.

The process standby task information storage unit 280 is a storage unit that stores information (process standby task information) regarding a process standby task. The process standby task information will be described in detail with reference to FIGS. 4 to 9B. The stored details of the process standby task information storage unit 280 will be described in detail with reference to FIG. 3. Further, the process standby task information storage unit 280 is an example of a storage unit described in claims.

The memory 290 is a memory that stores control programs used for the control unit 230 to execute various controls, transmitted data, received data, and the like. The memory 290 is configured by, for example, a ROM (Read Only Memory) or a RAM (Random Access Memory). Further, the memory 290 can stores each item of information (for example, terminal identification information) or the like used to identify the radio communication apparatus 200.

For example, the operation receiving unit 240 receives a determination operation of determining a timing at which an access request for accessing the content item providing server 120 via the network 110 is executed. For example, the operation receiving unit 240 receives, as the determination operation, one of a first operation of executing the access request immediately and a second operation of executing the access request at a timing at which a predetermined condition is satisfied. Here, the first operation is, for example, an operation of pressing down an execution button 302 shown in FIG. 4. Further, the second operation is, for example, an operation of pressing down the execution button 303 in an optimum environment shown in FIG. 4, and then pressing down the execution button 302. The timing at which the predetermined condition is satisfied is a timing at which a predetermined radio communication quality is ensured in an area where the radio communication apparatus 200 is located. For example, it is supposed that the radio communication apparatus 200 arrives in an area where the predetermined radio communication quality is ensured or the radio communication quality of the area where the radio communication apparatus 200 is located is changed into the predetermined radio communication quality and is ensured.

Figure 4:
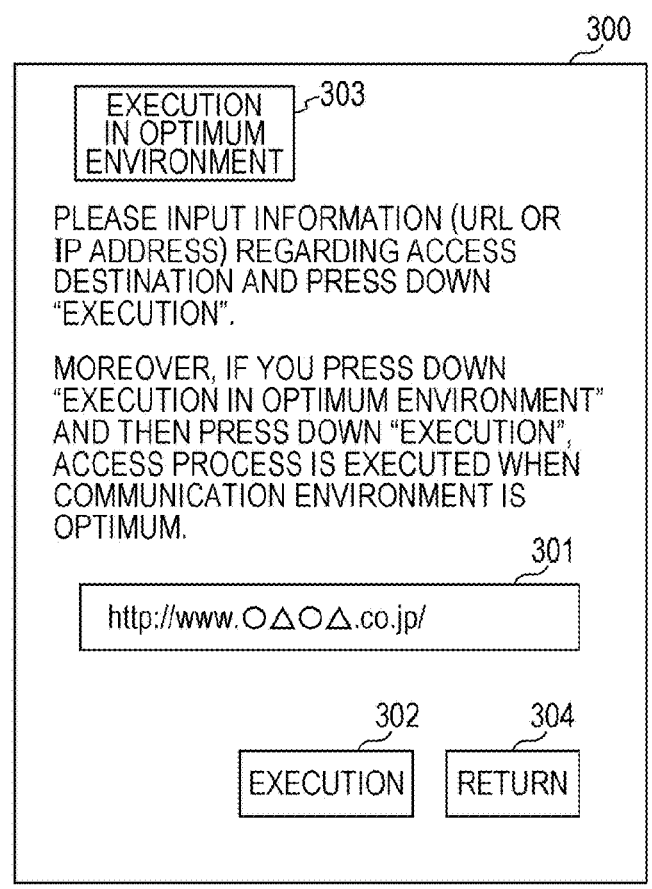
FIG. 4 is a diagram illustrating a display example of an access request operation screen displayed on a display unit according to the first embodiment of the present technology.

The operation receiving unit 240 receives an access request operation (for example, an operation of pressing down the execution button 302 shown in FIG. 4) of executing the access request.

For example, the control unit 230 executes control of execution of the access request at the determined timing. That is, the control unit 230 executes the access request at the determined timing when the operation receiving unit 240 receives the access request operation.

Specifically, the control unit 230 executes the access request immediately after the reception of the access request operation when the operation receiving unit 240 receives the first operation. On the other hand, the control unit 230 executes the access request at the timing, at which the predetermined condition is satisfied, immediately after the reception of the access request operation, when the operation receiving unit 240 receives the second operation. For example, when the operation receiving unit 240 receives the second operation, the control unit 230 determines whether the radio communication apparatus 200 is located in the area where the predetermined radio communication quality is ensured. When the control unit 230 determines that the radio communication apparatus 200 is located in the area where the predetermined radio communication quality is ensured, the control unit 230 executes the access request. For example, in a fixed or variable period, the control unit 230 can determine whether the radio communication apparatus 200 is located in the area where the predetermined radio communication quality is ensured.

When the operation receiving unit 240 receives the second operation, the control unit 230 stores process standby information (process standby task information) used to execute the access request at the timing, at which the predetermined condition is satisfied, in the process standby task information storage unit 280. The control unit 230 executes the access request based on the process standby information stored in the process standby task information storage unit 280.

For example, based on a reception level of a signal transmitted by the base station, the control unit 230 can determine whether the radio communication apparatus 200 is located in the area where the predetermined radio communication quality is ensured. Further, the control unit 230 detects, for example, the SIR (Signal to Interference Ratio) of the signal transmitted by the base station. Then, based on the value of the detected SIR, the control unit 230 can determine whether the radio communication apparatus 200 is located in the area where the predetermined radio communication quality is ensured.

Here, as a method of detecting the SIR by the radio communication apparatus 200, for example, a method of detecting the SIR based on a signal-to-noise ratio obtained at the time of correlation detection of a pilot signal can be used in the code division multiple access scheme. Further, for example, a method of detecting the SIR based on a signal-to-noise ratio obtained at the time of correlation detection of a synchronization signal can be used in the orthogonal frequency division multiple access scheme. Furthermore, another method of detecting the SIR may be used.

In this way, when the radio communication quality is determined, the SIR or a RSSI (Receive Signal Strength Indication) can be used (however, it is desirable to use the SIR). For example, the RSSI is set to be −70 dBm or the SIR is set to be 17.5 dB. When the detected RSSI or the SIR is equal to or greater than the set value, it can be determined that the area is an area (area with an excellent radio communication quality) in which the radio communication quality satisfies a given condition. Further, the set value may be variable depending on an application. For example, when a content item (file) with a relatively large size is downloaded, a relatively high value can be set as the set value of the RSSI or the SIR.

The radio communication quality can be determined using a congestion degree of the base station. For example, a communication speed considerably depends on the strength (precisely, SIR) of a signal received from a base station and the congestion degree of the base station. This fact is considerably related to the AMC (Adaptive Modulation and Coding) that is utilized in a system after the HSDPA scheme used for the 3rd generation cellular phone.

Thus, an area where the congestion degree of the base station is low and the SIR is large can be determined as the area (for example, an area where a high communication rate is expected) with an excellent radio communication quality. For example, 1 Mbps or more can be set as an initial value for the area. Further, the user can appropriately set the set value. When the radio communication apparatus 200 is present within the range of the area where a communication rate expected to be equal or higher than the set value is ensured, the area is determined as the area (an area with an excellent radio communication quality) where the radio communication quality satisfies the given condition and a process standby task can be executed.

Hereinafter, a method of detecting the congestion degree of the base station by the radio communication apparatus 200 will be described. As the method of detecting the congestion degree of the base station by the radio communication apparatus 200, it is possible to use cell search and neighborhood cell search executed at the standby time or a correlation detection value acquired by a process of reselecting a cell in a case of the W-CDMA scheme. Further, in a case of the OFDMA, the congestion degree of the base station can be detected by detecting information regarding a ratio of the number of actually assigned sub-carriers to the number of all sub-carriers of each frame.

Example of Details of Process Standby Task Information Storage Unit

Figure 3:
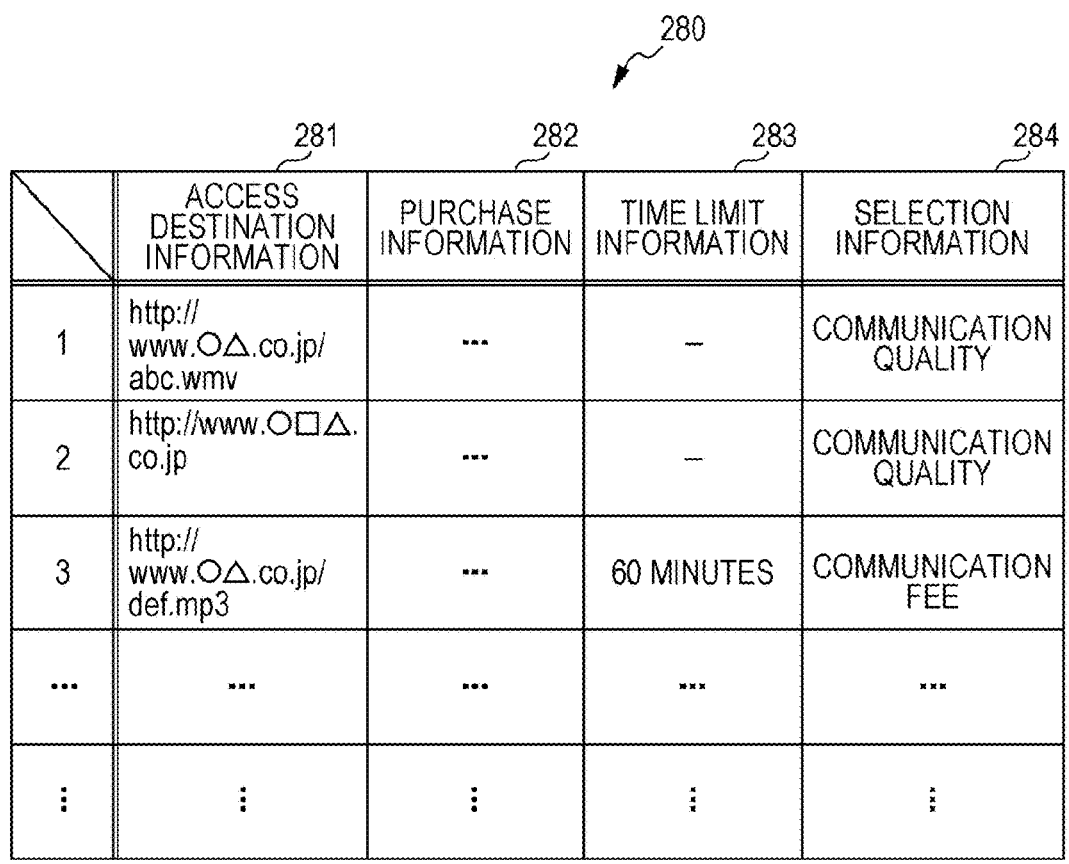
FIG. 3 is a diagram schematically illustrating an example of the details stored in a process standby task information storage unit according to the first embodiment of the present technology.

FIG. 3 is a diagram schematically illustrating an example of the details stored in the process standby task information storage unit 280 according to the first embodiment of the present technology.

The process standby task information storage unit 280 is a storage unit that stores information (process standby task information) regarding the process standby task. The process standby task is a task for executing the access request at the timing at which the predetermined condition is satisfied. Specifically, the process standby task information storage unit 280 stores, access destination information 281, purchase information 282, time limit information 283, and selection information 284 in association therewith.

The access destination information 281 is information regarding an access destination associated with the process standby task. For example, the URL (Uniform Resource Locator) or IP (Internet Protocol) address of the access destination is stored as the access destination information. For example, the access destination information is stored through a manual operation or a selection operation of the user.

The purchase information 282 is information (purchase information) regarding a content item to be purchased from the access destination associated with the process standby task. The purchase information will be described in detail with reference to FIG. 6.

The time limit information 283 is information (time limit information) regarding a time limit in which the process standby task is executed. The time limit information will be described in detail with reference to FIG. 16.

The selection information 284 is information (selection information) regarding a determination reference when the process standby task is executed. The selection information will be described in detail with reference to FIG. 18.

In this example, the radio communication apparatus 200 stores the process standby task information. However, the process standby task information may be stored in another apparatus (for example, an information processing apparatus such as a network server). In this case, the process standby task information stored in another apparatus can be acquired via the network 110 and can be used by the radio communication apparatus 200.

Display Examples of Access Request Operation Screens

Figure 5A:
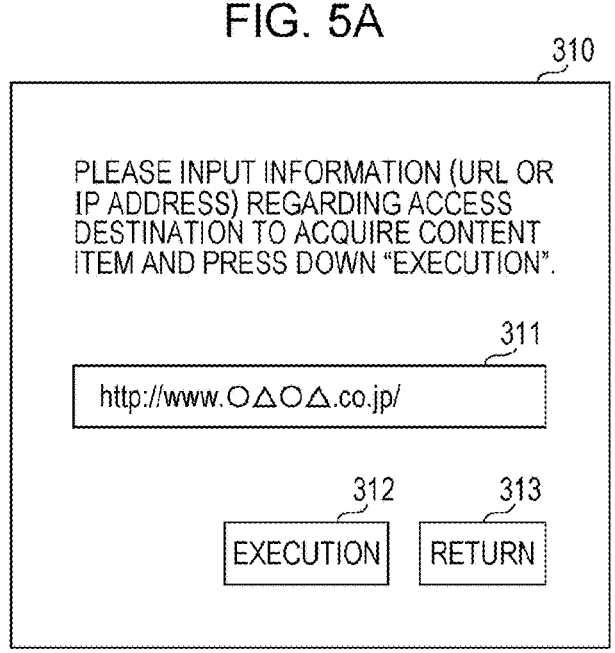
FIGS. 5A and 5B are diagrams illustrating display examples of access request operation screens displayed on the display unit according to the first embodiment of the present technology.
Figure 5B:
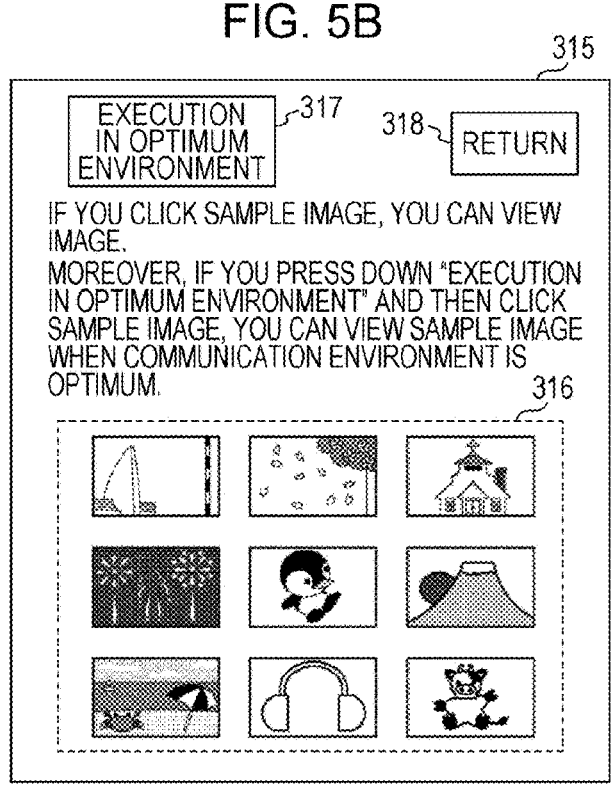
Figure 6:
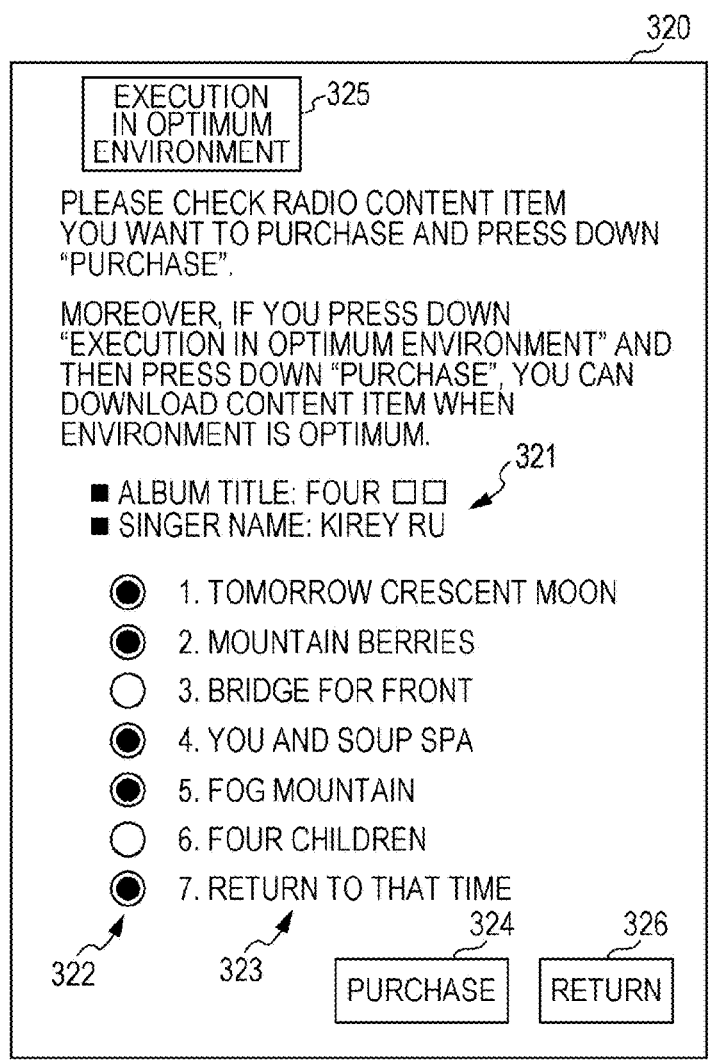
FIG. 6 is a diagram illustrating a display example of an access request operation screen displayed on the display unit according to the first embodiment of the present technology.

FIGS. 4 to 6 are diagrams illustrating display examples of access request operation screens displayed on the display unit 250 according to the first embodiment of the present technology.

FIG. 4 shows an access request operation screen 300 configured to execute the access request for accessing a desired access destination (for example, the content item providing server 120) via a predetermined network (for example, the network 110).

The access request operation screen 300 are provided with an access destination information input region 301, an execution button 302, an execution button 303 in an optimum environment, and a return button 304.

The access destination information input region 301 is a region in which access destination information used to access a desired access destination (for example, the content item providing server 120) is input. The access destination information is, for example, the URL or IP address of the access destination and is information used to access a desired content item. For example, the access destination information is input by a manual input operation or a selection operation executed using the operation receiving unit 240 by the user.

The execution button 302 is a button which is pressed down at the time of executing the access request for accessing the access destination associated with the access destination information input into the access destination information input region 301. Further, the timing at which the access request is executed is different depending on whether the execution button 303 in the optimum environment is pressed down, before the execution button 302 is pressed down.

The execution button 303 in the optimum environment is a button which is pressed down to select the execution of the access request for accessing the access destination associated with the access destination information input into the access destination information input region 301. Here, for example, the optimum communication environment means the area where the radio communication quality satisfies a given condition.

For example, when the execution button 303 in the optimum environment is not pressed down and the execution button 302 is pressed down, the access request for accessing the access destination associated with the access destination information input into the access destination information input region 301 is executed immediately after the execution button 302 is pressed down. On the other hand, for example, when the execution button 303 in the optimum environment is pressed down and the execution button 302 is then pressed down, the access request for accessing the access destination associated with the access destination information input into the access destination information input region 301 is executed at a predetermined timing. For example, the predetermined timing is a timing at which the radio communication apparatus 200 arrives in an area where a predetermined radio communication quality is ensured. Therefore, when the execution button 303 in the optimum environment is pressed down and the execution button 302 is then pressed down, information (process standby task information) used to execute the access request is stored in the process standby task information storage unit 280 shown in FIG. 3. In this way, the access request stored in the process standby task information storage unit 280 is executed when the radio communication apparatus 200 arrives in the area where the radio communication quality satisfies the given condition. Thus, for example, when the radio communication apparatus 200 is present within the range of the area with an excellent radio communication quality, it is possible to reduce the burden on the radio communication base station by multi-leveling of the AMC or application of a high encoding ratio to execute the access request.

In this way, the execution button 302 is a button for executing the access request immediately. The execution button 303 in the optimum environment is a button for executing the access request for accessing the access destination immediately or at a predetermined timing. The user can easily select the timing at which the access request is executed by pressing down or not pressing down the button.

Here, when the execution button 303 in the optimum environment is pressed down, a display process may be executed such that the user may be notified of the fact that the access request is executed in the optimum communication environment. For example, when the execution button 303 in the optimum environment is pressed down, the user can be notified of the fact by varying and displaying the color of the execution button 303 in the optimum environment to give a visual effect. For example, when the execution button 303 in the optimum environment is pressed down, a specific icon may be displayed or a message or the like indicating "the selection of the execution in the optimum environment" may be displayed to notify the user of the fact.

The return button 304 is, for example, a button that is pressed down when the current display is returned to the immediately displayed screen. The same is applied to buttons (for example, return buttons 313 and 318 shown in FIGS. 5A and 5B) shown in FIGS. 5A and 5B and the subsequent drawings.

FIG. 4 shows the example in which the execution button 302 and the execution button 303 in the optimum environment are displayed in the button forms. However, each button may be displayed and used in an icon form. Further, each button may be assigned to an operation member (for example, a specific key of a key input device) provided in the radio communication apparatus 200. An input operation associated with each button operation may be executed using a combination of specific numeral keys. Likewise, the buttons shown in FIGS. 5 and 5B and the subsequent drawings may be used using an operation member (for example, a touch panel or a key input device) provided in the radio communication apparatus 200.

FIG. 4 shows the display example used when the access request for accessing the desired access destination via the predetermined network. FIGS. 5A and 5B show display examples used when a content item associated with an image (for example, a still image or a moving image) is viewed or acquired.

Display Example Associated with View and Acquisition of Image Content Item

FIG. 5A shows an access request operation screen 310 configured to execute an access request for accessing the desired access destination via the predetermined network and acquiring a desired content item.

The access request operation screen 310 has an access destination information input region 311, an execution button 312, and a return button 313. Since the access destination information input region 311 and the execution button 312 correspond to the access destination information input region 301 and the execution button 302 shown in FIG. 4, the detailed description thereof will not be repeated here.

FIG. 5B shows a content item acquisition request operation screen 315 configured to display a list of content items acquired from the desired access destination via the predetermined network. The content item acquisition request operation screen 315 is a display screen used when a content item associated with an image (for example, a still image or a moving image) is viewed or acquired.

The content item acquisition request operation screen 315 has a content item list display region 316, an execution button 317 in the optimum environment, and a return button 318. Since the execution button 317 in the optimum environment corresponds to the execution button 303 in the optimum environment shown in FIG. 4, the detailed description thereof will not be repeated here.

The content item list display region 316 is a region in which a list of the content items acquired from the desired access destination via the predetermined network is displayed.

For example, when access destination information is input into the access destination information input region 311 and the execution button 312 is then pressed down, the access request for accessing the access destination associated with the input access destination information is executed. Information (for example, information used to display the list of the content items) regarding the content items is downloaded from the access destination (for example, the content item providing server 120) in response to the access request, and then the content item acquisition request operation screen 315 is displayed on the display unit 250.

Here, when an image (image indicating the content item) displayed on the content item acquisition request operation screen 315 has a link containing the access destination information, the execution button 317 in the optimum environment is displayed on the content item acquisition request operation screen 315.

FIGS. 5A and 5B show an example in which the content item acquisition request operation screen 315 is displayed immediately after the operation of pressing down the execution button 312, when the access request operation screen 310 is transitioned to the content item acquisition request operation screen 315. Here, the content item acquisition request operation screen 315 may be displayed after one display screen or a plurality of display screens are displayed after the operation of pressing down the execution button 312. Further, a list of the content items searched with an arbitrary keyword may be displayed on the content item acquisition request operation screen 315.

For example, when the execution button 317 in the optimum environment is not pressed down and an image displayed in the content item list display region 316, an access request is executed to view or acquire a content item associated with the pressed image immediately after the operation of pressing down the image. On the other hand, for example, when the execution button 317 in the optimum environment is pressed down and the image displayed in the content item list display region 316 is then pressed down, the access request for viewing and acquiring the content item associated with the pressed image is executed at a predetermined timing. For example, the predetermined timing is the same as the timing described in the example of FIG. 4. Thus, when execution button 317 in the optimum environment is pressed down and the image displayed in the content item list display region 316 is then pressed down, information regarding the execution of the access request is stored in the process standby task information storage unit 280 shown in FIG. 3. In this way, the access request stored in the process standby task information storage unit 280 is executed when the radio communication apparatus 200 arrives in the area where the radio communication quality satisfies the given condition.

FIGS. 5A and 5B shows the display example used when the content items associated with the image (for example, a still image or a moving image) is viewed or acquired. FIG. 6 shows a display example used when content items associated with music are acquired.

Display Example Associated with Acquisition of Music Content Item

FIG. 6 shows a content item purchase request operation screen 320 configured to display a list of content items acquired from the desired access destination via the predetermined network. The content item purchase request operation screen 320 is a display screen (content item purchase site) used when content items associated with music are purchased.

The content item purchase request operation screen 320 has content item display regions (321 and 323), purchase buttons 324, an execution button 325 in the optimum environment, and a return button 326. FIG. 6 shows an example in which information regarding a list of music contained in albums (collection associated with a plurality of music) is acquired and the list of music is displayed for each album. Since the execution button 325 in the optimum environment corresponds to the execution button 303 in the optimum environment shown in FIG. 4, the detailed description thereof will not be repeated here.

The content item display region 321 is a region in which information (information (for example, an album title and a singer name) regarding an album) acquired from the desired access destination via the predetermined network is displayed.

The content item display region 323 is a region in which information (information (for example, a music title) regarding each music contained in the album) acquired from the desired access destination via the predetermined network is displayed.

A radio button display region 322 is a region in which a radio button corresponding to the content item display region 323 is displayed. For example, when the user desires to purchase music, the user ticks off the radio button corresponding to the desired music and a check mark (black circle) is added.

The purchase button 324 is a button pressed down when the access request for purchasing the music to which the check mark is added in the radio button display region 322 is executed.

For example, when the execution button 325 in the optimum environment is not pressed down and the purchase button 324 is pressed down, the access request for purchasing the music to which the check mark is added in the radio button display region 322 is executed immediately after the purchase button 324 is pressed down. On the other hand, for example, when the execution button 325 in the optimum environment is pressed down and the purchase button 324 is then pressed down, the access request for purchasing the music to which the check mark is added in the radio button display region 322 is executed at the predetermined timing. For example, the predetermined timing is the same as the timing described in the example of FIG. 4. Thus, when the execution button 325 in the optimum environment is pressed down and the purchase button 324 is pressed down, the information used to execute the access request is stored in the process standby task information storage unit 280 shown in FIG. 3. In this case, information (purchase information) corresponding to the music that the user desires to purchase is stored as the purchase information 282. In this way, the access request stored in the process standby task information storage unit 280 is executed when the radio communication apparatus 200 arrives in the area where the radio communication quality satisfies the given condition. In this case, a billing process associated with the content item purchase can be executed at a timing at which the music content item is acquired by executing the access request at the predetermined timing.

Further, after the purchase button 324 is pressed down, a confirmation screen (for example, a confirmation screen displaying a message of "Do you really want to purchase?") may be displayed to prompt the user to purchase the music so that the user confirms the purchase by executing the confirmation operation on the confirmation screen. For example, the confirmation operation is an operation of pressing down the confirmation button on the confirmation screen.

Information regarding the plurality of albums searched from a signer name, a music title, or the like may be acquired and the albums extracted by searching the albums or the like may be displayed on the content item purchase request operation screen 320.

FIG. 6 shows the display example when the music content item are purchased. However, the above-described display example can be applied to a case where content items (content items acquired through download) such as game, book, movie content items or applications are purchased.

When the execution button 325 in the optimum environment is pressed down and the purchase button 324 is then pressed down, a given privilege may be provided to the user. For example, in the billing process, the privilege may be provided to the user by discounting a communication fee charged in the download or charging no communication fee in the download.

When the content item is downloaded, the user may be allowed to easily select the execution timing of the access request for accessing the access destination from which the content item is downloaded.

Notification Example of Process Standby Task

Figure 7A:
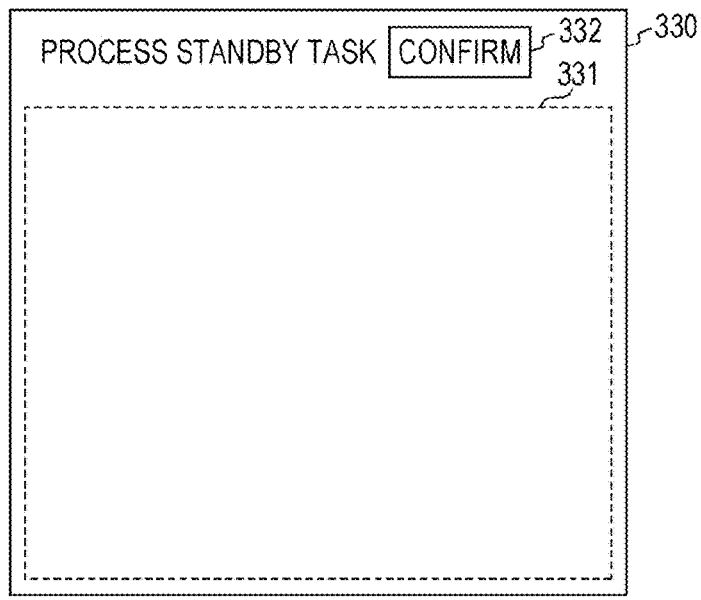
FIGS. 7A and 7B are diagrams illustrating display examples of process standby task notification screens displayed on the display unit according to the first embodiment of the present technology.
Figure 7B:
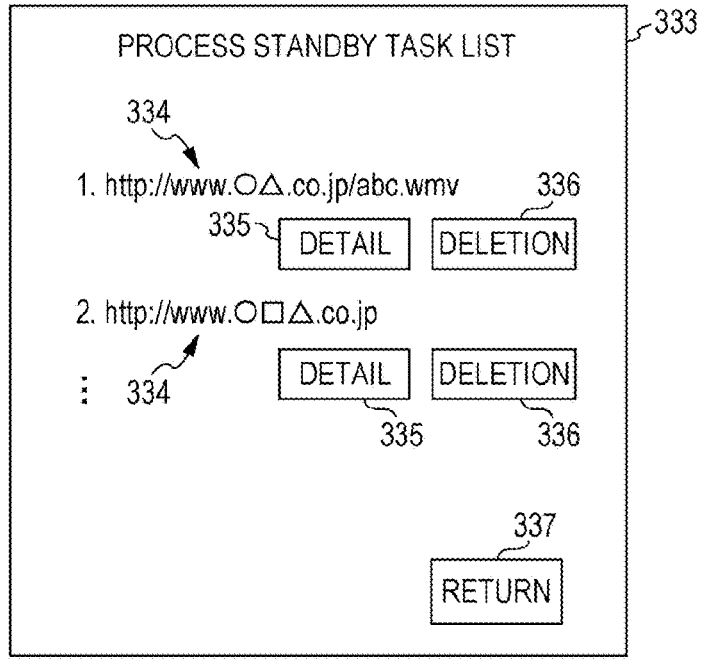

FIGS. 7A and 7B are diagrams illustrating display examples of process standby task notification screens displayed on the display unit 250 according to the first embodiment of the present technology. FIG. 7A shows a process standby task notification screen 330 used when the user is notified of the fact that the process standby task information is stored in the process standby task information storage unit 280 shown in FIG. 3.

The process standby task notification screen 330 has the display region 331 and the confirmation button 332. The display region 331 is a region in which information regarding functions (for example, a telephone call function and mail transmission and reception functions) executed in the radio communication apparatus 200 is displayed. In FIG. 7A, the details displayed in the display region 331 will not be described. Since dotted rectangular regions shown in FIGS. 8A and 8B and 9A and 9B are the same as the display region 331, the displayed details will not be described.

The confirmation button 332 is a button used to change the display region into a process standby task list display screen 333 shown in FIG. 7B. The confirmation button 332 is displayed when one or more pieces of process standby task information are stored in the process standby task information storage unit 280 shown in FIG. 3. That is, by displaying the confirmation button 332 on the display unit 250, the user can be notified of the fact that the process standby task information is stored in the process standby task information storage unit 280 shown in FIG. 3. The information regarding the fact is simply displayed in FIG. 7A. However, for example, another message, an icon, or the like indicating the fact may be displayed.

FIG. 7B shows the process standby task list display screen 333 configured to display a list of the process standby task information stored in the process standby task information storage unit 280 shown in FIG. 3. As described above, the process standby task list display screen 333 is displayed when the confirmation button 332 is pressed down.

The process standby task list display screen 333 has a process standby task information display region 334, a detail button 335, a deletion button 336, and a return button 337.

The process standby task information display region 334 is a region in which the process standby task information stored in the process standby task information storage unit 280 shown in FIG. 3 is displayed for each process standby task. For example, information (access destination information (for example, an URL or an IP address)) used to confirm the access destination associated with the process standby task is displayed as the process standby task information. In FIG. 7B, some of the process standby task information is not shown.

The detail button 335 is a detail button pressed when the detailed information of the process standby task information displayed in the process standby task information display region 334 is displayed. The detail button 335 is displayed for each process standby task.

The deletion button 336 is a deletion button pressed down when the process standby task information displayed in the process standby task information display region 334 is deleted. The deletion button 336 is displayed for each process standby task. That is, when the deletion button 336 is pressed down, the corresponding process standby task information is deleted from the process standby task information storage unit 280 shown in FIG. 3. In this way, when the process standby task information corresponding to the pressed deletion button 336 is deleted from the process standby task information storage unit 280, the access request associated with the process standby task is not executed.

After the deletion button 336 is pressed down, a confirmation screen configured to prompt the user to confirm the deletion may be displayed so that the necessary process standby task information is not erroneously deleted, and the deletion process may be performed after the user execute the conformation operation on the confirmation screen. For example, a message of "Do you really want to delete?" and a confirmation button may be displayed on the confirmation screen, so that the deletion operation may be confirmed when the confirmation button is pressed down.

Further, a radio button used for deletion may be provided in the respective process standby tasks so that a plurality of process standby tasks are simultaneously deleted on the process standby task list display screen 333. In this case, one deletion button is displayed on the process standby task list display screen 333. Then, when one or the plurality of process standby tasks are deleted, a check mark is added to the radio button (one button or a plurality of buttons) corresponding to the process standby task to be deleted, and then one deletion button is pressed down. Thus, it is possible to execute the deletion process of deleting one or the plurality of process standby tasks to which the check mark is added to the radio button.

In this way, the control unit 230 displays the list of the process standby task information stored in the process standby task information storage unit 280 on the display unit 250. The operation receiving unit 240 receives the deletion operation of deleting one or the plurality of process standby information among the list of the process standby task information displayed on the display unit 250. When the operation receiving unit 240 receives the deletion operation, the control unit 230 deletes the process standby task information associated with the deletion operation from the process standby task information storage unit 280.

Since the user can browse the access request registered in the process standby task at any time, the user can easily understand the details of the process standby task. When there is a certain access request desired not to be executed among the access requests registered in the process standby tasks, the access request desired not be executed can easily be deleted from the process standby task.

Notification Example of Access Request Process

FIGS. 8A and 8B and 9A and 9B are diagrams illustrating display examples of notification screens associated with the access request process displayed on the display unit 250 according to the first embodiment of the present technology.

Figure 8A:
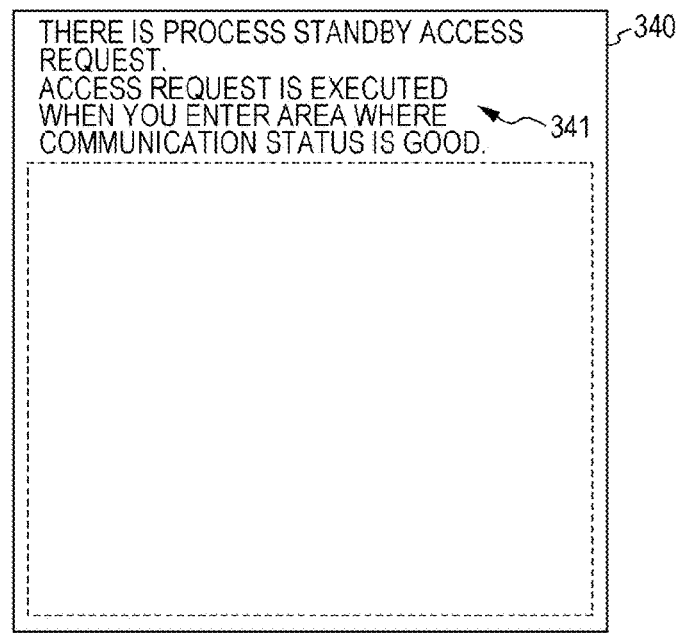
FIGS. 8A and 8B are diagrams illustrating display examples of notification screens regarding an access request process displayed on the display unit according to the first embodiment of the present technology.

FIG. 8A shows a process standby task notification screen 340 configured to notify the user that the process standby task information is stored in the process standby task information storage unit 280 shown in FIG. 3, when the process standby task information is stored in the process standby task information storage unit 280.

The process standby task notification screen 340 has a message display region 341. Since the display region indicated by a dotted rectangular shape is the same as the display region 331 shown in FIG. 7A, as described above, the description thereof will not be repeated. The message display region 341 is a region in which a message is displayed to notify the user that the process standby task information is stored in the process standby task information storage unit 280 shown in FIG. 3. Further, the confirmation button 332 shown in FIG. 7A may be displayed on the process standby task notification screen 340.

The process standby task notification screen 340 can be displayed on the display unit 250 until the user owning the radio communication apparatus 200 arrives in an area (an area where the radio communication quality satisfies the given condition) where a communication state is good. That is, the process standby task notification screen 340 can continuously be displayed on a part of the display unit 250 until a process (access request process) associated with the process standby task is executed.

For example, the process standby task notification screen 340 may continuously be displayed during a given time, and then may be cleared. In order to notify the user of the fact that the process standby task information is stored in the process standby task information storage unit 280 shown in FIG. 3, an icon or the like indicating the fact may be used instead of the characters. The process standby task notification screen 340 may continuously be displayed during a given time and may be then changed in its display form in order to easily execute another input operation by the use of the display screen on the display unit 250 during waiting the access request process. For example, a small mark (for example, a small icon) for notifying the user of the change in the display form may be displayed in an end portion (for example, a left upper portion) of the display screen on the display unit 250.

When the radio communication apparatus 200 determines that there is the area where the communication state is good, the radio communication apparatus 200 can execute the process (access request process) associated with the process standby task information stored in the process standby task information storage unit 280 shown in FIG. 3. When the access request process is being executed, a notification screen (a process standby task execution notification screen 342 shown in FIG. 8B) indicating the fact that the access request process is being executed is displayed on the display unit 250.

Figure 8B:
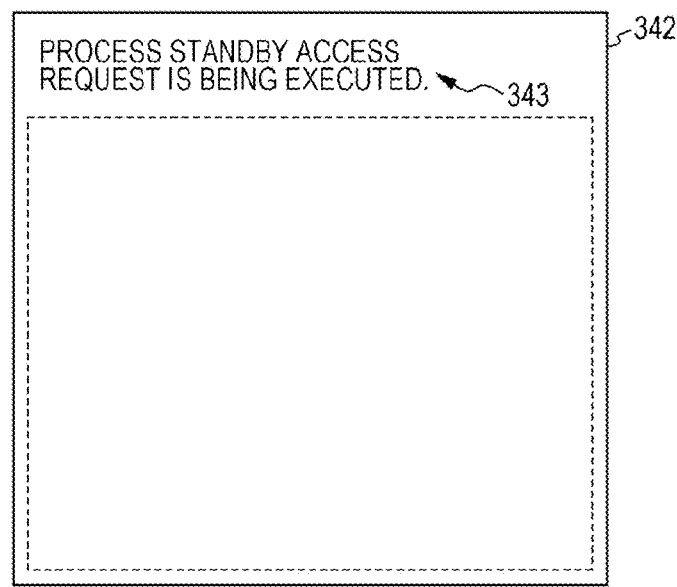

FIG. 8B shows process standby task execution notification screen 342 configured to notify the user of the fact that the process standby task associated with the process standby task information stored in the process standby task information storage unit 280 shown in FIG. 3.

The process standby task execution notification screen 342 has a message display region 343. Since the display region indicated by a dotted rectangular shape is the same as the display region 331 shown in FIG. 7A, as described above, the description thereof will not be repeated. The message display region 343 is a region in which a message is displayed to notify the user of the fact that the process (access request process) associated with the process standby task information stored in the process standby task information storage unit 280 shown in FIG. 3. In order to notify the user of the fact, an icon or the like indicating the fact may be used instead of the characters.

When the process associated with the process standby task information stored in the process standby task information storage unit 280 is terminated, a notification screen configured to notify the user of the termination of the process is displayed. For example, when the access request associated with the process standby task information is executed and the content item is completely downloaded from the access destination associated with the process standby task information, a notification screen (a process termination notification screen 344 shown in FIG. 9A) configured to notify the user of the determination of the access request is displayed on the display unit 250.

Figure 9A:
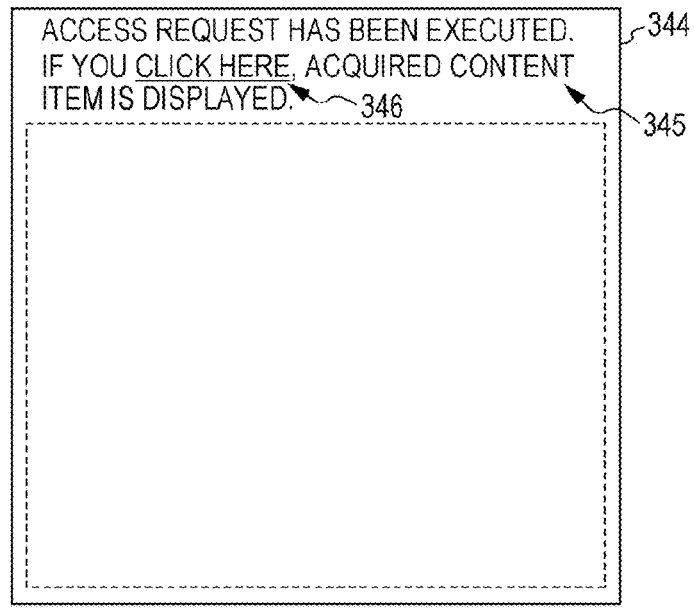
FIGS. 9A and 9B are diagrams illustrating display examples of notification screens regarding the access request process displayed on the display unit according to the first embodiment of the present technology.

FIG. 9A shows the process termination notification screen 344 configured to notify the user of the termination of the process (the access request process) associated with the process standby task information stored in the process standby task information storage unit 280 shown in FIG. 3.

The process termination notification screen 344 has a message display region 345. Since the display region indicated by a dotted rectangular shape is the same as the display region 331 shown in FIG. 7A, as described above, the description thereof will not be repeated.

The message display region 345 is a region in which a message is displayed to notify the user of the fact that the termination of the process (the access request process) associated with the process standby task information stored in the process standby task information storage unit 280 shown in FIG. 3. In order to notify the user of the termination of the process, an icon or the like indicating the termination of the process may be used instead of the characters. Further, in order to notify the user of the termination of the process, a notification method of outputting a sound may be used or a notification method of using vibration (for example, the vibration of a vibrator) of the radio communication apparatus 200 may be used. As the notification of outputting the sound, a part of music associated with the acquired content item may be output or a predetermined melody may be output.

Here, when a predetermined region 346 (character portion of "IF YOU CLICK HERE") of the message display region 345 is pressed down, a confirmation screen (for example, a confirmation screen 347 shown in FIG. 9B) configured to confirm the content item acquired through the terminated process can be displayed.

Figure 9B:
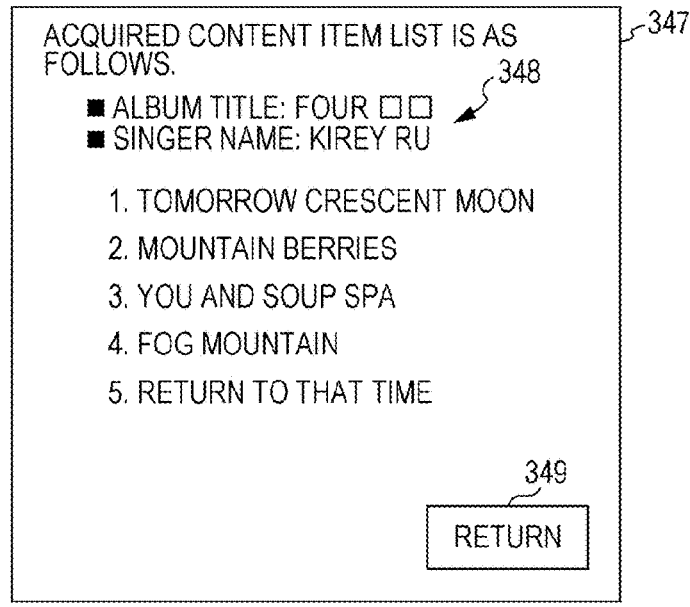

FIG. 9B shows the confirmation screen 347 configured to confirm the content item acquired through the process (the access request process) associated with the process standby task information stored in the process standby task information storage unit 280 shown in FIG. 3.

The confirmation screen 347 has a content item display region 348 and a return button 349.

The content item display region 348 is a region in which the information regarding the content item acquired through the process (the access request process) associated with the process standby task information stored in the process standby task information storage unit 280 shown in FIG. 3 is displayed. FIG. 9B shows an example in which a list of content items (content items associated with music) acquired using the content item purchase request operation screen 320 shown in FIG. 6 is displayed in the content item display region 348. For example, as the information regarding the acquired content items, information (for example, an album title and a singer name) regarding an album, information (for example, a music title) regarding each music of the album, and the like are displayed in the content item display region 348.

In this way, when the control unit 230 receives the second operation, the control unit 230 can display the fact that access request is executed at the timing, at which the predetermined condition is satisfied, on the display unit 250 until the access request operation is received and the access request is executed.

Process Example of Radio Communication Apparatus

Next, the operation of the radio communication apparatus 200 according to the first embodiment of the present technology will be described with reference to the drawings.

Figure 10:
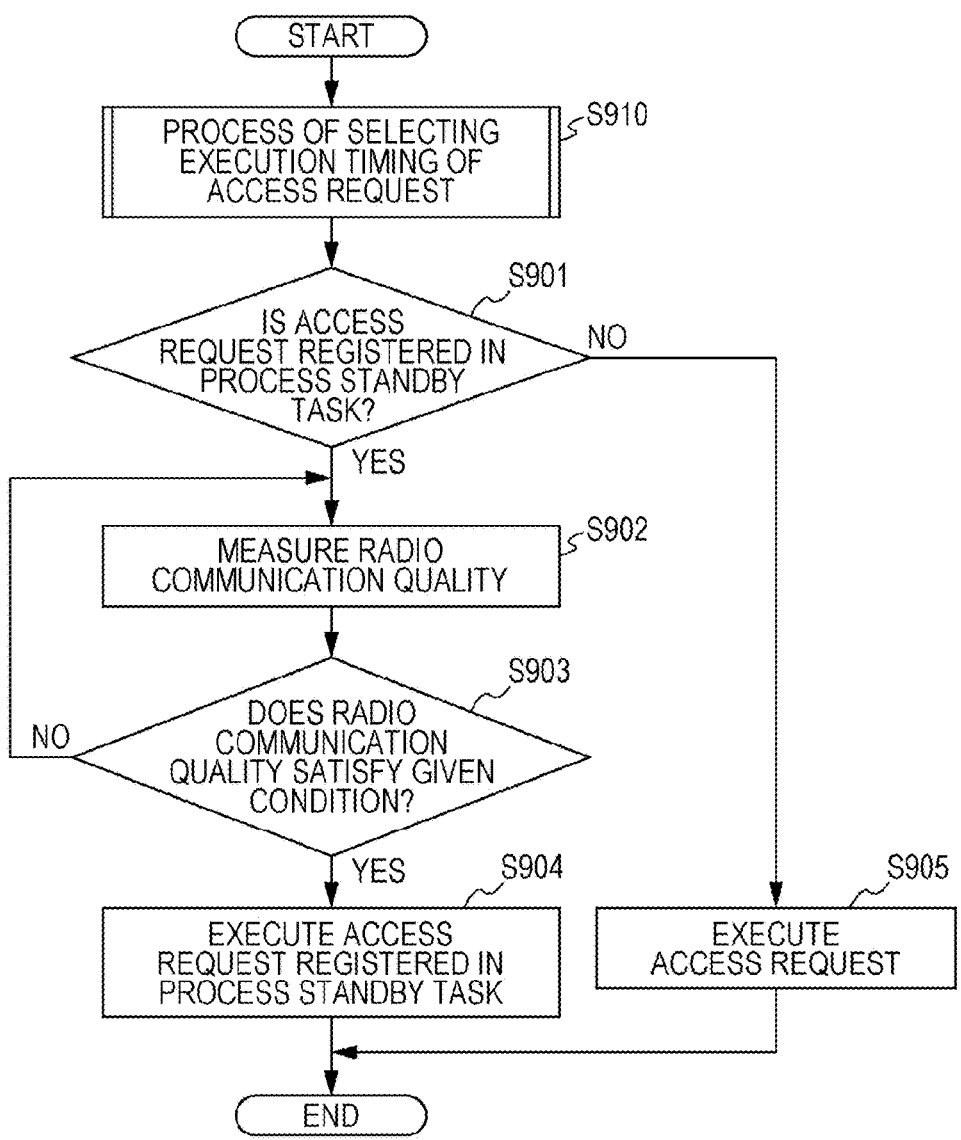
FIG. 10 is a flowchart illustrating an example of the processing sequence of a communication process performed by a radio communication apparatus according to the first embodiment of the present technology.

FIG. 10 is a flowchart illustrating an example of the processing sequence of a communication process performed by the radio communication apparatus 200 according to the first embodiment of the present technology.

First, a process of selecting the execution timing of the access request execution is performed (step S910). The process of selecting the execution timing of the access request execution will be described in detail with reference to FIG. 11. Step S910 is an example of a step of receiving a determination operation.

Subsequently, the control unit 230 determines whether the access request is registered in the process standby task (step S901). That is, the control unit 230 determines whether the process standby task information associated with the access request is stored in the process standby task information storage unit 280.

When the access request is stored in the process standby task (step S901), the control unit 230 measures the radio communication quality (step S902) and determines whether the radio communication apparatus is present within the range of the area where the radio communication quality satisfies the given condition (step S903). When the radio communication apparatus is not present within the range of the area where the radio communication quality satisfies the given condition (step S903), the control unit 230 continues to measure the radio communication quality (step S902).

On the other hand, when the radio communication apparatus is present within the range of the area where the radio communication quality satisfies the given condition (step S903), the control unit 230 executes the access request registered in the process standby task (step S904).

On the other hand, when the access request is not registered in the process standby task (step S901), the control unit 230 executes the access request (step S905). Steps S901 to S905 are an example of a step of controlling execution of the access request described in claim.

Figure 11:
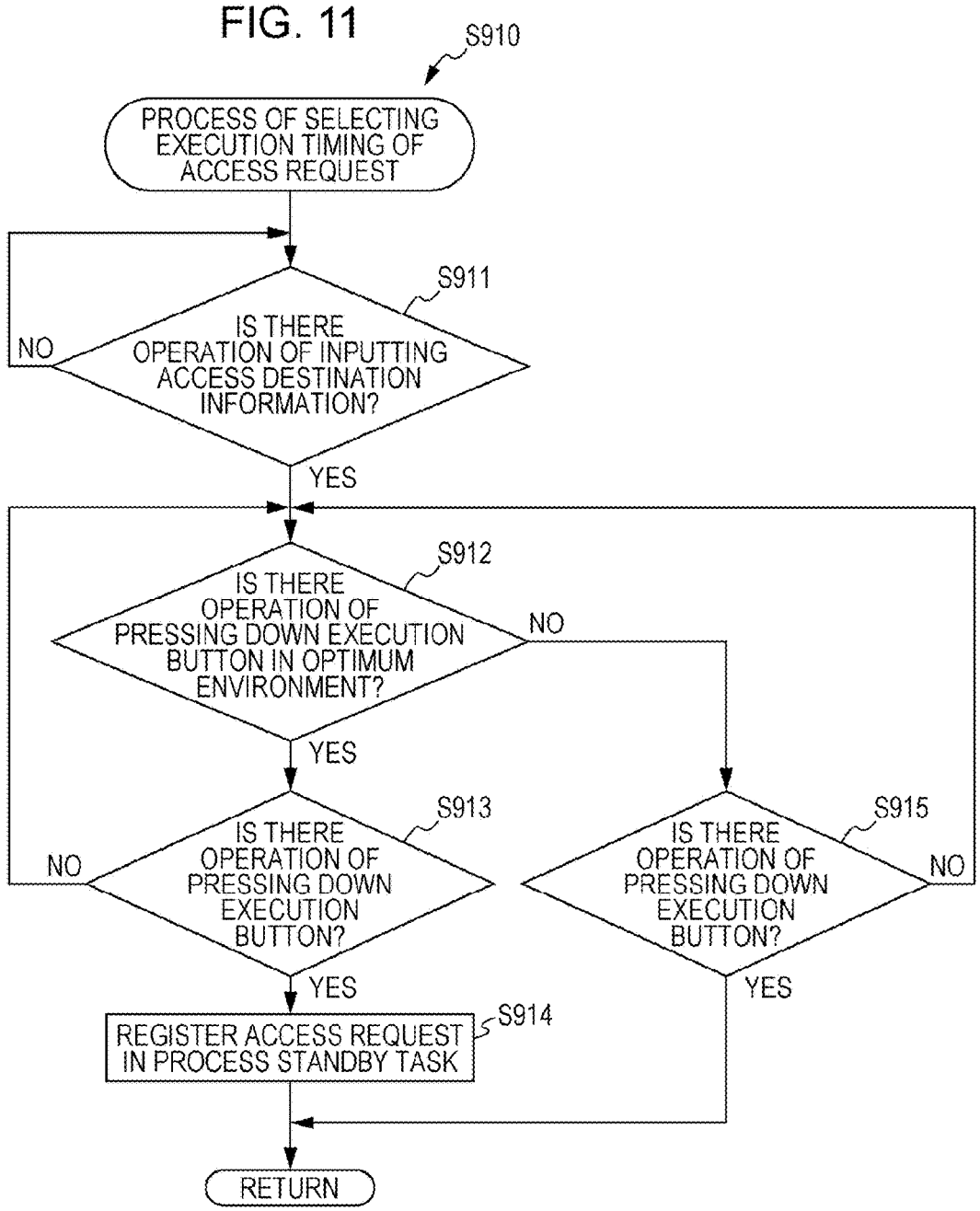
FIG. 11 is a flowchart illustrating a processing sequence of selecting an access request of an execution timing in the processing sequence of the communication process performed by the radio communication apparatus according to the first embodiment of the present technology.

FIG. 11 is a flowchart illustrating a processing sequence (the processing sequence of step S910 shown in FIG. 10) of selecting the execution timing of the access request in the processing sequence of the communication process performed by the radio communication apparatus 200 according to the first embodiment of the present technology. The processing sequence corresponds to the example shown in FIG. 4.

First, the control unit 230 determines whether the user executes an operation (for example, an operation of inputting the access destination information in the access destination information input region 301 shown in FIG. 4) of inputting the access destination information (step S911). When the user does not execute the operation of inputting the access destination information, a monitoring process continues. On the other hand, when the user executes the operation of inputting the access destination information (step S911), the control unit 230 determines whether the user executes a process of pressing down the execution button (for example, the execution button 303 in the optimum environment in FIG. 4) in the optimum environment (step S912).

When the user executes the process of pressing down the execution button in the optimum environment (step S912), the control unit 230 determines whether the user executes an operation of pressing down the execution button (for example, the execution button 302 shown in FIG. 4) (step S913). When the user does not execute the operation of the pressing down the execution button, the process returns to step S912. Even when the user does not execute the operation of the pressing down the execution button during a given period, the process may return to step S912. On the other hand, when the user executes the operation of the pressing down the execution button (step S913), the control unit 230 registers the access request associated with the input access destination information in the process standby task (step S914). That is, the process standby task information associated with the access request is stored in the process standby task information storage unit 280.

Even when the user does not execute the operation of the pressing down the execution button in the optimum environment (step S912), the control unit 230 determines whether the user executes the operation of pressing down the execution button (step S915). When the user does not execute the operation of pressing down the execution button, the process returns to step S912. On the other hand, when the user executes the operation of inputting the execution button (step S915), the process of selecting the execution timing of the access request is ended. That is, when the user does not execute the execution button in the optimum environment and executes the execution button, the access request is not registered in the process standby task.

Figure 12:
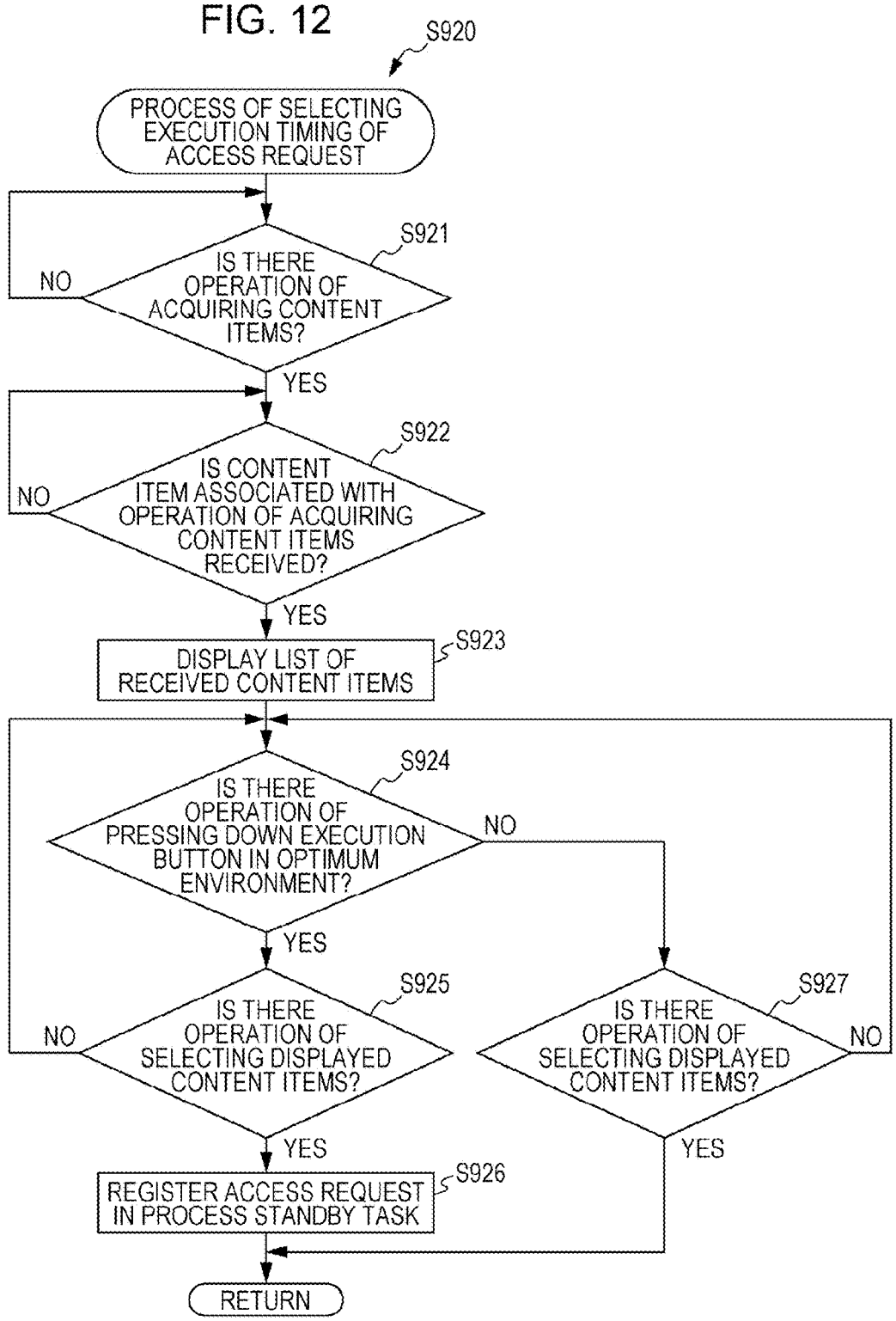
FIG. 12 is a flowchart illustrating a processing sequence of selecting the execution timing of the access request in the processing sequence of the communication process performed by the radio communication apparatus according to the first embodiment of the present technology.

FIG. 12 is a flowchart illustrating a processing sequence of selecting the execution timing of the access request in the processing sequence of the communication process performed by the radio communication apparatus 200 according to the first embodiment of the present technology. The processing sequence is a modified example (corresponding to step S910 in FIG. 10) of FIG. 11 and corresponds to the examples shown in FIGS. 5A and 5B.

First, the control unit 230 determines whether the user executes an operation (for example, the operation of inputting the access destination information into the access destination information input region 311 shown in FIGS. 5A and 5B and the operation of pressing down the execution button 312) of acquiring the content item (step S921). When the user does not execute the operation of acquiring the content item (step S921), the monitoring process continues.

On the other hand, when the user executes the operation of acquiring the content items (step S921), the control unit 230 determines whether the content item associated with the operation of acquiring the content items (for example, content item list information) is received (step S922). When the content item associated with the operation of acquiring the content items is not received (step S922), the monitoring process continues.

On the other hand, when the content item associated with the operation of acquiring the content items is received (step S922), the control unit 230 displays the list of the received content items on the display unit 250 (step S923). For example, the content item acquisition request operation screen 315 is displayed as in FIG. 5B.

Subsequently, the control unit 230 determines whether the user executes the operation of pressing down the execution button (for example, the execution button 317 in the optimum environment in FIG. 5B) in the optimum environment (step S924).

When the user executes the operation of pressing down the execution button in the optimum environment (step S924), the control unit 230 determines whether the user executes an operation (for example, the operation of pressing down each image shown in FIG. 5B) of selecting the displayed content item (step S925). When the user does not execute the operation of selecting the content item (step S925), the process returns to step S924. Further, even when the user does not execute the operation of selecting the content item, the process may return to step S924. On the other hand, when the user executes the operation of selecting the content item (step S925), the control unit 230 registers the access request associated with the acquisition of the selected content item in the process standby task (step S926). That is, the process standby task information associated with the access request is stored in the process standby task information storage unit 280.

Even when the user does not execute the operation of pressing down the execution button in the optimum environment (step S924), the control unit 230 determines whether the user executes an operation of selecting the displayed content item (step S927). When the user does not execute the operation of pressing down the execution button in the optimum environment (step S927), the process returns to step S924. On the other hand, when the user executes the operation of pressing down the execution button in the optimum environment (step S925), the process of selecting the execution timing of the access request is ended. That is, when the user does not execute the operation of pressing down the execution button in the optimum environment and executes the operation of selecting the displayed content item, the access request is not registered in the process standby task.

Example in which Content Item Synchronization is Applied

The example has hitherto been described in which the access to the content items is gained via the predetermined network or the content items are acquired. Hereinafter, an example will be described in which content items (files) are synchronized via the predetermined network. Here, the synchronization of the content items (files) means that the content items (files) stored in another apparatus (for example, the content item providing server 120) other than the radio communication apparatus 200) are synchronized with the content items (files) stored in the radio communication apparatus 200. For example, it is supposed that the news are automatically updated in a portable media player capable of reproducing content items such as music, moving images, and still images or automatic synchronization is achieved between the portable media player and an information processing apparatus (for example, a personal computer) through wired connection.

Display Example of File Synchronization Operation Screen

Figure 13:
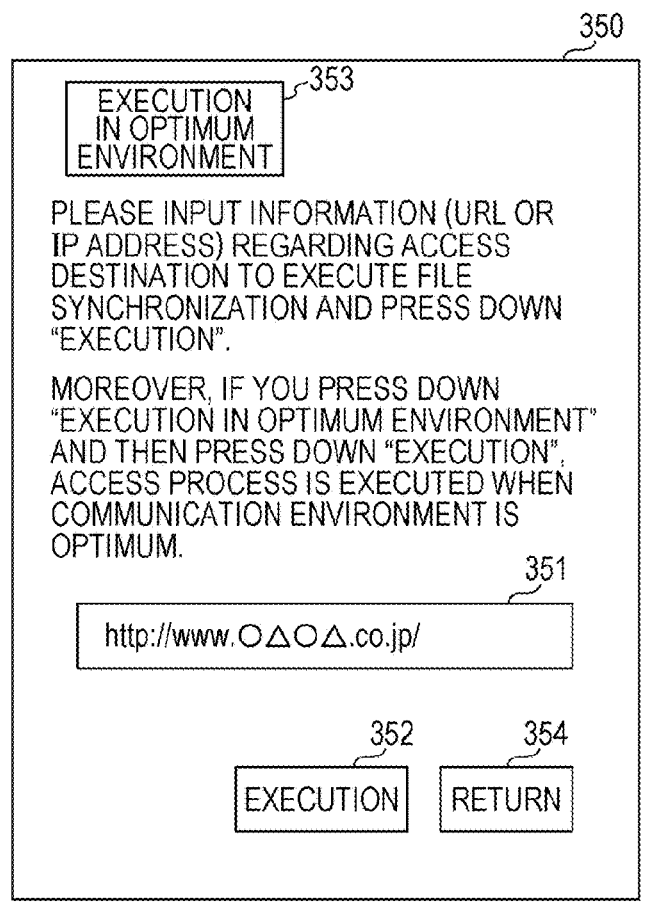
FIG. 13 is a diagram illustrating a display example of a file synchronization operation screen displayed on the display unit according to the first embodiment of the present technology.

FIG. 13 is a diagram illustrating a display example of a file synchronization operation screen displayed on the display unit 250 according to the first embodiment of the present technology. A file synchronization operation screen 350 shown in FIG. 13 is a display screen configured to execute an access request for accessing a desired access destination (for example, the content item providing server 120) via a predetermined network (for example, the network 110) and executing a file synchronization process.

The file synchronization operation screen 350 haw an access destination information input region 351, an execution button 352, an execution button 353 in the optimum environment, and a return button 354. Since the access destination information input region and these buttons correspond to the access destination information input region and the buttons shown in FIG. 4, the description of the common region and buttons to the region and the buttons shown in FIG. 4 will not be partially described.

The execution button 352 is a button which is pressed down at the time of executing the access request for accessing the access destination associated with the access destination information input into the access destination information input region 351 and executing the file synchronization process. Further, the timing at which the access request is executed is different depending on whether the execution button 353 in the optimum environment is pressed down, before the execution button 352 is pressed down.

The execution button 353 in the optimum environment is a button which is pressed down to select the execution of the access request for accessing the access destination associated with the access destination information input into the access destination information input region 351 and executing the file synchronization process under the condition that the radio communication environment is optimum.

For example, when the execution button 353 in the optimum environment is not pressed down and the execution button 352 is pressed down, the access request for accessing the access destination associated with the access destination information input into the access destination information input region 351 is executed at a synchronization setting time after the execution button 352 is pressed down. On the other hand, for example, when the execution button 353 in the optimum environment is pressed down and the execution button 352 is then pressed down, the access request for accessing the access destination associated with the access destination information input into the access destination information input region 351 is executed at a predetermined timing. That is, when the execution button 353 in the optimum environment is pressed down and the execution button 352 is then pressed down, the file synchronization process is executed at a time (the predetermined timing) other than the synchronization setting time.

In this way, the execution button 352 is a button for executing the file synchronization process. The execution button 353 in the optimum environment is a button for selecting the execution of the file synchronization process at the synchronization setting time or the execution of the file synchronization process at a predetermined timing. Further, when the content times (files) are synchronized between the radio communication apparatus 200 and an arbitrary server, the user can easily select the timing at which the access request for accessing the server is executed to download the content items (files).

Here, the files to be synchronized can be stored in, for example, the memory 290. When the execution button 353 in the optimum environment is not pressed down and the execution button 352 is pressed down, the control unit 230 executes the access request for the synchronization process at the synchronization setting time after the execution button 352 is pressed down. On the other hand, when the execution button 353 in the optimum environment is pressed down and the execution button 352 is pressed down, the synchronization setting time elapses and the control unit 230 then executes the access request at the timing at which the predetermined condition is satisfied.

Process Example of Radio Communication Apparatus

Figure 14:
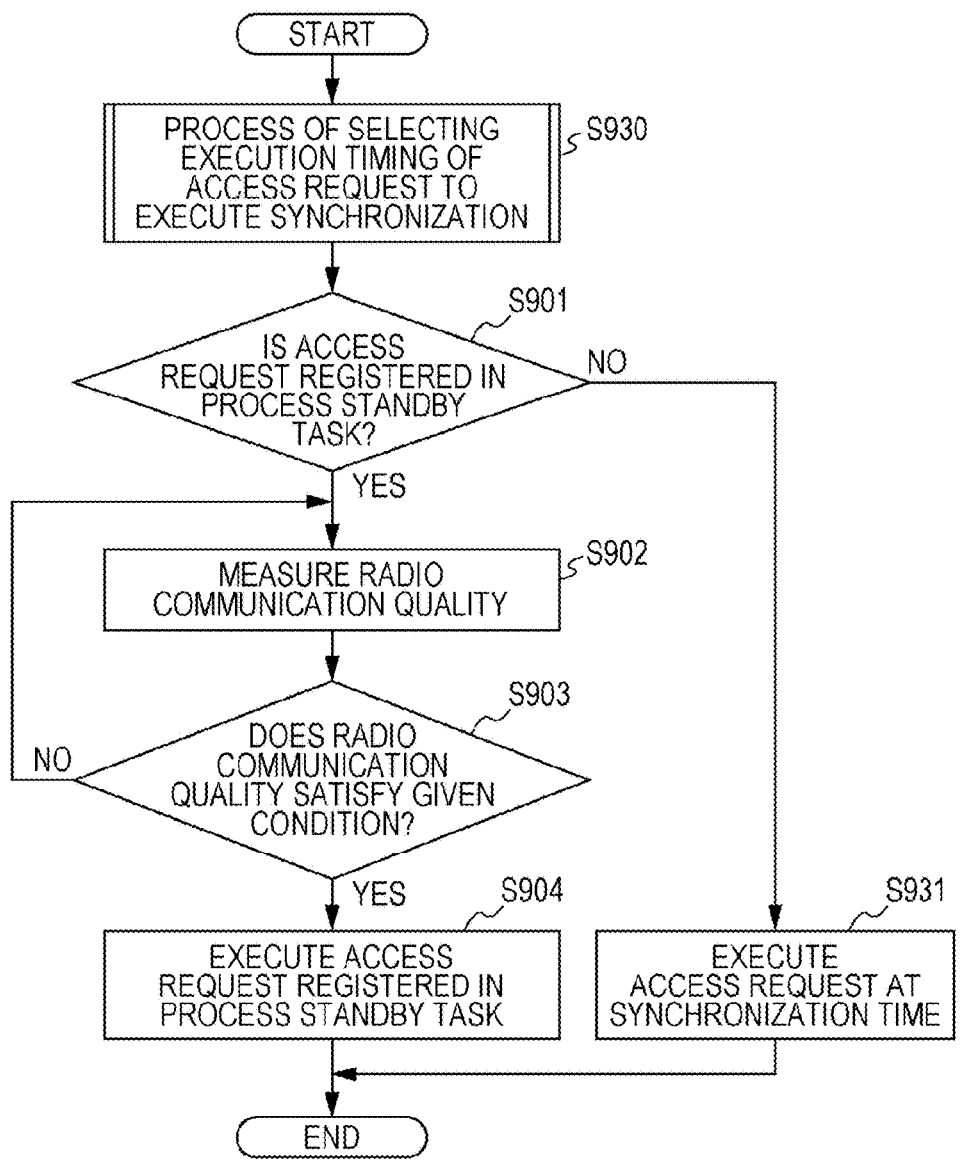
FIG. 14 is a flowchart illustrating an example of the processing sequence of a communication process performed by the radio communication apparatus according to the first embodiment of the present technology.

FIG. 14 is a flowchart illustrating an example of the processing sequence of a communication process performed by the radio communication apparatus 200 according to the first embodiment of the present technology. Since the processing sequence is a modified example of FIG. 10, the same reference numerals are given to the common portions to those of FIG. 10 and the description thereof will not be partially repeated.

First, the process of selecting the execution timing of the access request for synchronization is executed (step S930). Since the process of selecting the execution timing is substantially the same as the process in FIG. 11, the description thereof will not be repeated.

When the access request is not registered in the process standby task (step S901), the control unit 230 executes the access request at the synchronization setting time (step S931). That is, the file synchronization process is executed at the synchronization setting time.

When the access request is registered in the process standby task (step S901), the file synchronization process is executed at a time (predetermined timing) other than the synchronization setting time (steps S902 to S904).

In this example, an exemplary step (step S914 shown in FIG. 11) of registering the access request for synchronization in the process standby task after the execution button is pressed down (step S913 shown in FIG. 11) has hitherto been described. However, the access request for synchronization may be registered in the process standby task at the synchronization setting time after the execution button is pressed down.

In this example, the file synchronization process is executed at one synchronization setting time. However, even in the file synchronization process performed a plurality of times at a periodic interval or a non-periodic interval, the access request for synchronization may be registered in the process standby task and the file synchronization process may be executed using the synchronization time as a reference.

When the synchronization setting time is not set, the current time may be set as the synchronization setting time.

Display Example of Optimum Area

The example has hitherto been described in which the access request is executed at the timing at which the radio communication quality satisfies the given condition. Hereinafter, it is supposed that the execution of the access request is selected at the timing at which the radio communication quality satisfies the given condition. In this case, it is supposed that the user owning the radio communication apparatus 200 can scarcely grasp the area where the radio communication quality satisfies the given condition and can also scarcely recognize a timing at which the access request is executed. Accordingly, in this example, the area where the radio communication quality satisfies the given condition is shown. Thus, since the user can easily grasp the area where the radio communication quality satisfies the given condition, the user can recognize a timing at which the access request is executed.

Figure 15:
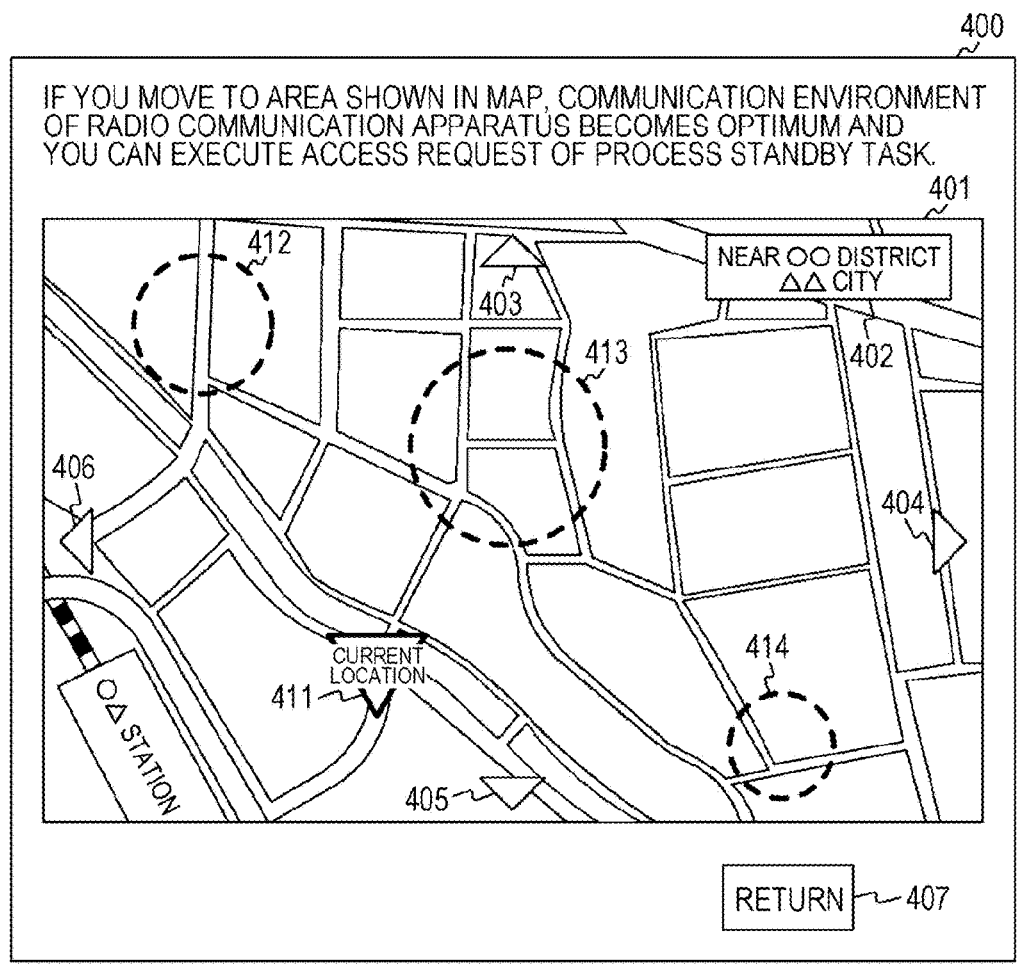
FIG. 15 is a diagram simply illustrating an example of a display screen displayed on the display unit according to the first embodiment of the present technology.

FIG. 15 is a diagram simply illustrating an example of a display screen displayed on the display unit 250 according to the first embodiment of the present technology.

An optimum area guide map display screen 400 shown in FIG. 15 is a screen configured to overlap the location of the radio communication apparatus 200 and an area where the communication environment of the radio communication apparatus 200 is optimum on a map. In order to facilitate the description in FIG. 15, the map is simply shown.

The optimum area guide map display screen 400 can be displayed after the user executes a specific operation (for example, an operation of pressing down a specific button) or executes the operation of pressing down the execution button in the optimum environment and then execution button. After the operation of pressing down the execution button, the screen can be displayed only for a given time (for example, 1 minute). For example, by displaying the optimum area guide map display screen 400 before the operation of pressing down the execution button, the user can appropriately determine whether to press down the execution button in the optimum environment.

Map information for displaying the map included in the optimum area guide map display screen 400 is stored in the memory 290. When the user executes an input operation of displaying the optimum area guide map display screen 400, the control unit 230 acquires the map information for displaying the map (the map containing the location of the radio communication apparatus 200) to be displayed from the memory 290. The position of the radio communication apparatus 200 can be acquired based on the position information acquired by the position information acquiring unit 220. Further, the map information may be stored in a map information storage apparatus other than the radio communication apparatus 200 and the radio communication apparatus 200 may acquire the map information from the map information storage apparatus via a network such as the Internet. In the area where the radio communication quality satisfies the given condition, map information regarding the neighborhood may be acquired frequently using the position information of the radio communication apparatus 200 and the acquired map information may be used. For example, the map information may be synchronized with the map information storage apparatus through the above-described content item synchronization process.

The optimum area guide map display screen 400 has a map display region 401 and a return button 407. The neighborhood map of the location of the radio communication apparatus 200 is displayed in the map display region 401. An address display region 402, arrow buttons 403 to 406, a current location mark 411, and optimum area marks 412 to 414 are displayed on the map displayed in the map display region 401.

The name (for example, an address or a symbol mark name) of a district displayed on the optimum area guide map display screen 400 is displayed in the address display region 402.

The arrow buttons 403 to 406 are buttons that are pressed down when the map displayed on the optimum area guide map display screen 400 is moved in one of the upper, lower, right, and left directions.

The current location mark 411 is a mark that indicates the location of the radio communication apparatus 200. The optimum area marks 412 to 414 are marks that indicate the area where the communication environment of the radio communication apparatus 200 is optimum. In order to facilitate the description, the optimum area marks 412 to 414 are indicated by a dotted circle in FIG. 15, but may be displayed in different shapes in accordance the areas.

The optimum area marks may be displayed using different colors based on the signal strengths of the respective areas. For example, a blue color is used to display the optimum area mark associated with the area where the signal strength is strong and the signal strength may be displayed with fainter shading of the blue color in accordance with the weaker signal strength. Alternatively, for example, the signal strength of each area may be displayed with the type of color like the rainfall display of weather forecast.

The area where the communication environment of the radio communication apparatus 200 can be calculated based on optimum area information transmitted from an information processing apparatus (for example, the network control apparatus 130). For example, the information processing apparatus acquires radio communication quality information (information regarding the radio communication quality) and position information (the current position of the radio communication apparatus) from a plurality of radio communication apparatuses. Then, the information processing apparatus detects the area with a predetermined radio communication quality based on the acquired radio communication quality information and the acquired position information and transmits information regarding the detected area with the predetermined radio communication quality as optimum area information to each radio communication apparatus. Alternatively, the radio communication apparatus 200 may acquire the signal strength information of a target base station in each area from the information processing apparatus and may detect the area, where the predetermined radio communication quality is ensured, based on the signal strength information and the congestion information of the base station detected by the radio communication apparatus 200.

Alternatively, the radio communication apparatus 200 may acquire the radio communication quality information and the position information from a plurality of other radio communication apparatuses and may detect the area, where the predetermined radio communication quality is ensured, based on the acquired radio communication quality information and the position information. That is, the radio communication apparatus 200 can detect the area where the predetermined radio communication quality is ensured and the control unit 230 can display the detected area on the display unit 250.

In this way, the control unit 230 can comprehend the fact that the area where the radio communication apparatus 200 is located is an area with the predetermined radio communication quality by directly detecting the area based on the information acquired from other radio communication apparatuses. Further, the control unit 230 can comprehend the fact that the area where the radio communication apparatus 200 is located is an area with the predetermined radio communication quality by receiving the optimum area information detected by the information processing apparatus (for example, the network control apparatus 130). Then, the control unit 230 can display the comprehended area on the display unit 250. That is, the control unit 230 can acquire area information regarding the fact that the area where the radio communication apparatus 200 is located is an area with the predetermined radio communication quality and can display the area with the predetermined radio communication quality on the display unit 250 based on the acquired area information.

In FIG. 15, the example has hitherto been described in which the optimum area marks are displayed on the map displayed in the map display region 401. However, a predicted path of the radio communication apparatus 200 may be calculated and only an optimum area mark associated with the neighborhood containing the predicted path may be displayed.

Hereinafter, a method of calculating the predicted path will be described. For example, the current position and the radio communication apparatus 200 and the current time are acquired. Then, when the past movement history (or the movement history of another user) of the radio communication apparatus 200 is used, it is possible to predict the movement path of the user owning the radio communication apparatus 200 based on the current position of the radio communication apparatus 200 and the current time.

For example, the probabilities that the user moves along a plurality of movement routes of the user at the current time and the current day of the week are calculated using the past movement history and the movement route with the highest probability is extracted. Alternatively, by using a learning algorithm or the like of the Markov model, the movement route may be predicted among the movement route candidates calculated from the past movement history in accordance with the current state (or the state during a given period up to the present time).

As well as the prediction method of predicting the movement route and a destination only using the past movement history, it is possible to use a method of calculating the future schedule by analyzing personal content items such as a schedule, an electronic mail, and a memo note and predicting the destination. In this way, it is possible to predict the future movement path of the user based on the current place of the user and the current time.

The map scale displayed on the map display region 401 may be changed based on an operation of the user. Alternatively, maps may be changed in sequence as the radio communication apparatus 200 is moved.

Example of Time Limit Until Execution of Access Request

The example has hitherto been described in which the access request is executed at the timing at which the communication environment of the radio communication apparatus is optimum. However, it is supposed that some users desire the access request until a given time since some users have content items until the given time. For example, it is supposed that a user desire to acquire and listen to music content items while walking toward a subway station in the morning. In this case, for example, it is supposed that the user executes the access request before leaving the home in the morning, and thus the user desires to download and have the music content item until arriving at the subway station. Accordingly, by limiting the time until executing the access request, the content item can easily be acquired within the user's desiring time.

Figure 16:
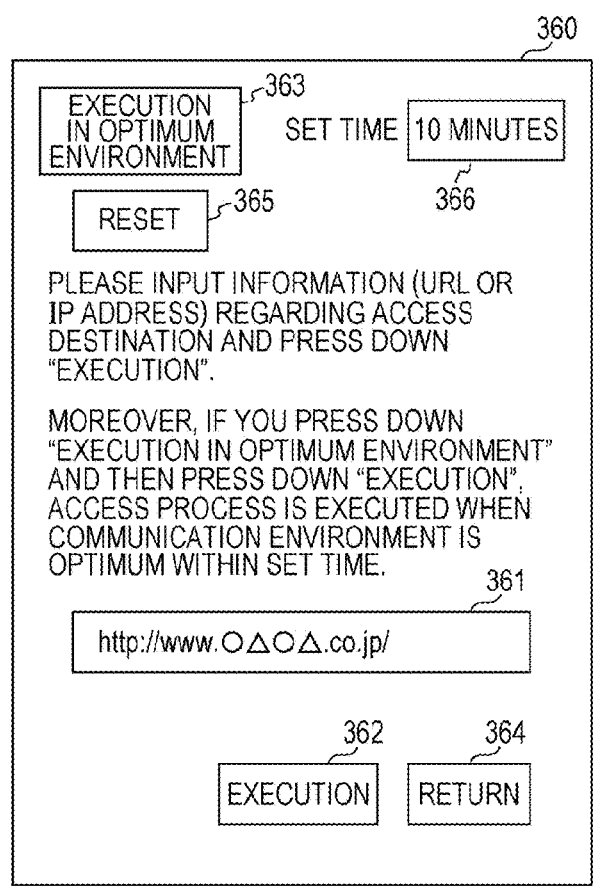
FIG. 16 is a diagram illustrating a display example of the access request operation screen displayed on the display unit according to the first embodiment of the present technology.
Figure 17:
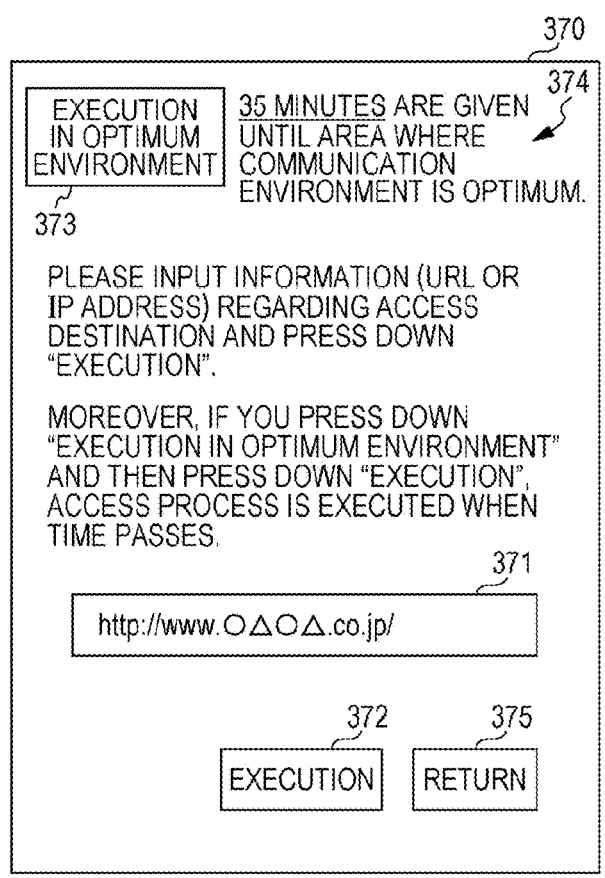
FIG. 17 is a diagram illustrating a display example of the access request operation screen displayed on the display unit according to the first embodiment of the present technology.

FIGS. 16 and 17 are diagrams illustrating display examples of access request operation screens displayed on the display unit 250 according to the first embodiment of the present technology.

FIG. 16 shows an access request operation screen 360 configured to execute an access request for accessing a desired access destination (for example, the content item providing server 120) via a predetermined network (for example, the network 110).

The access request operation screen 360 has an access destination information input region 361, an execution button 362, an execution button 363 in the optimum environment, a return button 364, a reset button 365, and a set time display region 366. Further, the access request operation screen 360 is a modified example of the access request operation screen 300 shown in FIG. 4. the access request operation screen 360 is different from the access request operation screen 300 in that the reset button 365 and the set time display region 366 are added and displayed. Therefore, in this example, the difference from the access request operation screen 300 will be mainly described and the common portions will not be partially described.

The execution button 363 in the optimum environment is a button that is used when the time limit is set and corresponds to the execution button 303 in the optimum environment in FIG. 4. That is, whenever the execution button 363 in the optimum environment is pressed down, the time limit to be set can be added (for example, whenever the execution button 363 in the optimum environment is pressed down once, 5 minutes are added). The time limit set through the operation of pressing down the execution button 363 in the optimum environment is displayed in the set time display region 366. Further, when the execution button 363 in the optimum environment is continuously pressed down only a given number of times (for example, ten times), the time limit may not be set. In this case, "no time limit" is display in the set time display region 366.

The reset button 365 is a button used when the set time limit is configured to return to the initial state. That is, when the reset button 365 is pressed down, the set time limit is set to 0 minute and "0 minute" is displayed in the set time display region 366.

The set time display region 366 is a region in which the time limit set through the operation of pressing down the execution button 363 in the optimum environment is displayed.

In this way, when the time limit is set in the access request operation screen 360, the set time limit is stored in the time limit information 283 of the process standby task information storage unit 280 shown in FIG. 3. In this way, the access request stored in the process standby task information storage unit 280 is executed within the time limit stored in the time limit information 283. For example, when the radio communication apparatus does not arrive in an optimum area within the set time limit, the access request can be executed at the end time of the time limit. When the time limit is set, a threshold value used to determine the area where the communication environment is optimum may be changed in accordance with the length of the time limit. For example, the threshold value used to determine the area where the communication environment is optimum is set to be lower, as the time limit is shorter.

When the path can be predicted within the time limit and the communication quality in the predicted path can be predicted and the radio communication apparatus arrives in the area where the communication quality is the best in the path, the access request may be executed.

In FIG. 16, the example has hitherto been described in which the time limit is set through the operation of pressing down the execution button 363 in the optimum environment. However, the time limit may be set through another operation method. For example, a "↑" button and a "↓" button may be provided on the access request operation screen 360 and the time limit may be set through an operation of pressing down the "↑" button and the "↓" button. In this case, for example, when the "↑" button is pressed down, the value of the time limit is increased. When the "↓" button is pressed down, the value of the time limit is decreased. Further, the value of the time limit may be input through a manual operation (for example, an input operation executed with numerical keys) of the user.

FIG. 17 shows an access request operation screen 370 configured to execute the access request for accessing the desired access destination via the predetermined network.

The access request operation screen 370 has an access destination information input region 371, an execution button 372, an execution button 373 in the optimum environment, a time display region 374, and a return button 375. The access request operation screen 370 is a modified example of the access request operation screen 300 shown in FIG. 4. The access request operation screen 370 is different from the access request operation screen 300 in that the time display region 374 is added and displayed. Therefore, in this example, the difference from the access request operation screen 300 will be mainly described and the common constituents will not be partially described.

The time display region 374 is a region used to display a time (necessary time) necessary until the radio communication apparatus 200 arrives in the area (the area where the radio communication quality satisfies the given condition) where the communication environment is optimum. The control unit 230 can calculate the time displayed in the time display region 374 based on the above-described predicted path and optimum.

For example, as described above, the movement path is predicted, and then the area where the radio communication quality is good along the movement path is detected. Then, the average movement speed is calculated based on movement history information and a movement method (such as walking or movement by a subway) is determined. An arrival prediction time to the detected area (the where with an excellent radio communication quality) can be calculated using the determination result (for example, the movement speed of 80 mm/minute in the walking or the movement speed of 40 km/hour in the movement by a subway). The movement method may be displayed together with the necessary time in the time display region 374. For example, a message "20 minutes by walking or 2-4 minutes by a subway" is displayed.

The radio communication apparatus 200 acquires optimum area information at a periodic interval or a non-periodic interval and the time can be updated whenever the optimum area information is acquired. The information processing apparatus (for example, the network control apparatus 130) may calculates the time displayed in the time display region 374 and may transmit the calculated time information to the radio communication apparatus 200.

By displaying the necessary time on the access request operation screen 370, the user can select the immediate execution of the access request. Alternatively, when the user selects the execution in the area where the communication environment is optimum, the user can use the necessary time as an index.

Example in which Radio Communication Fee is Determined as Determination Reference The example has hitherto been in which the access request is executed in the area where the radio communication quality satisfies the given condition. However, it is supposed that some users value a radio communication fee over than the radio communication quality. Accordingly, FIG. 18 shows an example in which the user executes an access request in an area where the radio communication fee satisfies a given condition.

Figure 18:
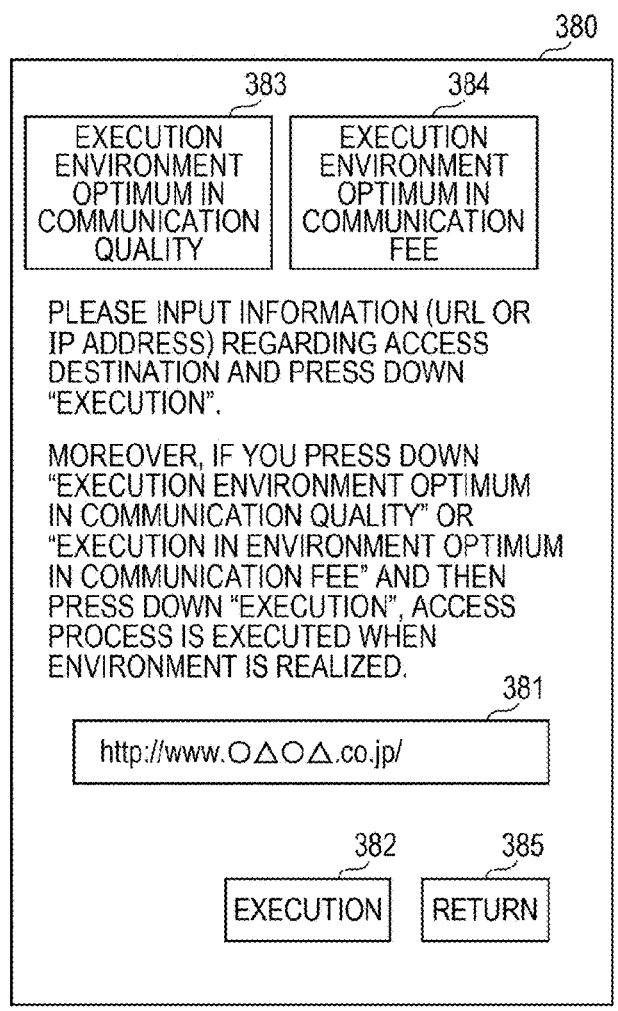
FIG. 18 is a diagram illustrating a display example of the access request operation screen displayed on the display unit according to the first embodiment of the present technology.

FIG. 18 is a diagram illustrating a display example of an access request operation screen displayed on the display unit 250 according to the first embodiment of the present technology. An access request operation screen 380 shown in FIG. 18 is an access request operation screen configured to execute an access request for accessing a desired access destination (for example, the content item providing server 120) via a predetermined network (for example, the network 110).

The access request operation screen 380 has an access destination information input region 381, an execution button 382, an execution button 383 in an environment optimum in communication quality, an execution button 384 in an environment optimum in communication fee, and a return button 385. The access request operation screen 380 is a modified example of the access request operation screen 300 shown in FIG. 4. The access request operation screen 380 is different from the access request operation screen 300 in that the execution button 384 in the environment optimum in communication fee is added and displayed. Further, the access request operation screen 380 is different from the access request operation screen 300 in that the execution button 383 in the environment optimum in communication quality is added instead of the execution button 303 in the optimum environment. Therefore, in this embodiment, the differences from the access request operation screen 300 will be described and the description of the common portions will not be partially repeated.

The execution button 383 in the environment optimum in communication quality is a button corresponding to the execution button 303 in the optimum environment in FIG. 4.

The execution button 384 in the environment optimum in communication fee is a button that is pressed down to select the execution of the access request for accessing the access destination associated with the access destination information input into the access destination information input region 381 under the environment optimum in communication fee. Here, for example, the environment optimum in communication fee means an area where the radio communication fee satisfies the given condition.

For example, it is supposed that the execution button 383 in the environment optimum in communication quality and the execution button 384 in the environment optimum in communication fee are not pressed down and the execution button 382 is pressed down. In this case, the access request for accessing the access destination associated with the access destination information input into the access destination information input region 381 is executed immediately after the execution button 382 is pressed down. On the other hand, for example, when the execution button 384 in the environment optimum in communication fee is pressed down and the execution button 382 is then pressed down, the access request for accessing the access destination associated with the access destination information input into the access destination information input region 381 is executed only in a case where the radio communication fee satisfies a given condition. The case where the radio communication fee satisfies the given condition is a case where the communication fee associated with the access request is equal to or less than a user's desiring fee (for example, 10 yen). Therefore, when the execution button 384 in the environment optimum in communication fee is pressed down and the execution button 382 is then pressed down, information used to execute the access request is stored in the process standby task information storage unit 280 shown in FIG. 3. In this case, selection information (communication cost) indicating that the execution button 384 in the environment optimum in communication fee is selected as the information used to execute the access request is stored in the selection information 284 of the process standby task information storage unit 280 shown in FIG. 3. In this way, the access request stored in the process standby task information storage unit 280 is executed when the radio communication apparatus 200 is located in the area where the radio communication fee satisfies the given condition.

When the process standby task information ("communication fee" in the selection information 284) is stored in the process standby task information storage unit 280, the fact (for example, characters "ACCESS IS BEING SELECTED IN AREA WHERE RADIO COMMUNICATION QUALITY IS GOOD") that the process standby task information is stored in the process standby task information storage unit 280 may be displayed on the display unit 250.

In many cases, when the communication service provider is the same, the radio communication fee is the same in the area corresponding to the base station administrated by the communication service provider. However, it is supposed that the radio communication fee is changed in accordance with the distance between the radio communication apparatus and the base station.

For example, it is supposed that a service of the same communication rate is supplied to the radio communication apparatus located relatively near the base station and the radio communication apparatus located relatively away from the base station. In this case, a multi-leveled signal of a higher encoding ratio can be used for a resource allocated to the radio communication apparatus located relatively near the base station. Therefore, the resource allocated to the radio communication apparatus located relatively near the base station is smaller than a resource allocated to the radio communication located relatively away from the base station. Thus, in consideration of the load on the base station, the radio communication fee may be changed and set in accordance with the distance between the radio communication apparatus and the base station. For example, a low communication fee can be set in the area relatively close to the base station and a high communication fee can be set in the area relatively distant from the base station.

For example, when the communication fee is introduced in the future in accordance with a traffic state (a price is determined based on a demand and a supply), an area in which the traffic of the base station is relatively low can be set as an area where the communication fee is low. In this case, based on the congestion degree of the base station calculated from the signal transmitted by the base station, the control unit 230 can calculate the radio communication fee of the area where the radio communication apparatus 200 is located.

A method of calculating the distance between the radio communication apparatus and the base station can be considered based on a path-loss, a reception level of a pilot signal, the RSSI, the SIR of a synchronization signal, or the acquired position information as the information regarding the distance between the radio communication apparatus and the base station. The communication fee predicted based on the congestion degree of the base station can be predicted on the side of the radio communication apparatus 200.

As described above, for example, the movement path can be predicted, and then the area where the low communication fee is charged and the communication service provider administrating the area can be specified with reference to communication unit cost information of all communication service providers in the movement path. In this case, in the specified area, the radio communication apparatus can be configured to access the specified communication service provider. This example will be described according to a third embodiment of the present technology.

In this way, the timing at which the predetermined condition is satisfied can be set to the timing at which the area where the radio communication apparatus 200 becomes the area where the predetermined radio communication fee is charged. In this case, when the second operation is received, the control unit 230 determines whether the radio communication apparatus 200 is located in the area where a predetermined radio communication fee is charged. When the control unit 230 determines that the radio communication apparatus 200 is located in the area where the predetermined radio communication fee is charged, the control unit 230 executes the access request.

Process Example of Radio Communication Apparatus

Figure 19:
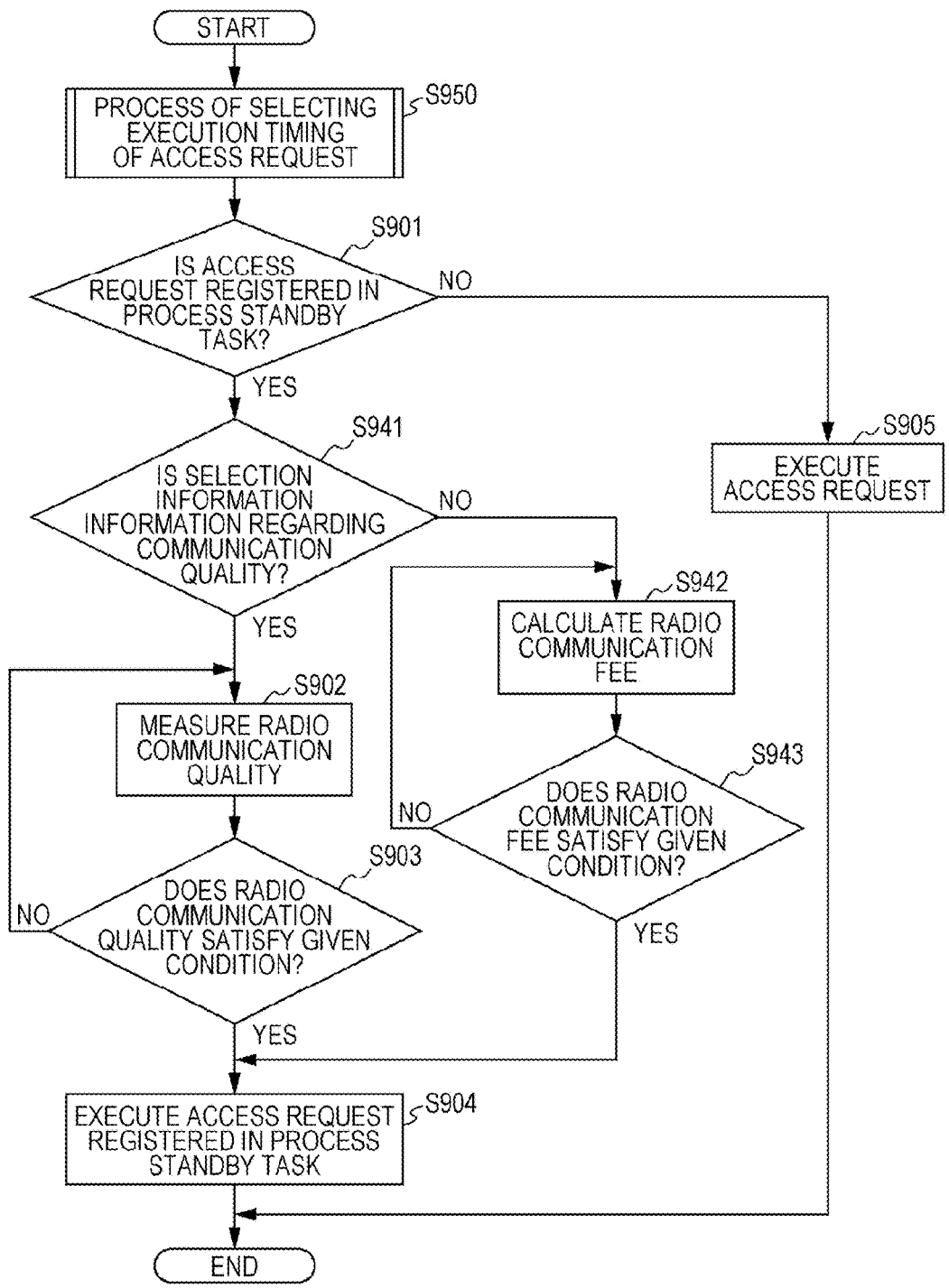
FIG. 19 is a flowchart illustrating an example of the processing sequence of a communication process performed by the radio communication apparatus according to the first embodiment of the present technology.

FIG. 19 is a flowchart illustrating an example of the processing sequence of a communication process performed by the radio communication apparatus 200 according to the first embodiment of the present technology. Since the processing sequence is a modified example of the processing sequence of FIG. 10, the same reference numerals are given to the common constituents to those of FIG. 10 and the description thereof will not be partially repeated.

First, a process of selecting the execution timing of the access request is executed (step S950). The process of selecting the execution timing of the access request will be described in detail with reference to FIG. 20.

When the access request is registered in the process standby task (step S901), the control unit 230 determines the selection information registered in the process standby task is information regarding a communication quality (step S941). That is, the control unit 230 determines whether the "communication quality" is stored in the selection information 284 of the process standby task information storage unit 280 shown in FIG. 3. When the selection information is the information regarding the communication quality (step S941), the process proceeds to step S902.

When the selection information is not the information regarding the communication quality (that is, the selection information is information regarding the communication fee) (step S941), the control unit 230 calculates the radio communication fee (step S942) and determines whether the radio communication apparatus 200 is present within the range of the area where the radio communication fee satisfies a given condition (step S943). When the radio communication apparatus is not present within the range of the area where the radio communication fee satisfies a given condition (step S943), the control unit 230 continues to calculate the radio communication fee (step S942).

When the radio communication apparatus is present within the range of the area where the radio communication fee satisfies a given condition (step S943), the control unit 230 executes the access request registered in the process standby task (step S904).

Figure 20:
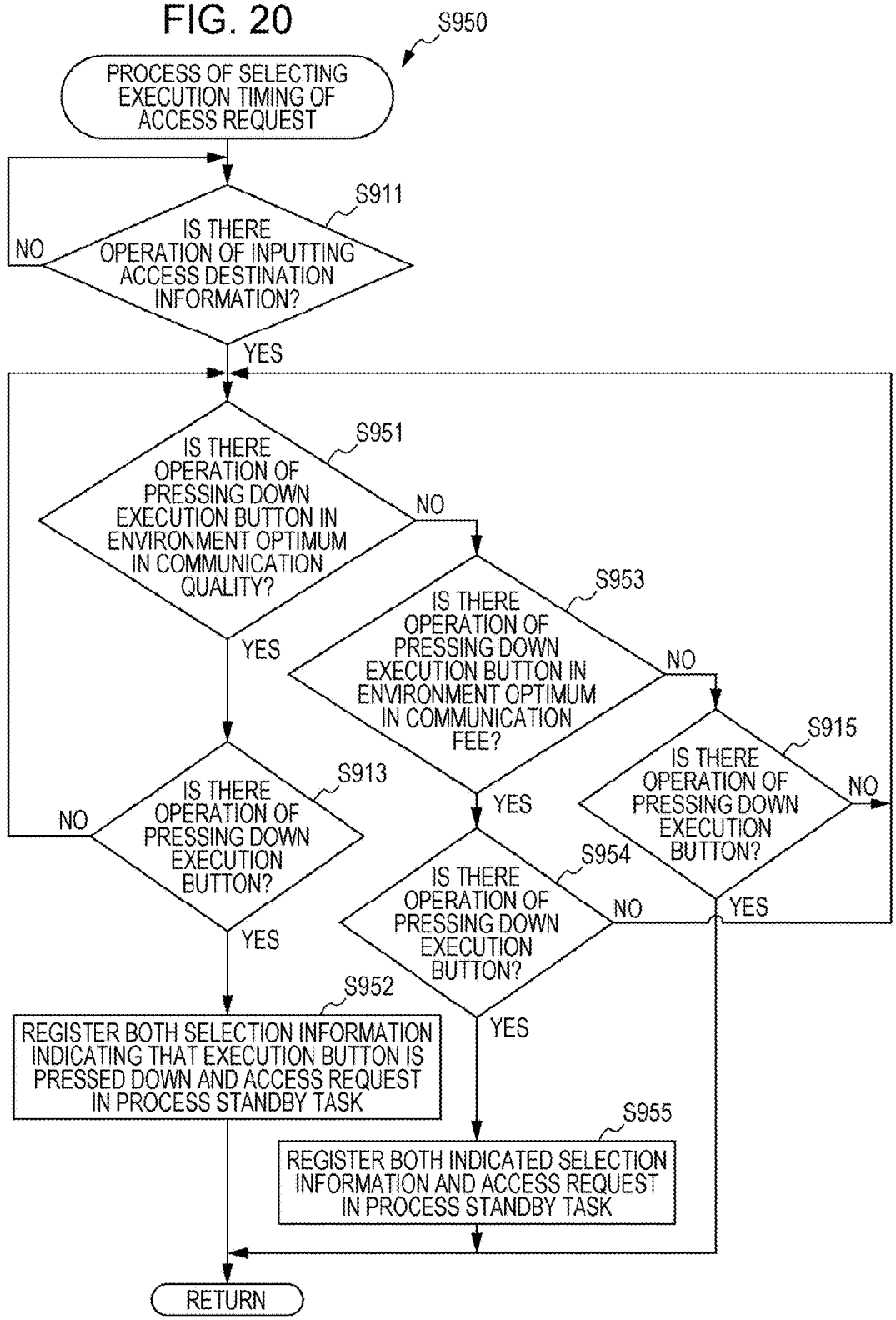
FIG. 20 is a flowchart illustrating a processing sequence of selecting the execution timing of the access request in the processing sequence of the communication process performed by the radio communication apparatus according to the first embodiment of the present technology.

FIG. 20 is a flowchart illustrating a processing sequence (the processing sequence of step S950 shown in FIG. 19) of selecting the execution timing of the access request in the processing sequence of the communication process performed by the radio communication apparatus 200 according to the first embodiment of the present technology. Since the processing sequence is a modified example of the processing sequence of FIG. 11, the same reference numerals are given to the common constituents to those of FIG. 11 and the description thereof will not be partially repeated.

The control unit 230 determines whether the execution button (for example, the execution button 363 in the environment optimum in communication quality in FIG. 18) in the environment optimum in communication quality is pressed down (step S951). When the execution button in the environment optimum in communication quality is pressed down (step S951), the process proceeds to step S913.

When the execution button (for example, the execution button 382 shown in FIG. 18) (step S913), the control unit 230 registers both the selection information indicating that the execution button is pressed down and the access request associated with the input access destination information in the process standby task (step S952). That is, the process standby task information (the selection information is set to the information regarding the communication quality) associated with the access request is stored in the process standby task information storage unit 280.

When the execution button in the environment optimum in communication quality is not pressed down (step S951), the control unit 230 determines whether the execution button in the environment optimum in communication fee is pressed down (step S953). For example, the control unit 230 determines whether the execution button 384 in the environment optimum in communication fee in FIG. 18 is pressed down.

When the execution button in the environment optimum in communication fee is pressed down (step S953), the control unit 230 determines whether the execution button is pressed down (step S954). When the execution button is not pressed down, the process returns to step S951. Further, even when the execution button is not pressed down during a given time, the process may return to step S951. On the other hand, when the execution button is pressed down (step S954), the control unit 230 registers both the selection information indicating that the execution button is pressed down and the access request associated with the input access destination information in the process standby task (step S955). That is, the process standby task information (the selection information is set to the information regarding the communication fee) associated with the access request is stored in the process standby task information storage unit 280.

When the execution button in the environment optimum in communication fee is not pressed down (step S953), the process proceeds to step S915.

Example of Restriction on Access Request Based on Size of Content Item

The example hitherto been described in which the user executes the operation of selecting the execution of the access request at the timing at which the radio communication quality (or the radio communication fee) or immediately. Here, even when the user selects the execution of the access request immediately, it is supposed that it is desirable to execute the access request in the optimum communication environment when the size of a content item to be acquired is relatively large. Accordingly, an example of restriction on the access request based on the size of a content item will be described.

Display Example of Notification Screen

Figure 21A:
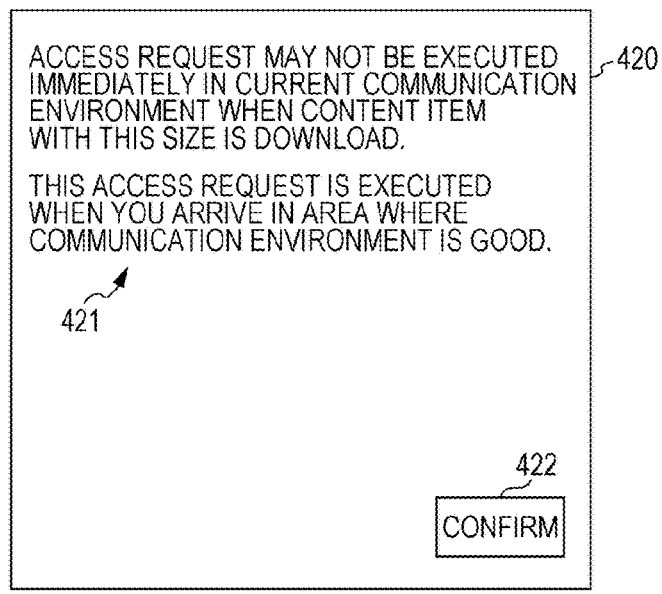
FIGS. 21A and 21B are diagrams illustrating display examples of notification screens displayed on the display unit according to the first embodiment of the present technology.
Figure 21B:
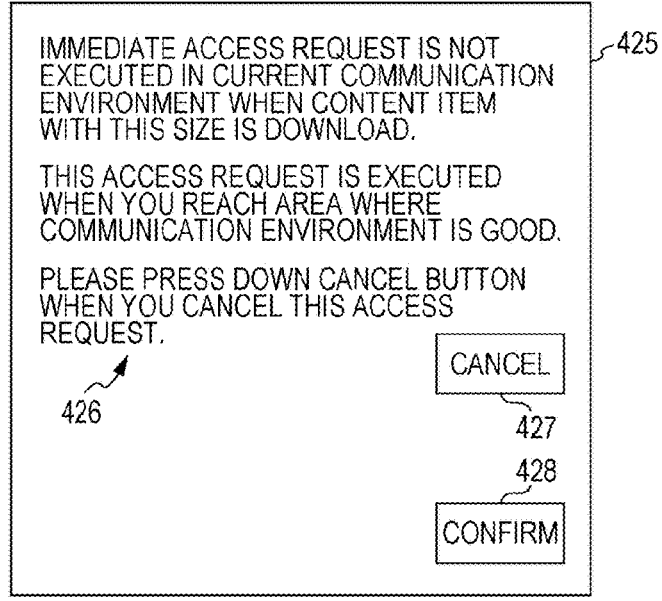

FIGS. 21A and 21B are diagrams illustrating display examples of notification screens displayed on the display unit 250 according to the first embodiment of the present technology.

FIG. 21A shows a notification screen 420 that is displayed after the immediate execution of the access request is selected. That is, the notification screen 420 is a screen that is displayed immediately after the operation of selecting the immediate execution of the access request on the access request operation screen (for example, the access request operation screen 300 shown in FIG. 4) when the radio communication quality does not satisfy the given condition. The notification screen 420 has a notification message display region 421 and a confirmation button 422.

The notification message display region 421 is a region in which the access request is executed immediately but a message indicating that the access request is not executed immediately is displayed since the radio communication quality of the area where the radio communication apparatus 200 is located does not satisfy the given condition. That is, it is assumed that when the access request is registered in the process standby task the notification screen 420 is displayed.

The confirmation button 422 is a button that is pressed down after the user confirms the notification screen 420. When the confirmation button 422 is pressed down, another screen (for example, an initial screen) is displayed.

FIG. 21B shows a notification screen 425 that is displayed after the immediate execution of the access request is selected. The notification screen 425 is a modified example of the notification screen 420 shown in FIG. 21A and is different in that a cancel button 427 is provided. That is, the notification screen 425 is a display screen configured to cancel the access request through a user operation after the access request is registered in the process standby task.

The notification screen 425 has a notification message display region 426, the cancel button 427, and a confirmation button 428.

The cancel button 427 is a button that is displayed when the access request registered in the process standby task is cancelled. For example, when the cancel button 427 is pressed down, a message indicating that the access request registered in the process standby task is cancelled is displayed and a process of deleting the access request is executed.

Process Example of Radio Communication Apparatus

Figure 22:
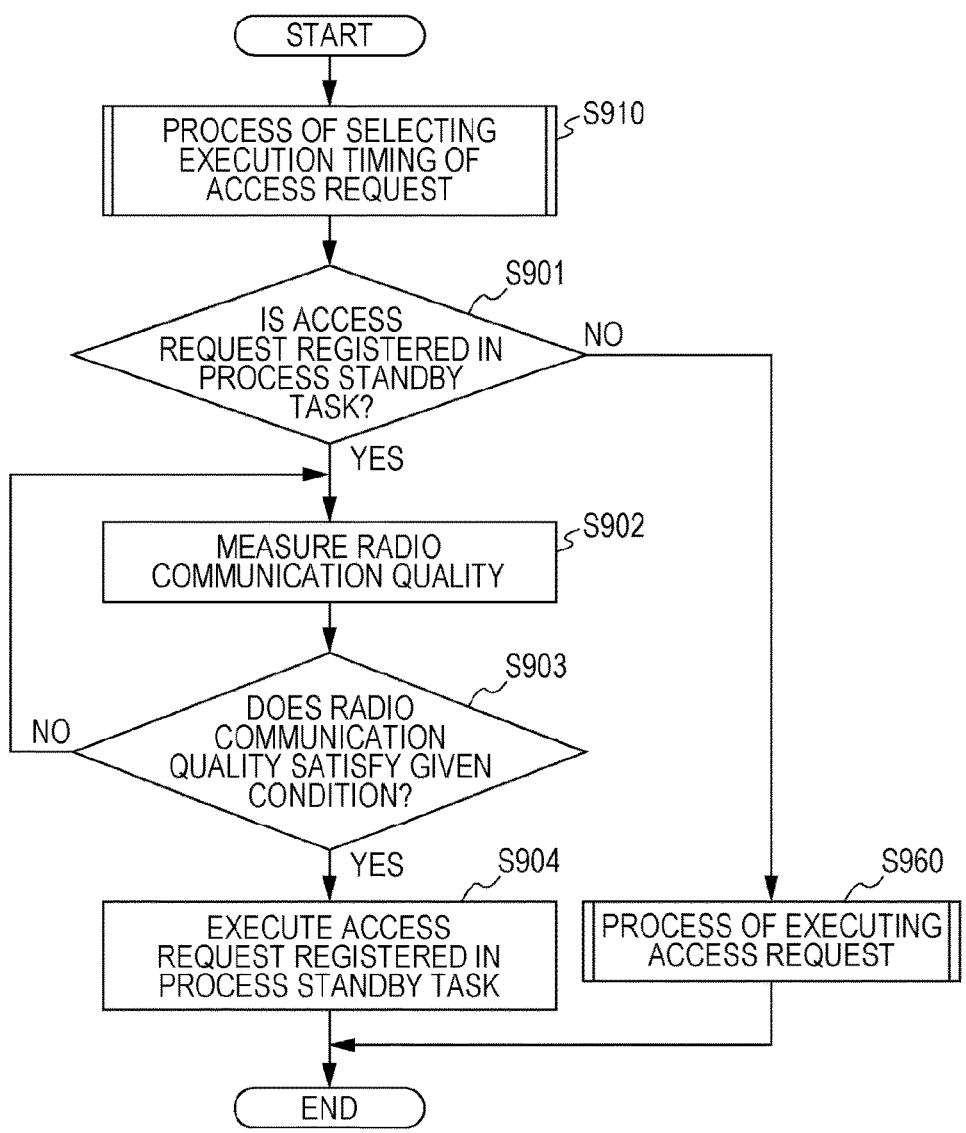
FIG. 22 is a flowchart illustrating an example of a processing sequence of the communication process performed by the radio communication apparatus according to the first embodiment of the present technology.

FIG. 22 is a flowchart illustrating an example of the processing sequence of a communication process performed by the radio communication apparatus 200 according to the first embodiment of the present technology. Since the processing sequence is a modified example of the processing sequence of FIG. 10 the same reference numerals are given to the common constituents to those of FIG. 10 and the description thereof will not be partially repeated.

When the access request is not registered in the process standby task (step S901), an access request execution process is performed (step S960). The access request execution process will be described in detail with reference to FIG. 23.

Figure 23:
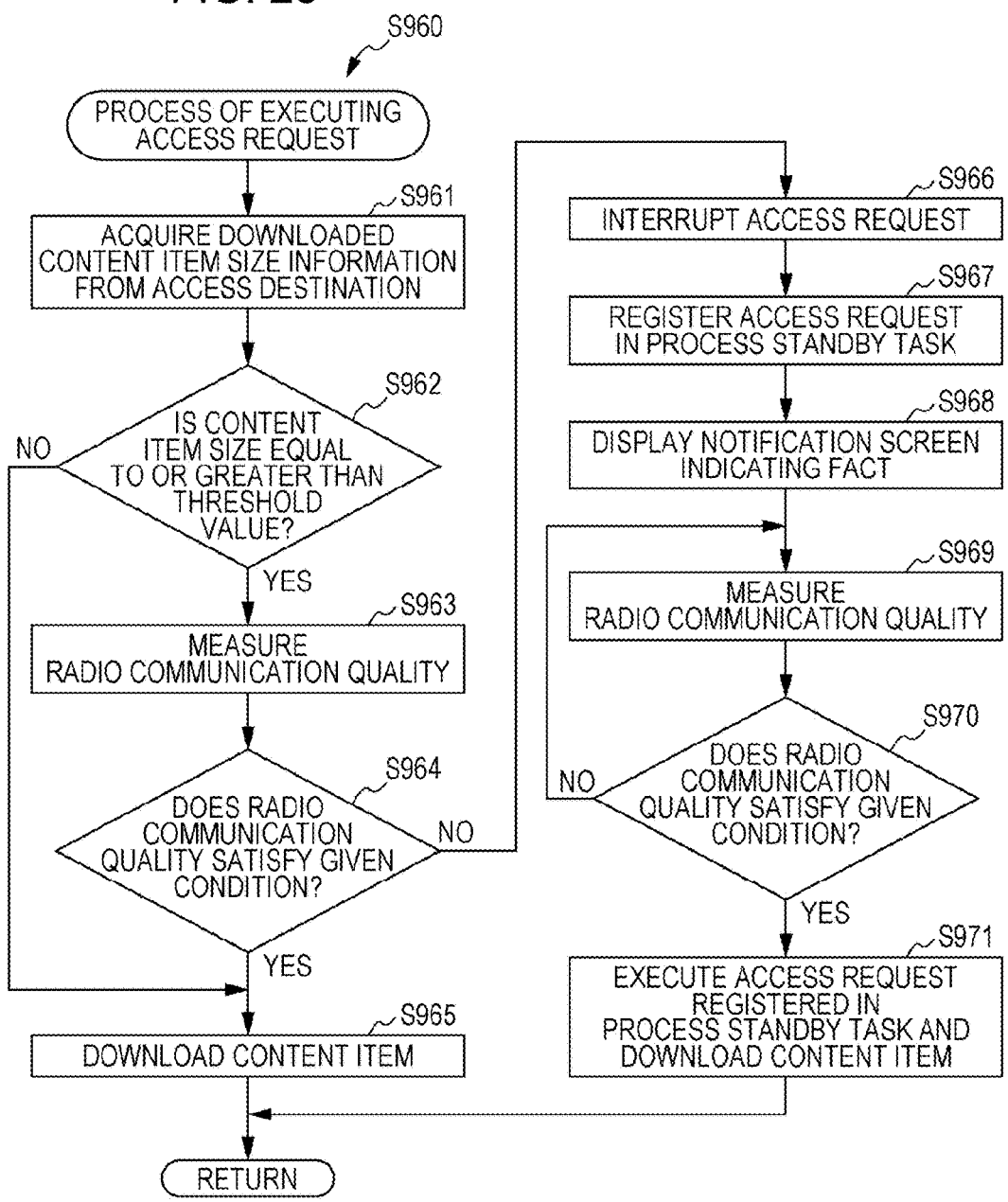
FIG. 23 is a flowchart illustrating a processing sequence of executing an access request in the communication process performed by the radio communication apparatus according to the first embodiment of the present technology.

FIG. 23 is a flowchart illustrating a processing sequence (the processing sequence of step S960 shown in FIG. 22) of selecting the access request in the processing sequence of the communication process performed by the radio communication apparatus 200 according to the first embodiment of the present technology.

First, the control unit 230 acquires information (information regarding the size of a content item) regarding the size of a content item to be downloaded in response to the access request from the access destination (step S961). In this case, the access request for accessing the access destination is executed to acquire only the information regarding the size of the content item.

Subsequently, the control unit 230 calculates the size of the content item to be downloaded based on the information regarding the size of the acquired content item and determines whether the size of the content item is equal to or greater than a threshold value (step S962). Then, when the size of the content item to be downloaded is not equal to or greater than the threshold value (that is, the size of the content item is less than the threshold value) (step S962), the control unit 230 downloads the content item from the access destination (step S965).

On the other hand, when the size of the content item to be downloaded is equal to or greater than the threshold value (step S962), the control unit 230 measures the radio communication quality (step S963) and determines whether the radio communication apparatus is present within the range of the area where the radio communication quality satisfies the given condition (step S964). Then, when the radio communication apparatus is present within the range of the area where the radio communication quality satisfies the given condition (step S964), the process proceeds to step S965. On the other hand, when the radio communication apparatus is not present within the range of the area where the radio communication quality satisfies the given condition (step S964), the control unit 230 interrupts the access request (step S966) and registers the access request in the process standby task (step S967). That is, the process standby task information associated with the access request is stored in the process standby task information storage unit 280.

Subsequently, the control unit 230 displays a notification screen (for example, the notification screen 420 shown in FIG. 21A) indicating the fact on the display unit 250 (step S968).

Subsequently, the control unit 230 measures the radio communication quality (step S969) and determines whether the radio communication apparatus is present within the range of the area where the radio communication quality satisfies the given condition (step S970). Then, when the radio communication apparatus is not present within the range of the area where the radio communication quality satisfies the given condition (step S970), the control unit 230 continues to measure the radio communication quality (step S969).

On the other hand, when the radio communication apparatus is present within the range of the area where the radio communication quality satisfies the given condition (step S970), the control unit 230 executes the access request registered in the process standby task and downloads the content item from the access destination (step S971).

When the notification screen 425 shown in FIG. 21B is displayed as the notification screen on the display unit 250 (step S968), a process of deleting the access request registered in the process standby task is performed in response to the operation of pressing down the cancel button 427.

In this way, even when the immediate execution of the access request is selected but the size of the content item acquired in response to the access request is greater than the predetermined size as a reference, the control unit 230 executes the access request at the timing at which the predetermined condition is satisfied.

Restriction Example of Access Request Based on User Operation

The example has hitherto been described in which the access request is automatically restricted based on the size of the content item. However, for example, when the user downloads a desired content item, the download time of the content item is confirmed, and then the access request may be restricted based on a user operation. Accordingly, an example will be described in which the access request is restricted manually or automatically based on the download time of a content item.

Display Example of Expected Download Time of Content Item

Figure 49A:
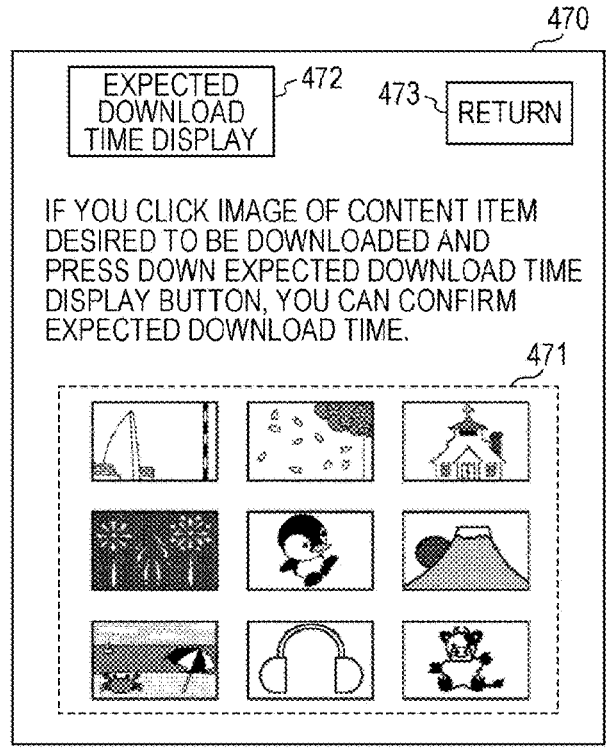
FIGS. 49A and 49B are diagrams illustrating a display example of an access request operation screen displayed on the display unit according to the first embodiment of the present technology.
Figure 49B:
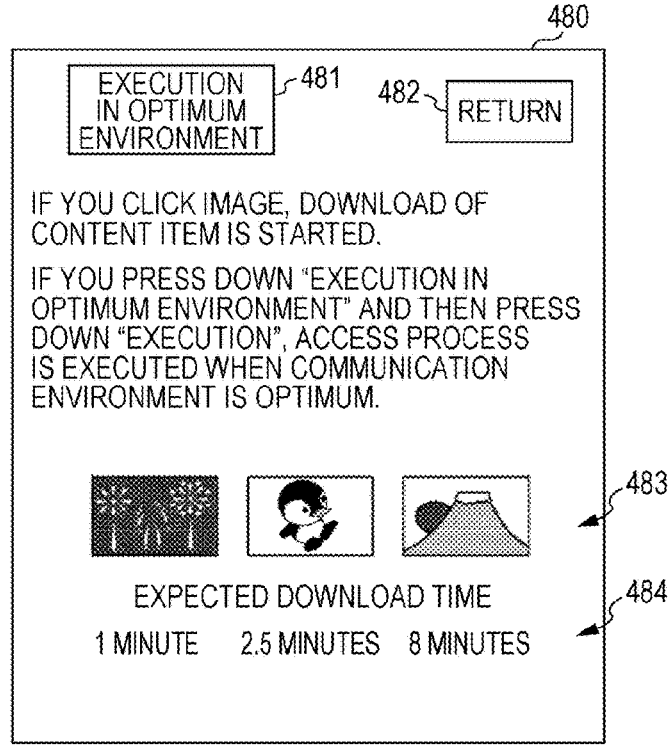

FIGS. 49A and 49B are diagrams illustrating a display example of an access request operation screen displayed on the display unit 250 according to the first embodiment of the present technology.

FIG. 49A shows a content item acquisition request operation screen 470 used to display the list of the content items acquired from a desired access destination via a predetermined network. Since the content item acquisition request operation screen 470 is the same as the content item acquisition request operation screen 315 shown in FIG. 5B except that the execution button 317 in the optimum environment, as shown in FIG. 5B, is omitted and an expected download time display button 472 shown in FIG. 5B is provided, the detailed description will not be repeated.

For example, when access destination information is input into the access destination information input region 311 shown in FIG. 5A and the execution button 312 is then pressed down, the access request for accessing the access destination associated with the input access destination information is executed. Information (for example, information used to display the list of the content items) regarding the content items is downloaded from the access destination (for example, the content item providing server 120) in response to the access request, and then the content item acquisition request operation screen 470 is displayed on the display unit 250.

Here, when an image (image indicating the content item) displayed on the content item acquisition request operation screen 470 has a link containing the access destination information, a message indicating that the expected download time can be confirmed is displayed on the content item acquisition request operation screen 470.

For example, it is supposed that one or a plurality of images displayed in a content item list display region 471 is pressed down on the content item acquisition request operation screen 470 and an expected download time display button 472 is pressed down. In this case, an expected download time associated with the content item of the pressed image is displayed. For example, when three images (images in the middle line shown in FIG. 49A) displayed on the content item list display region 471 are pressed down and the expected download time display button 472 is pressed down, a content item acquisition request operation screen 480 shown in FIG. 49B is displayed.

FIG. 49B shows the content item acquisition request operation screen 480 used to display the expected download time of one or the plurality of content items selected on the content item acquisition request operation screen 470 shown in FIG. 49A. Since the content item acquisition request operation screen 480 is the same as the content item acquisition request operation screen 315 shown in FIG. 5B except that an expected download time display region 484 is provided, the detailed description thereof will not be repeated.

For example, an expected download time of each content item displayed in the content item display region 483 is displayed for each content item in an expected download time display region 484. In this way, since the expected download time of each content item is displayed, the user can determine whether to press down an execution button 481 in the optimum environment after confirming the expected download time.

For example, when the expected download time is relatively short (for example, less than 1 minute) and the user desires to acquire the desired content item earlier, the user can press down the image in the content item list display region 483 without pressing down the execution button 481 in the optimum environment. Further, for example, when the expected download time is relatively long (for example, 10 or more minutes) and the acquisition of the desired content item may be delayed, the user can press down the execution button 481 in the optimum environment and press down the image in the content item list display region 483.

Further, the determination may be automatically executed. For example, the user may preliminarily execute a setting process of manually or automatically determining whether the content item is downloaded immediately or in an optimum environment. When the manual download is set, the user determines whether to download the content item immediately or in the optimum environment by executing the above-described manual operation. On the other hand, when the automatic download is set, it is determined whether the download is executed immediately or in the optimum environment based on the expected download time.

For example, the control unit 230 compares the expected download time to a threshold value (for example, 3 minutes). When the expected download time is equal to or greater than the threshold value, the control unit 230 determines the execution in the optimum environment. On the other hand, when the expected download time is less than the threshold value, the control unit 230 determines the immediate execution. Further, when there are a plurality of content items to be downloaded, the expected download time of each content item is compared to the threshold value. For example, when the expected download time of at least one content item is equal to or greater than the threshold value, the execution in the optimum environment may be determined. Further, for example, the immediate execution may be determined only for the content item of which the expected download time is less than the threshold value, whereas the execution in the optimum environment may be determined for the other content items.

The control unit 230 may calculate an expected time necessary for the download at the current location and calculate an expected value of a communication rate on an expected path, and then may display an expected time necessary for the download on the expected path. For example, a sign (for example, a thick line indicating the expected path) indicating the expected path on a map may be displayed, and the image indicating the content item and the expected download time may be displayed on the sign in association with each other. In this case, for example, the image indicating the content item and the expected download time may be displayed in association with each other at a predetermined interval (a predetermined interval on a time axis or a predetermined interval on a map) on the expected path. Further, among the expected download times to be displayed, only the shortest time may be displayed on the expected path. Thus, it is possible to easily know where the user will move to obtain the shortest download time.

The control unit 230 may acquire information regarding the communication quality on the expected path from the communication quality management server 601 (shown in FIG. 36) and calculate an expected time necessary for the download.

Hereinafter, a method of calculating an expected value of a communication rate will be described. A method of calculating the expected value of the communication rate using the congestion degree of a base station, a received signal intensity, or the like can be used as the method of calculating an expected value of a communication rate.

In a case of the W-CDMA scheme, for example, a correlation detection value acquired through a cell search or a peripheral cell search executed at a waiting time or a cell reselecting process can be used in a method of detecting the congestion degree of a base station by the radio communication apparatus 200.

In a case of the OFDMA scheme, the congestion degree of a base station can be detected by detecting information regarding a ratio of the number of actually allocated sub-carriers to the total number of sub-carriers of each frame.

In the case of the W-CDMA scheme, an SIR is calculated from the congestion degree and the maximum communication rate corresponding to CQI (Channel Quality Indicator) can be estimated.

On the other hand, in the case of the OFDMA scheme, the reception result of a preamble signal or a reference signal used for frame synchronization or determination of a base station can be used. That is, the SIR of the preamble signal or the reference signal can be acquired as a reception quality based on the reception result and the maximum communication rate corresponding to the CQI can be estimated. When the congestion degree is large for the maximum communication rate, the small expected value of the communication rate can be calculated. When the congestion degree is small for the maximum communication rate, the large expected value of the communication rate can be calculated.

In the case of the W-CDMA scheme, the maximum communication rate corresponding to the CQI may be calculated using an index called Ec/No (Energy-per-Chip-to-Noise).

Process Example of Radio Communication Apparatus

Figure 50:
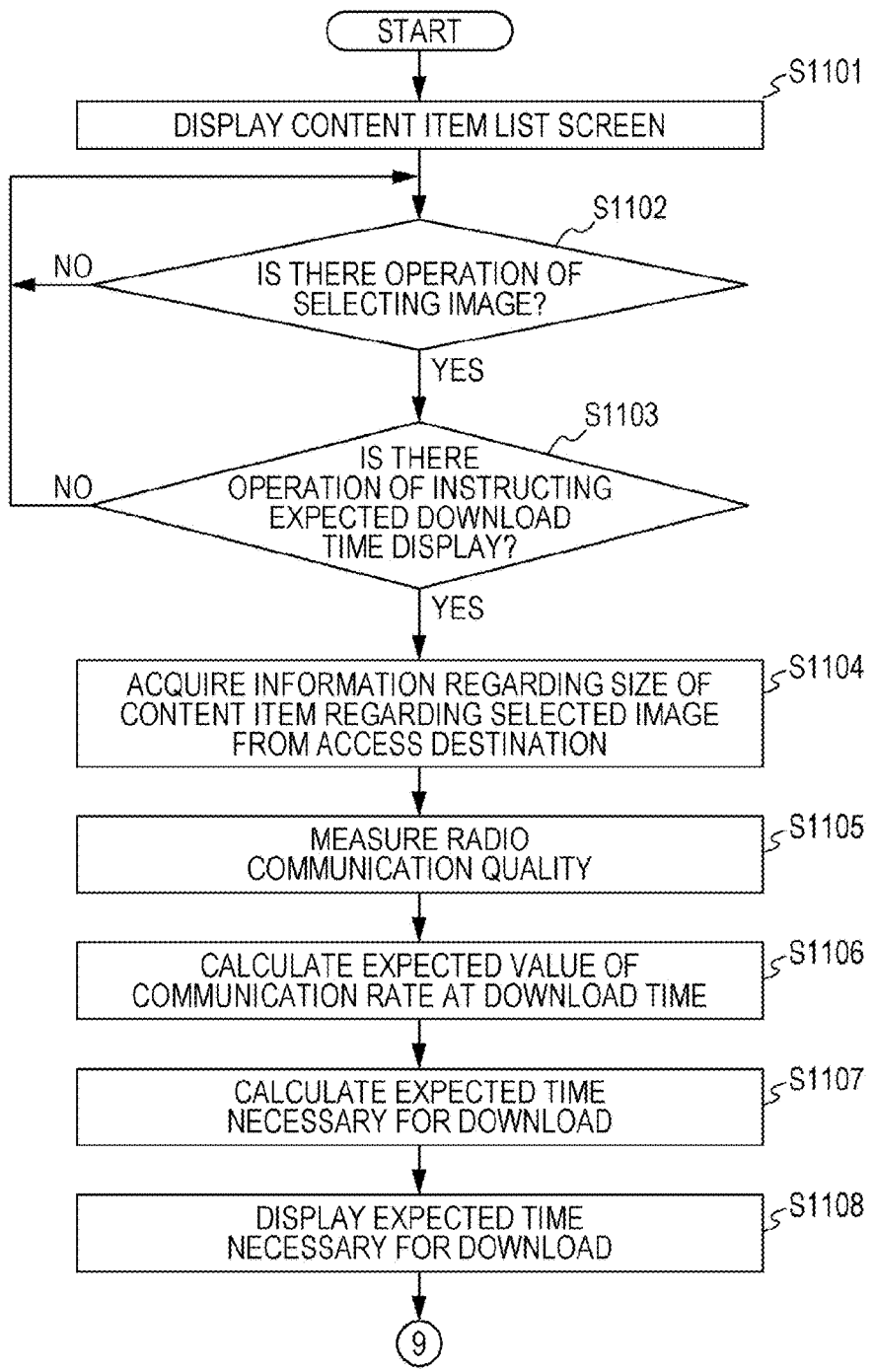
FIG. 50 is a flowchart illustrating an example of the processing sequence of the communication process performed by the radio communication apparatus according to the first embodiment of the present technology.
Figure 51:
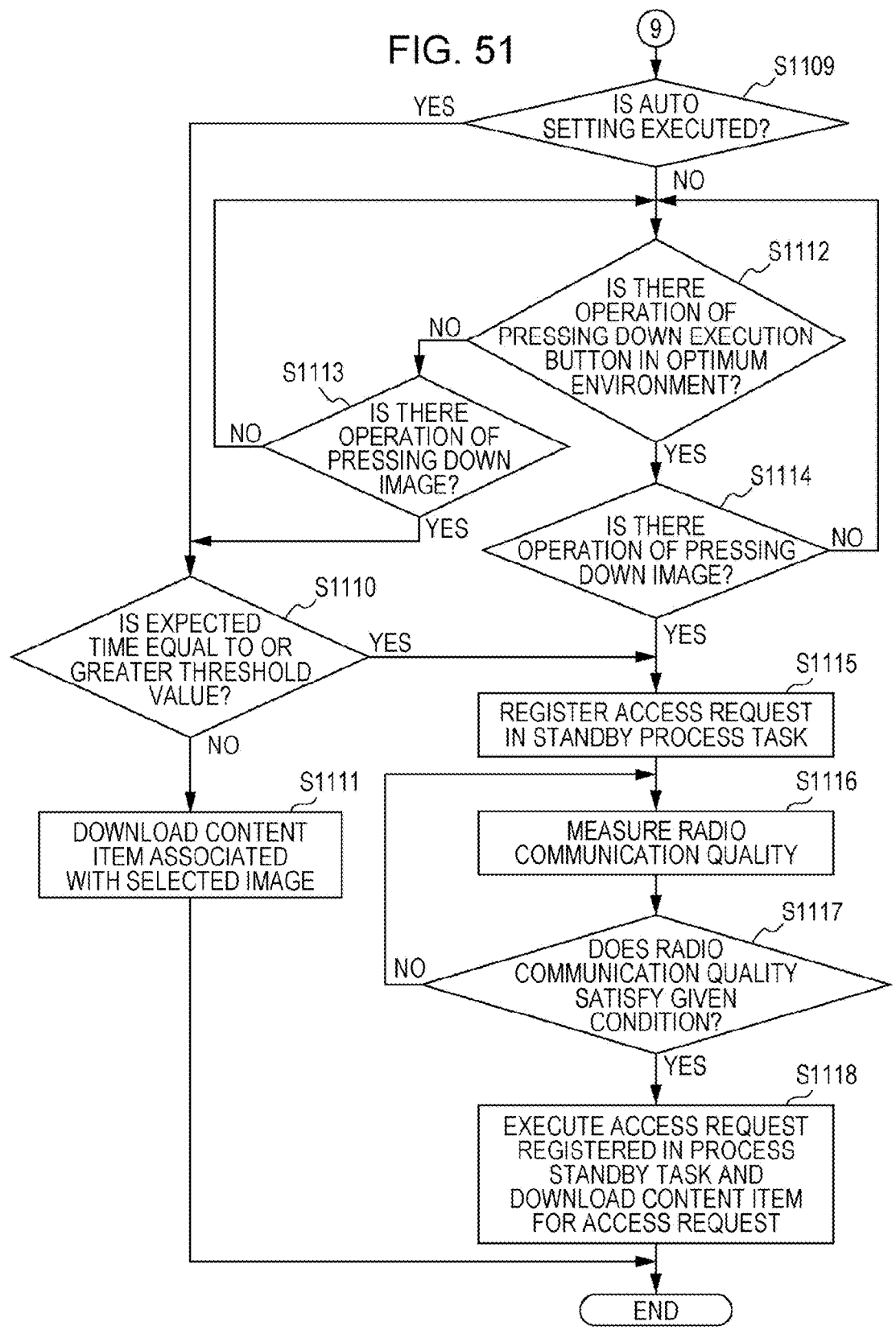
FIG. 51 is a flowchart illustrating an example of the processing sequence of the communication process performed by the radio communication apparatus according to the first embodiment of the present technology.

FIGS. 50 and 51 are flowcharts illustrating an example of a processing sequence of a communication process performed by the radio communication apparatus 200 according to the first embodiment of the present technology.

First, the control unit 230 displays a content item list screen (for example, the content item acquisition request operation screen 470 shown in FIG. 49A) on the display unit 250 (step S1101). Subsequently, the control unit 230 determines whether an operation of selecting an image (content item) on the content item list screen is executed (step S1102). When the operation of selecting the image (content item) is not executed, a monitoring process continues. On the other hand, when the operation of selecting the image (content item) is executed (step S1102), the control unit 230 determines whether an operation of instructing the expected download time display is executed (step S1103). When the operation of instructing the expected download time display is not executed (step S1103), the monitoring process continues. For example, the operation of instructing the expected download time display is an operation of pressing down the expected download time display button 472 shown in FIG. 49A.

On the other hand, when the operation of instructing the expected download time display is not executed (step S1103), the control unit 230 acquires information regarding the size of the content item associated with the selected image from the access destination (step S1104).

Subsequently, the control unit 230 measures the radio communication quality (step S1105) and calculates the expected value of the communication rate at the download time of the content item associated with the selected image (step S1106). Subsequently, the control unit 230 calculates the expected time (the expected download time) necessary for the download of the content item based on the information regarding the size of the content item acquired from the access destination and the calculated expected value of the communication rate at the download time of the content item (step S1107). Subsequently, the control unit 230 displays the calculated expected download time and the content item corresponding to this download time for each content item on the display unit 250 (step S1108). For example, as shown in FIG. 49B, the images indicating the content items and the expected download times are arranged.

Subsequently, the control unit 230 determines whether the automatic setting is executed (step S1109). The automatic setting is a setting of automatically determining whether the content item is downloaded immediately or in the optimum environment.

When the automatic setting is executed (step S1109), the control unit 230 determines whether the expected time (the expected download time) necessary for the download of the content item to be downloaded is equal to or greater than the threshold value (step S1110). When the expected download time is less than the threshold value (step S1110), the control unit 230 downloads the content item associated with the selected image (step S1111). On the other hand, when the expected download time is equal to or greater than the threshold value (step S1110), the process proceeds to step S1115.

When the automatic setting is not executed (step S1109), the control unit 230 determines whether the operation of pressing down the execution button in the optimum environment (for example, the execution button 481 in the optimum environment shown in FIG. 49B) is executed (step S1112).

When the operation of pressing down the execution button in the optimum environment is not executed (step S1112), the control unit 230 determines whether the operation of pressing down the images (for example, three images shown in FIG. 49B) of the content items to be downloaded is executed (step S1113). When the operation of pressing down the execution button in the optimum environment is executed, the process returns to step S1112. On the other hand, when the operation of pressing down the execution button in the optimum environment is executed, the process proceeds to step S1110.

Further, even when the operation of pressing down the execution button in the optimum environment is executed (step S1112), the control unit 230 determines whether the operation of pressing down the images (for example, three images shown in FIG. 49B) of the content items to be downloaded is executed (step S1114). When the operation of pressing down the execution button in the optimum environment is not executed (step S1114), the process returns to step S1112. On the other hand, when the operation of pressing down the execution button in the optimum environment is executed (step S1114), the control unit 230 registers an access request for downloading the content items associated with the pressed images in the process standby task (step S1115). That is, process standby task information regarding the access request is stored in the process standby task information storage unit 280.

Subsequently, the control unit 230 measures the radio communication quality (step S1116) and determines whether the radio communication apparatus is located in the area where the radio communication quality satisfies the given condition (step S1117). When the radio communication apparatus is not located in the area where the radio communication quality satisfies the given condition (step S1117), the control unit 230 continues to measure the radio communication quality (step S1116).

On the other hand, when the radio communication apparatus is located in the area where the radio communication quality satisfies the given condition (step S1117), the control unit 230 executes the access request registered in the process standby task (step S1118).

The example has hitherto been described in which the expected download times are displayed only for the content items selected on the content item list screen. However, for example, the expected download times may be displayed for all of the selectable content items.

In this way, the expected time (the expected download time) necessary for the download is displayed on the display unit 250. Therefore, the user can select the operation (first operation) of executing the access request for downloading the content item immediately or the operation (second operation) of executing the access request at a timing at which a predetermined condition is satisfied with reference to the expected time.

The example has hitherto been described in which the expected time (the expected download time) necessary for the download is displayed on the display unit 250. However, the size of the content item may be displayed on the display unit 250 based on the information regarding the size of the content item acquired from the access destination. Further, the expected download time and the size of the content item may simultaneously be displayed on the display unit 250. By displaying the expected download time and the size of the content item in this way, the user can select the operation (first operation) of executing the access request for downloading the content item immediately or the operation (second operation) of executing the access request at a timing at which a predetermined condition is satisfied with reference to the expected time.

Modified Examples of Each Threshold Value

The example has hitherto been described in which the fixed value is used as the threshold value used for each comparison. However, each threshold value may be changed and used in accordance with the use state of the radio communication apparatus 200, the size of the content item, or the like. For example, the threshold value (the threshold value compared to the size of the content item to be downloaded) can be changed in accordance with the radio communication quality of the area where the radio communication apparatus 200 is located. For example, the threshold value can be set to be larger as the SIR increases.

Further, the threshold value used to determine whether the radio communication quality satisfies the given condition can also be changed in accordance with, for example, the information regarding the size of the content item acquired from the access destination. For example, the SIR serving as the threshold value can be set to be larger as the size of the content item increases.

The threshold value may be changed in accordance with the capacity remaining in a battery. For example, a power consumed when a signal transmitted to and received from the base station is relatively larger in a place where the radio communication quality is inferior. For this reason, when the capacity remaining the battery is small, it is important to reduce the power consumption associated with the download of the content item. Accordingly, the threshold value can be set to be larger as the capacity remaining in the battery decreases.

In this way, the control unit 230 of the radio communication apparatus 200 can change the threshold value used to determine whether the radio communication quality satisfies the given condition based on at least one of the kind of application, the size of the content item, and the remaining amount of battery capacity. That is, the control unit 230 can change a predetermined radio communication quality as a threshold value based on at least one of the kind of application, the size of the content item, and the remaining amount of battery capacity.

Process Example of Radio Communication Apparatus

Figure 24:
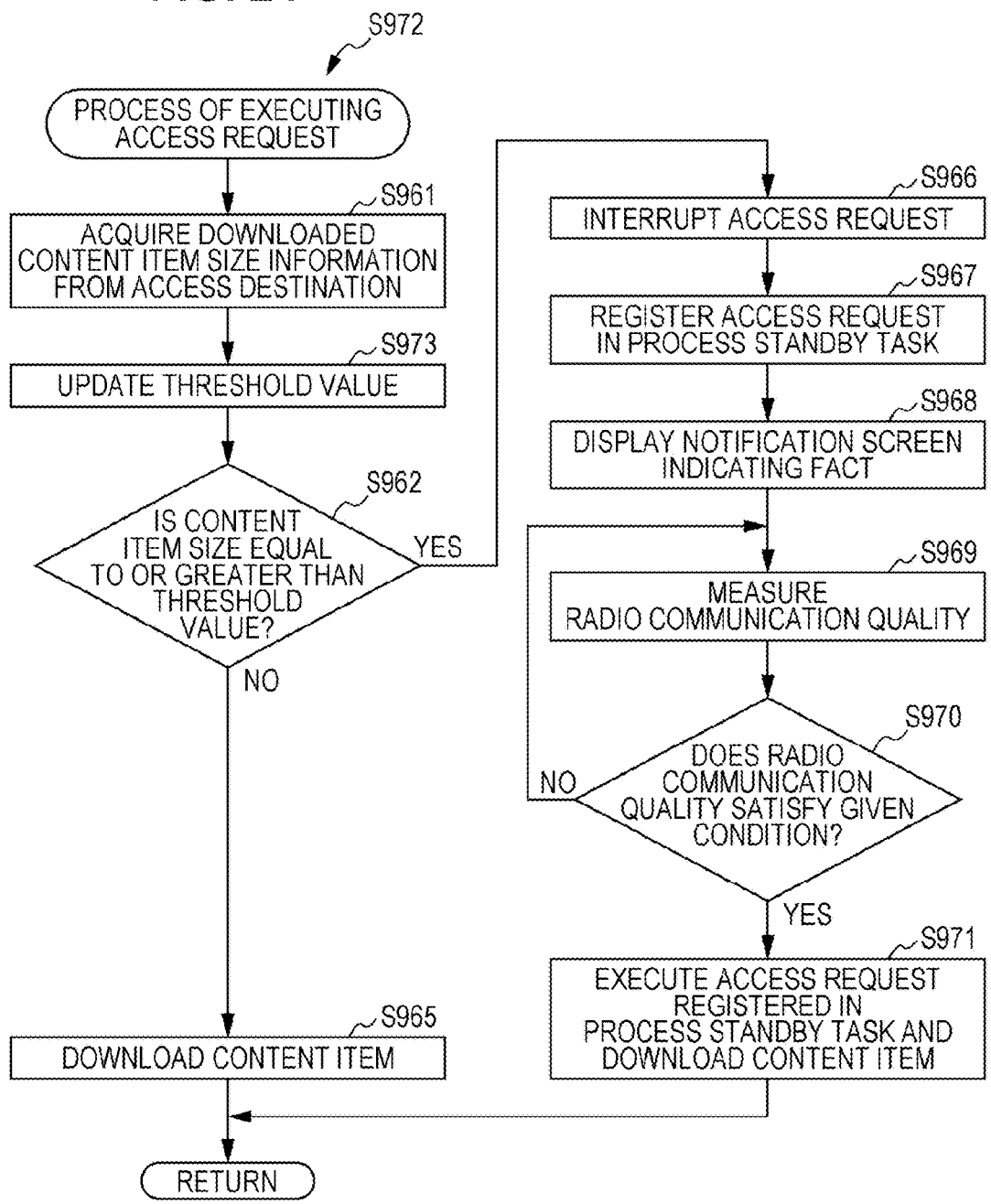
FIG. 24 is a flowchart illustrating a processing sequence of executing an access request in the communication process performed by the radio communication apparatus according to the first embodiment of the present technology.

FIG. 24 is a flowchart illustrating a processing sequence (the processing sequence of step S960 shown in FIG. 22) of executing the access request in the processing sequence of the communication process performed by the radio communication apparatus 200 according to the first embodiment of the present technology. Since the processing sequence is a modified example of the processing sequence of FIG. 23, the same reference numerals are given to the common constituents to those of FIG. 23 and the description thereof will not be repeated.

First, information (information regarding the size of the content item) regarding the size of a content item to be downloaded in response to the access request is acquired (step S961), and then the control unit 230 updates the threshold value used for each comparison (step S973). As described above, each threshold value is updated based on, for example, the SIR, the size of the content item, the capacity remaining in the battery, or the like.

When the size of the content item to be downloaded is equal to or greater than the threshold value (step S962), the process proceeds to step S966.

Example of Cancellation of Restriction Through Addition of Addition Fee

The example has hitherto been described in which the access request associated with the acquisition of the content item is registered in the process standby task when the size of the content item to be acquired is relatively large. However, it is supposed that some users desire to acquire the content item rapidly even though paying an addition fee. In this example, the content item is acquired under the condition that an addition fee is paid, when the size of the content item to be acquired is relatively large.

Display Example of Notification Screen

Figure 25A:
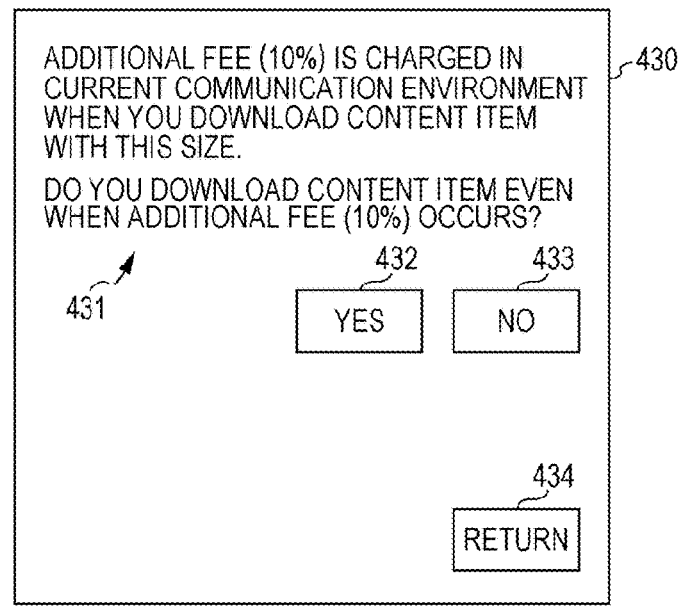
FIGS. 25A and 25B are diagrams illustrating display examples of notification screens displayed on the display unit according to the first embodiment of the present technology.
Figure 25B:
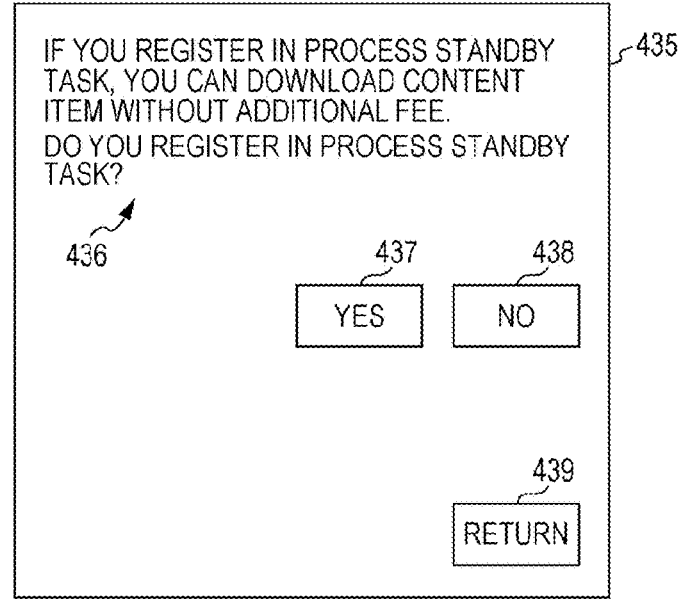

FIGS. 25A and 25B are diagrams illustrating display examples of notification screens displayed on the display unit 250 according to the first embodiment of the present technology.

FIG. 25A shows a notification screen 430 that is displayed after the immediate execution of the access request is selected. That is, the notification screen 430 is a screen that is displayed immediately after an operation of selecting the immediate execution of the access request on the access request operation screen (for example, the access request operation screen 300 shown in FIG. 4) when the radio communication quality does not satisfy the given condition.

The notification screen 430 has a notification message display region 431, a YES button 432, a NO button 433, and a return button 434.

The notification message display region 431 is a region in which a message indicating that an addition fee is charged is displayed due to the large size of the content item, when the access request is executed rapidly. Further, the cost of the additional fee (10% in FIGS. 25A and 25B) may be fixed or may be changed in accordance with the size of the content item, the radio communication environment, or the like.

The YES button 432 is a button that is pressed down when the payment of the additional fee is approved. Further, the NO button 433 is a button that is pressed down the payment of the additional fee is not approved.

When the YES button 432 is pressed down, a process of acquiring the content item is executed immediately. The additional fee is added to a regular communication fee after the process of acquiring the content item.

On the other hand, when the NO button 433 is pressed down, a confirmation screen is displayed to confirm whether the access request is registered in the process standby task. A display example of the confirmation screen is shown in FIG. 25B.

FIG. 25B shows a conformation screen 435 that is displayed after the NO button 433 is pressed down on the notification screen 430 shown in FIG. 25A.

The confirmation screen 435 has a confirmation message display region 436, a YES button 437, a NO button 438, and a return button 439.

The confirmation message display region 436 is a region in which a message is displayed to confirm whether the access request is registered in the process standby task.

The YES button 437 is a button that is pressed down when registration of the access request in the process standby task is approved. The NO button 438 is a button that is pressed down when registration of the access request in the process standby task is not approved.

That is, when the YES button 437 is pressed down, process standby task information associated with the access request is stored in the process standby task information storage unit 280 shown in FIG. 3. Further, when the NO button 438 is pressed down, the access request is deleted.

Process Example of Radio Communication Apparatus

FIG. 26 is a flowchart illustrating a processing sequence (the processing sequence of step S960 shown in FIG. 22) of executing the access request in the processing sequence of the communication process performed by the radio communication apparatus 200 according to the first embodiment of the present technology. Since the processing sequence is a modified example of the processing sequence of FIG. 23, the same reference numerals are given to the common constituents to those of FIG. 23 and the description thereof will not be repeated.

When the radio communication apparatus is present within the range of the area where the radio communication quality satisfies the given condition (step S964), the control unit 230 interrupts the access request (step S966) and displays a notification screen (for example, the notification screen 430 shown in FIG. 25A) on the display unit 250 (step S976).

Subsequently, the control unit 230 determines whether an approval operation (for example, an operation of pressing down the button 432 shown in FIG. 25A) is executed to approve the additional fee on the notification screen (step S977). When the approval operation is executed, the process proceeds to step S965. On the other hand, when the approval operation is not executed (step S977), the control unit 230 displays a notification screen (for example, the confirmation screen 435 shown in FIG. 25B) on the display unit 250 (step S978).

Subsequently, the control unit 230 determines whether an approval operation (for example, the operation of pressing down the button 437 shown in FIG. 25B) is executed to approve the registration of the access request in the process standby task on the confirmation screen (step S979). When the approval operation is executed (step S979), the process proceeds to step S967. On the other hand, when the approval operation is not executed (step S979), the access request execution process is ended. That is, the access request is deleted.

The behaviors of the users downloading the content items in a radio communication way and enjoying the content items are diverse, for example, in the mobile environment. For example, some users want to enjoy streaming services immediately, and thus a time restriction is relatively loose. However, some users want to enjoy content item services at lower costs. Accordingly, in the first embodiment of the present technology, users can be allowed to easily select various operation methods to access content items in a radio communication way under the mobile environment. For example, the users can easily select a favorable operation method between different access operation methods, that is, the radio access at a place where the reception state is good and the immediate radio access. Further, the communication service provider can provide a radio communication service so that the load is not imposed to the traffic as far as possible based on the states of the users under the mobile environment. For example, when radio resources can be reserved based on the behavior prediction, the radio resources can efficiently be used.

Since the burden on the radio base station can be reduced by downloading the content items in the area where the radio communication quality is good, it is possible to reduce the power consumption of the radio communication apparatus 200. For example, when the AMC function is mounted in a system operated in conformity with a scheme after the HSDPA of the 3G and the radio communication quality is good, the radio base station can transmit signals to the radio communication apparatus 200 in conformity with a modulation scheme of multi-leveling and a high encoding ratio. That is, when the radio base station transmits data with the same capacity, the radio base station can supply the data using lesser radio resources, thereby increasing the capacity of the radio base station. When the signals are transmitted and received in the area where the radio communication quality is good, the radio communication apparatus 200 can transmits the signals at a lower power and receive the signals at higher electric power, thereby reducing the necessary power consumption of a signal amplification process. Thus, according to the embodiment of the present technology, the radio communication resources can efficiently be utilized using the radio access service at the user's preference timing.

In the first embodiment of the present technology, the example has hitherto been described in which the radio communication apparatus 200 determines whether the radio communication quality is equal to or greater than the given value. However, an information processing apparatus (for example, a communication quality management server) other than the radio communication apparatus 200 may determine whether the radio communication quality is equal to or greater than the given value. For example, an information processing apparatus accessed to the radio communication apparatus 200 via a radio line may acquire the position information regarding the position of the radio communication apparatus 200 and determine whether the radio communication quality is equal to or greater than the given value based on the position information. When the information processing apparatus determines that the radio communication quality of the area where the radio communication apparatus 200 is located is equal to or greater than the given value, the information processing apparatus transmits a notification indicating the determination to the radio communication apparatus 200. When the radio communication apparatus 200 receives the notification, the radio communication apparatus 200 executes the access request registered in the process standby task at the timing at which the notification is received.

In terms of the power consumption, only when one or more access requests are registered in the process standby task, the radio communication apparatus 200 may be set such that the notification indicating that the radio communication quality is good.

Since the number of access requests registered in the process standby task is shared between the radio communication apparatus 200 and the information processing apparatus, the radio communication apparatus 200 may transmit the number of access requests registered in the process standby task to the information processing apparatus. The information processing apparatus may be notified of the number of access requests registered in the process standby task periodically or at a timing at which the number of access requests registered in the process standby task is changed.

Likewise, an information processing apparatus other than the radio communication apparatus 200 may determine whether the radio communication fee is equal to or greater than the given value.

2. Second Embodiment

In the first embodiment of the present technology, the example has hitherto been described in which the access method is selected when the access request for accessing the desired access destination is executed. For example, when the access request is executed at the timing at which the radio communication quality satisfies the given condition, it can be considered that the radio communication resources can efficiently be used. Therefore, for example, it is important to improve the selection ratio by providing a privilege to users who select the execution of the access request at the timing at which the radio communication quality satisfies the given condition. Accordingly, in a second embodiment of the present technology, an example will be described in which an access method and a radio communication fee are appropriately set. Further, in the second embodiment of the present technology, a communication system and the configuration of a radio communication apparatus or the like are almost the same as those shown in FIGS. 1 and 2 and the like. Therefore, the same reference numerals are given to the common constituents to those of the first embodiment of the present technology and the description thereof will not be partially repeated.

Display Example of Setting Screen

Figure 27A:
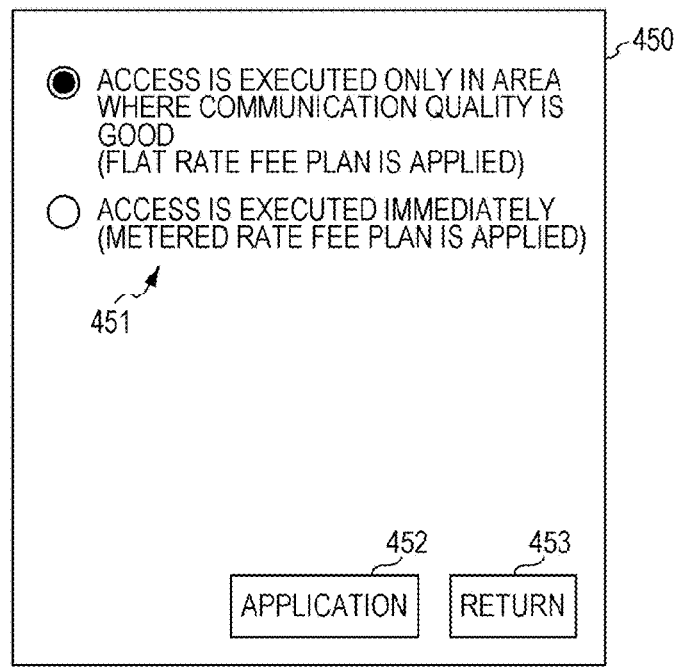
FIGS. 27A and 27B are diagrams illustrating display examples of display screens displayed on the display unit according to a second embodiment of the present technology.
Figure 27B:
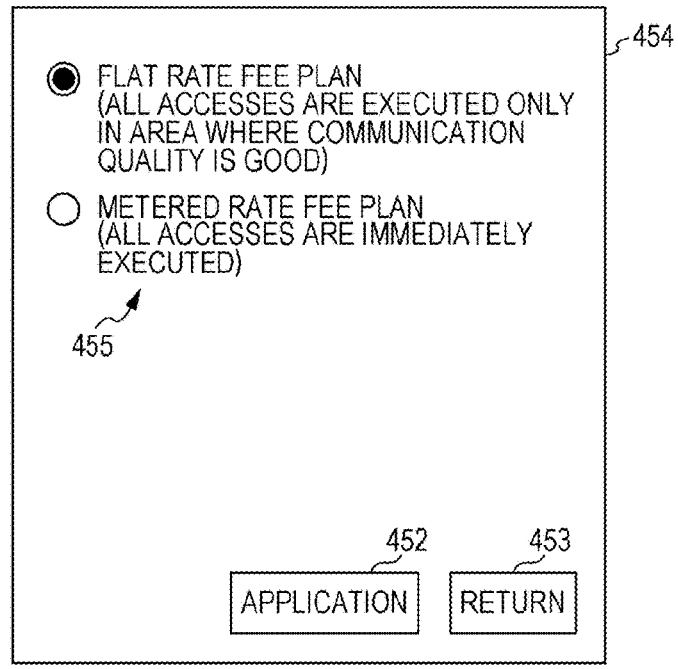

FIGS. 27A and 27B are diagrams illustrating display examples of display screens displayed on the display unit 250 according to a second embodiment of the present technology.

FIG. 27A shows an access method setting screen 450 configured to set an access method when the radio communication apparatus accesses a desired access destination via a predetermined network. The access method setting screen 450 has an access method display region 451, an application button 452, and a return button 453.

The access method display region 451 is a region in which a plurality of access methods are displayed when the radio communication apparatus accesses the desired access destination via the predetermined network. Further, on the access method display region 451, a fee plan (displayed in parenthesis) corresponding to the selection method and a radio button corresponding to the access method are displayed for each selection method.

FIG. 27A shows an example in which a desired access method is selected using the radio button. However, different display forms (for example, each access method is displayed as an icon which can be pressed down) used to select the plurality of access methods may be configured. The different display forms may also be configured in examples shown in FIGS. 29A and 29B, 31A and 31B, and the like.

The application button 452 is a button that is pressed down to confirm an access method for which a check mark is added to the radio button among the plurality of access methods displayed in the access method display region 451.

Figure 28A:
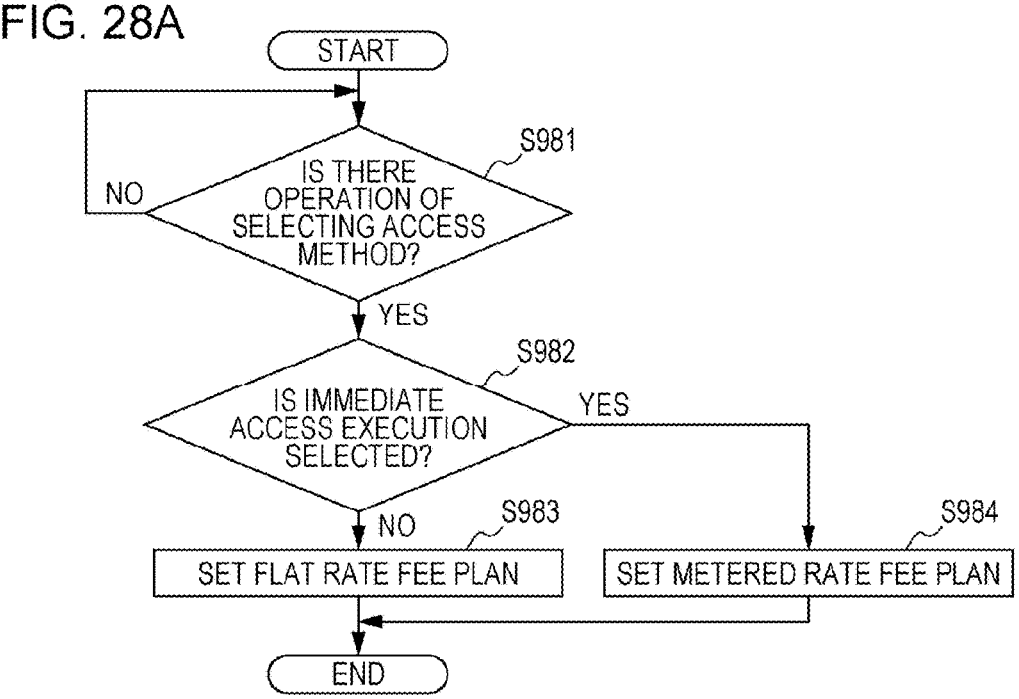
FIGS. 28A and 28B are flowcharts illustrating examples of processing sequences of a setting process performed by the radio communication apparatus according to the second embodiment of the present technology.

In this way, FIG. 27A shows the example in which the fee plan is set based on the set access method. An example of the processing sequence of the setting process is shown in FIG. 28A.

FIG. 27B shows a fee plan setting screen 454 configured to set the fee plan when the radio communication apparatus accesses the desired access destination via the desired network. The fee plan setting screen 454 has a fee plan display region 455, an application button 452, and a return button 453.

The fee plan display region 455 is a region in which a plurality of fee plans are displayed when the radio communication apparatus accesses the desired access destination via the desired network. Further, on the fee plan display region 455, the selection method (displayed in parenthesis) corresponding to the fee plan and the radio button corresponding to the fee plan are displayed for each selection method.

FIG. 27B shows an example in which the access method is set based on the set fee plan. An example of the processing sequence of the setting process is shown in FIG. 28B.

Process Example of Radio Communication Apparatus

Figure 28B:
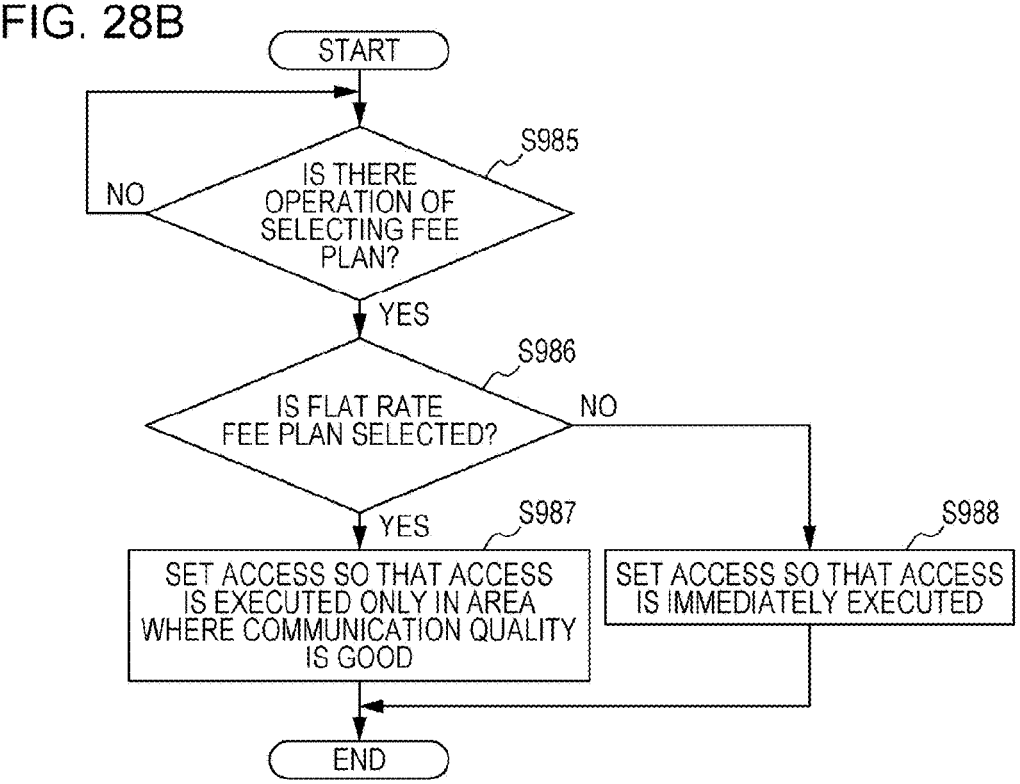

FIGS. 28A and 28B are flowcharts illustrating examples of the processing sequences of the setting process performed by the radio communication apparatus 200 according to the second embodiment of the present technology. FIG. 28A shows an example of the setting process when the access method setting screen 450 shown in FIG. 27A is displayed.

First, it is determined whether an operation of selecting the access method is executed on the access method setting screen 450 (step S981). For example, it is determined whether an operation of pressing down the application button 452 is executed when the check mark is added to any one of the radio buttons in the access method display region 451 of the access method setting screen 450. When the operation of selecting the access method is not executed (step S981), a monitoring process continues.

When the operation of selecting the access method is executed (step S981), it is determined whether a selection operation of selecting "IMMEDIATE ACCESS REQUEST" is executed (step S982). When the selection operation of selecting "IMMEDIATE ACCESS REQUEST" is not executed (step S982), a fee plan of a flat rate fee is set (step S983). When the selection operation of selecting "IMMEDIATE ACCESS REQUEST" is executed (step S982), a fee plan of a measured rate fee is set (step S984).

FIG. 28B shows an example of the setting process when the fee plan setting screen 454 shown in FIG. 27B is displayed.

First, it is determined whether an operation of selecting the fee plan is executed on the fee plan setting screen 454 (step S985). For example, it is determined whether an operation of pressing down the application button 452 is executed when the check mark is added to any one of the radio buttons in the fee plan display region 455 of the fee plan setting screen 454. When the operation of selecting the fee plan is not executed (step S985), a monitoring process continues.

When the operation of selecting the fee plan is executed (step S985), it is determined whether a selection operation of selecting a "FLAT RATE FEE PLAN" is executed (step S986). When the selection operation of selecting the "FLAT RATE FEE PLAN" is executed (step S986), access setting of "ACCESS IS EXECUTED ONLY IN AREA WHERE COMMUNICATION QUALITY IS GOOD" is executed (step S987). On the other hand, when the selection operation of selecting the "FLAT RATE FEE PLAN" is not executed (that is, a selection operation of selecting "MEASURED RATE FEE PLAN" is executed) (step S986), an access setting of "ACCESS REQUEST IS IMMEDIATELY EXECUTED" is executed (step S988).

By displaying the set details (the access method and the types of fee plans) on a part of the display unit 250 of the radio communication apparatus 200 after the setting, the user can easily understand the set details. For example, the set details can be displayed using characters or icons.

Since the packet communication has been spread, a fee system of a packet flat rate has been widely used in the country. Further, the traffics have sharply been increased with an increase in the number of smart phones, thereby having an oppressive influence on the capacity of a communication service provider. In the situation, it can be supposed that the packet flat rate fee system may reach the limit in the near future and thus may be transitioned to a measured rate fee system.

For example, when the traffics generated by few % heavy users occupy half of the entire traffics, many general users may pay expensive costs for the few % heavy users in exchange for the flat rate fee system.

However, it is supposed that the users may easily select the flat rate fee system in which the users can know the upper limit of the radio communication fee, but may resist the measured rate fee system. For this reason, it is important to build a billing system for realizing flexible fee systems in terms of various use forms of the users. Accordingly, in the second embodiment of the present technology, the access method and the radio communication fee are appropriately set. That is, users who select the access request at the timing at which the radio communication quality satisfies a given condition can execute communication in accordance with only an access method that does not impose the burden on a base station. Therefore, the users can set a cheaper flat rate fee plan.

FIGS. 27A, 27B, 28A, and 28B shows the examples in which the access method and the fee plan are selected among two access methods and two fee plans. However, by providing an access method of executing limited communication (for example, communication rate limit such as the maximum 300 kbps), a further cheaper flat rate fee plan (second flat rate fee plan) can be set. This setting example is shown in FIGS. 29A, 29B, and 30.

Display Example of Setting Screen

Figure 29A:
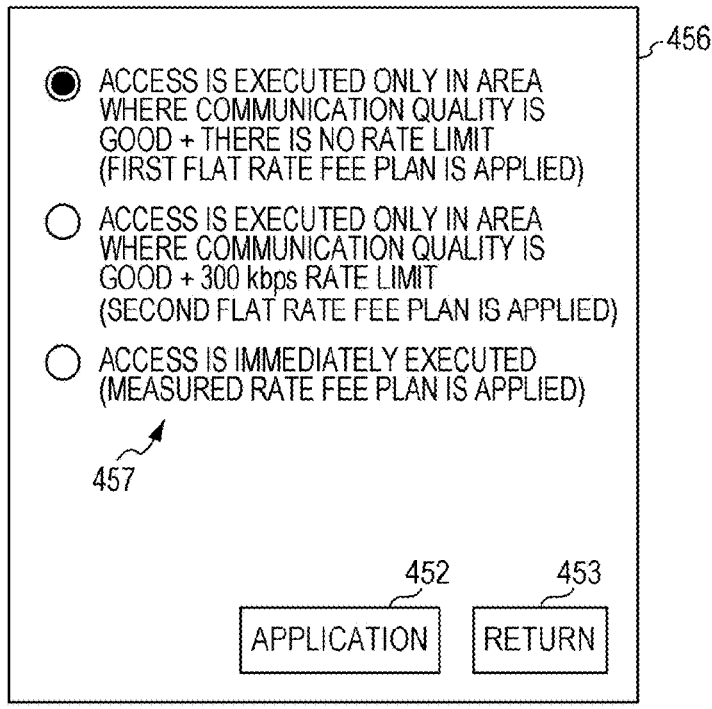
FIGS. 29A and 29B are diagrams illustrating display examples of display screens displayed on the display unit according to the second embodiment of the present technology.
Figure 29B:
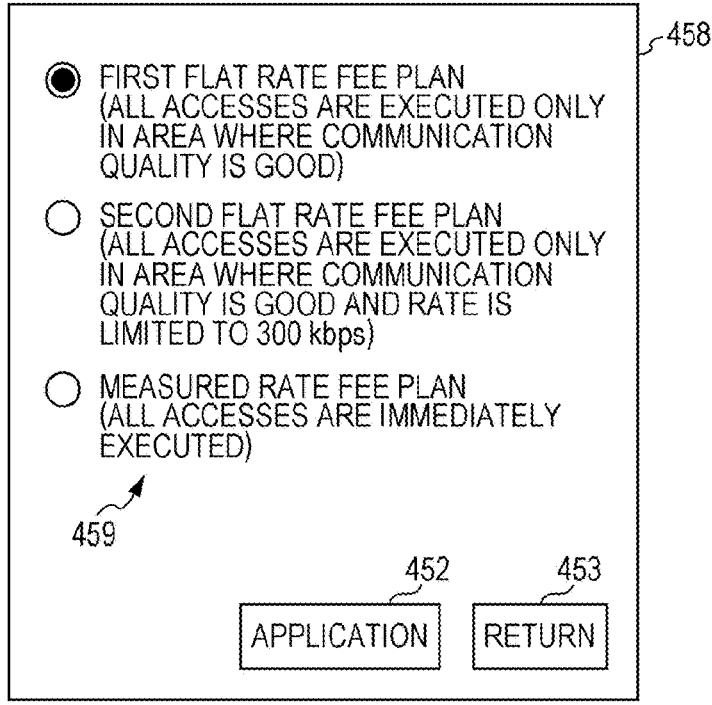

FIGS. 29A and 29B are diagrams illustrating display examples of display screens displayed on the display unit 250 according to the second embodiment of the present technology.

FIG. 29A shows an access method setting screen 456 configured to set the access method when the radio communication apparatus accesses the desired access destination via the predetermined network. The access method setting screen 456 has an access method display region 457, an application button 452, and a return button 453.

The access method setting screen 456 is almost the same as the access method setting screen 450 shown in FIG. 27A except for the fact that an access method (an access method at the second item) in which the communication rate limit of 300 kbps is added in the access method display region 457. Therefore, the detailed description thereof will not be repeated.

In this way, FIG. 29A shows an example in which the fee plan is set based on the set access method. An example of the processing sequence of the setting process is shown in FIG. 30.

FIG. 29B shows a fee plan setting screen 458 configured to set the fee plan when the radio communication apparatus accesses the desired access destination via the predetermined network. The fee plan setting screen 458 has a fee plan display region 459, an application button 452, and a return button 453.

The fee plan setting screen 458 is almost the same as the fee plan setting screen 454 shown in FIG. 27B except for the fact that the second flat rate fee plan (an access method at the second item) is added in the fee plan display region 459. Therefore, the detailed description thereof will not be repeated.

In this way, FIG. 29B shows an example in which the access method is set based on the set fee plan.

Process Example of Radio Communication Apparatus

FIG. 30 is a flowchart illustrating an example of the processing sequence of the setting process performed by the radio communication apparatus 200 according to the second embodiment of the present technology. Since the processing sequence is a modified example of the processing sequence of FIG. 28A, the same reference numerals are given to the common constituents to those of FIG. 28A and the description thereof will not be repeated.

When the operation of selecting "IMMEDIATE ACCESS REQUEST" is not executed (step S982), it is determined whether a selection operation of selecting "ACCESS IS EXECUTED ONLY IN AREA WHERE COMMUNICATION QUALITY IS GOOD+300 kbps RATE LIMIT" is executed (step S991). When the selection operation is not executed (step S991), the first flat rate fee plan is set (step S992). On the other hand, when the selection operation is executed (step S991), the second flat rate fee plan is set (step S993).

The setting process described with reference to FIG. 29B can be executed as a modified example of the setting process of FIG. 28B. Here, the setting process will not be described and illustrated.

By displaying the set details (the access method, the rate limit or no rate limit, and the types of fee plans) on a part of the display unit 250 of the radio communication apparatus 200 after the setting, the user can easily understand the set details. For example, the set details can be displayed using characters or icons.

By setting the plural types of fee planes in this way, the fee plans on which appropriate prices are reflected can be set for the users who prefer both extreme use methods, that is, the cost-weighted use method, and the communication rate-weighted use method.

Next, a setting example (hybrid method) of the fee plan satisfied by many users between the users preferring the extreme use methods, that is, the cost-weighted use method, and the communication rate-weighted use method will be described. For example, the fee plan can be set for each day or each hour in accordance with an access method (a method of selecting the execution of the access request at the timing at which the radio communication quality satisfies the given condition or a method of selecting the immediate execution of the access request) of using the flat rate fee plan and the measured rate fee plan.

For example, the flat rate fee per day and the flat rate fee per month are converted into the fee per day. Further, the flat rate fee per hour is determined by converting the flat rate fee per month in a hour unit. Further, when the flat rate fee per month is converted into the flat rate fee per hour, the flat rate fee per hour may be changed depending on the daytime and the nighttime. Further, the communication unit cost of the measured rate may be changed depending on a difference in the daytime, the night time, or the like.

Display Example of Setting Screen

Figure 31A:
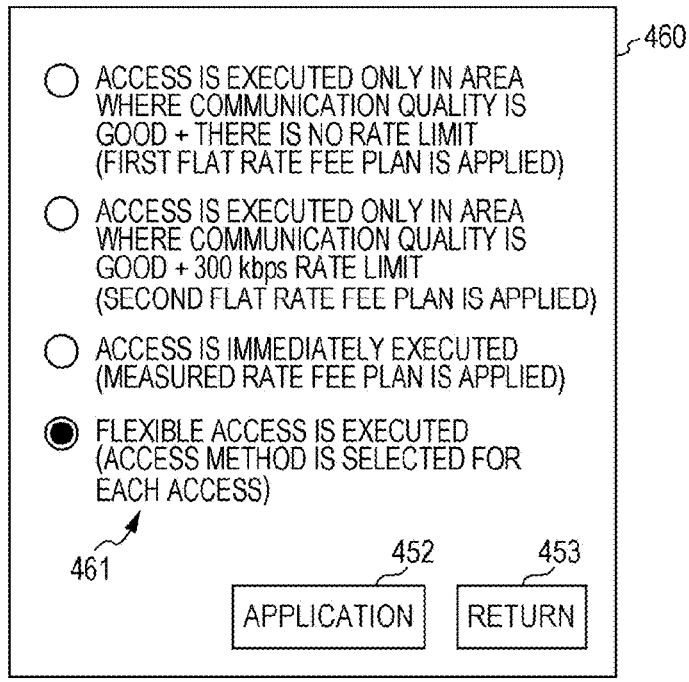
FIGS. 31A and 31B are diagrams illustrating display examples of display screens displayed on the display unit according to the second embodiment of the present technology.
Figure 31B:
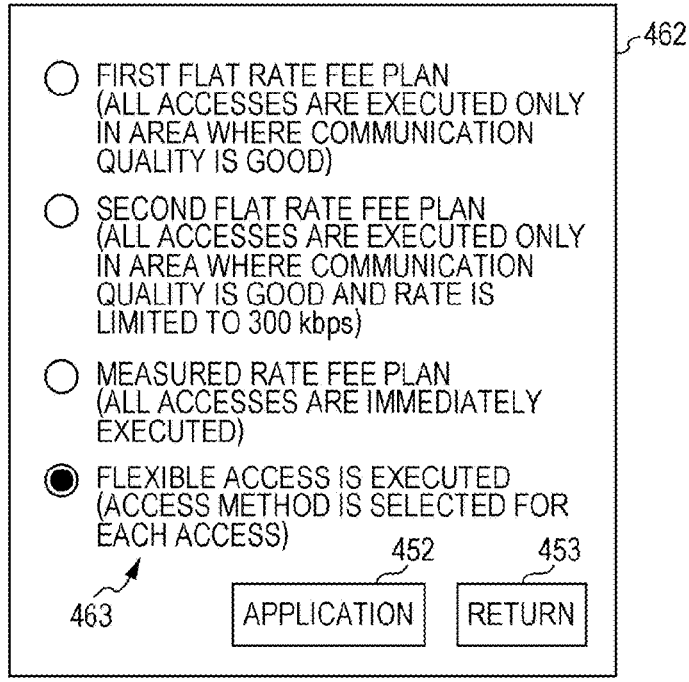

FIGS. 31A and 31B are diagrams illustrating display examples of display screens displayed on the display unit 250 according to the second embodiment of the present technology.

FIG. 31A shows an access method setting screen 460 configured to set the access method when the radio communication apparatus accesses the desired access destination via the predetermined network. The access method setting screen 460 has an access method display region 461, an application button 452, and a return button 453.

The access method setting screen 460 is almost the same as the access method setting screen 456 shown in FIG. 29A except for an access method (an access method at the fourth item) of executing a flexible access in the access method display region 461. Therefore, the detailed description thereof will not be repeated. Here, the flexible access can be comprehended as an access method of using plural types of access methods depending on the circumstances of the user. For example, the user can separately use "ACCESS REQUEST IS IMMEDIATELY EXECUTED", "ACCESS IS EXECUTED ONLY IN AREA WHERE COMMUNICATION QUALITY IS GOOD", or "ACCESS IS EXECUTED ONLY IN AREA WHERE COMMUNICATION QUALITY IS GOOD+300 kbps RATE LIMIT" depending on the circumstance.

Figure 32:
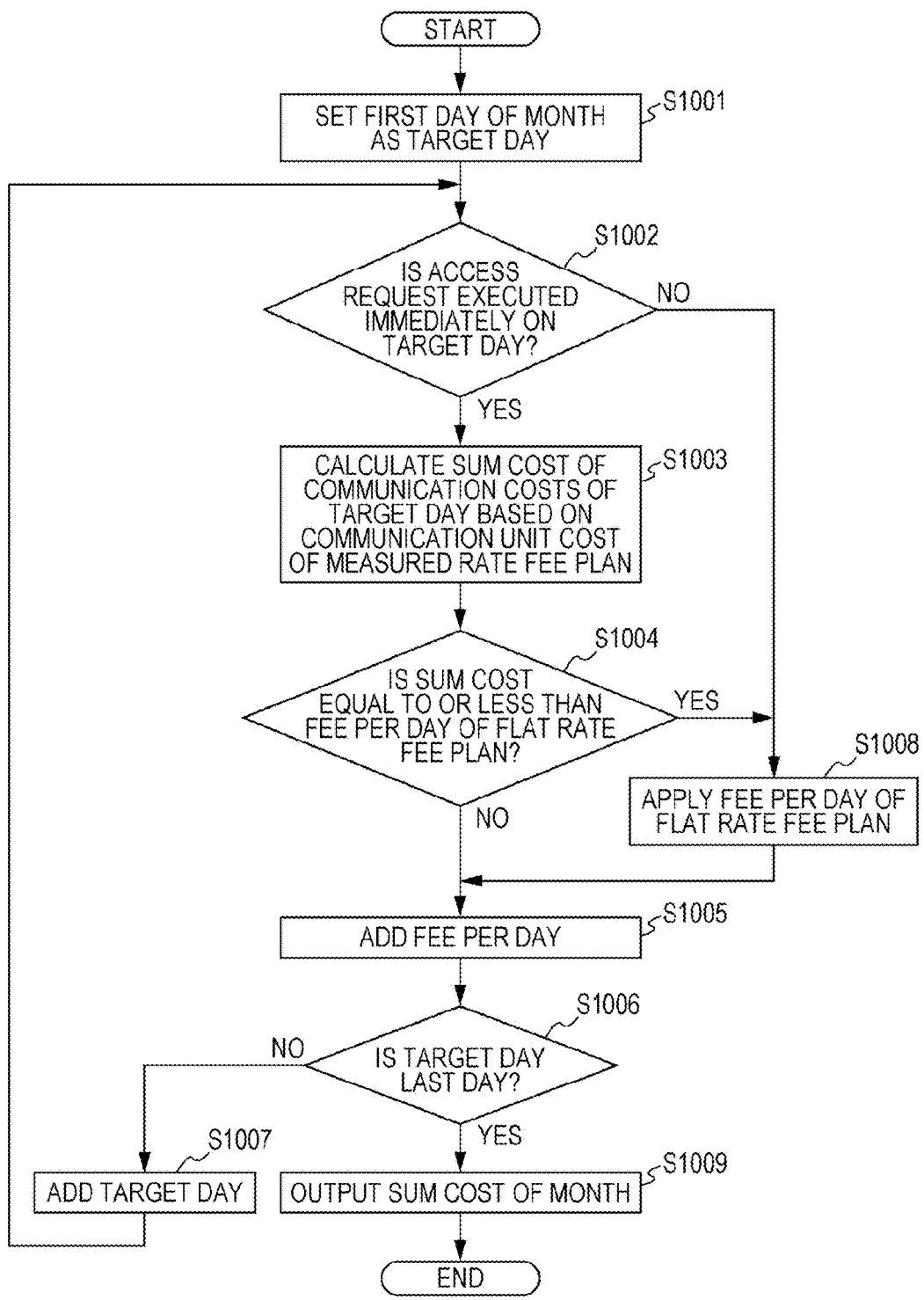
FIG. 32 is a flowchart illustrating an example of the processing sequence of a billing process performed by a network control apparatus according to the second embodiment of the present technology.

In this way, FIG. 31A shows an example in which the fee plan is set based on the set access method. FIG. 32 shows an example of the processing sequence of a process of calculating the communication cost when the access method of executing the flexible access is set.

FIG. 31B shows a fee plan setting screen 462 configured to set the fee plan when the radio communication apparatus accesses the desired access destination via the desired network. The fee plan setting screen 462 has a fee plan display region 463, an application button 452, and a return button 453.

The fee plan setting screen 462 is almost the same as the access fee plan setting screen 458 shown in FIG. 29B except for the fact that the flexible access fee plan (an access method at the fourth item) is added in the fee plan display region 463. Therefore, the detailed description thereof will not be repeated.

In this way, FIG. 31B shows an example in which the access method is set based on the set fee plan. FIG. 32 shows an example of the processing sequence of the process of calculating the communication cost when the flexible access fee plan is set.

Process Example of Network Control Apparatus

FIG. 32 is a flowchart illustrating an example of the processing sequence of a billing process performed by the network control apparatus 130 according to the second embodiment of the present technology. In the processing sequence, for example, the communication cost of the radio communication apparatus 200 is calculated by converting the communication cost per month into the communication cost per day, when the flexible access fee plan is set.

First, the first day of a month (for example, 1st May) is determined as a target day (step S1001). Subsequently, it is determined whether the access request immediately executed among the access requests from the radio communication apparatus 200 is executed on the target day (step S1002). When the access request immediately executed is executed on the target day (step S1002), the sum cost of the communication costs of the target day is calculated based on the communication unit cost of the measured rate fee plan (step S1003).

Subsequently, it is determined whether the calculated sum cost is equal to or less than the day fee of the flat rate fee plan (for example, the first flat rate fee plan) (step S1004). When the calculated sum cost is not equal to or less than the day fee of the flat rate fee plan (that is, the calculated sum cost exceeds the day fee of the flat rate fee plan) (step S1004), the sum cost of the monthly sum costs is added to the calculated sum cost (step S1005).

Subsequently, it is determined whether the target day is the last day (for example, 31st May) (step S1006). When the target day is not the last day, the target day is added (step S1007) and the process returns to step S1002. On the other hand, when the target day is the last day (step S1006), the sum cost of the month is output (step S1009).

When the access request immediately executed is not executed on the target day (step S1002), the day fee of the monthly flat rate fee is applied (step S1008) and the day fee of the flat rate fee is added to the sum cost of the monthly communication fee (step S1005). When the sum cost (step S1003) of the communication costs of the target day calculated based on the communication unit cost of the measured rate fee plan is equal to or less than the day fee of the flat rate fee flan (step S1004), the process proceeds to step S1008.

By displaying the set details (the access method, the rate limit or no rate limit, and the types of fee plans) on a part of the display unit 250 of the radio communication apparatus 200 after the setting, the user can easily understand the set details. For example, the set details can be displayed using characters or icons.

Transition Example of Display Screen

Figure 33A:
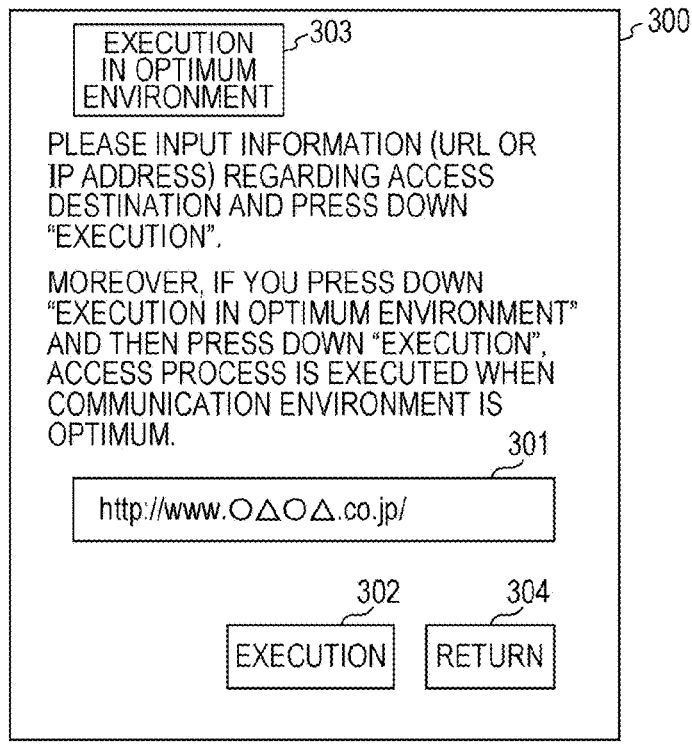
FIGS. 33A and 33B are diagrams illustrating a transition example of display screens displayed on the display unit according to the second embodiment of the present technology.
Figure 33B:
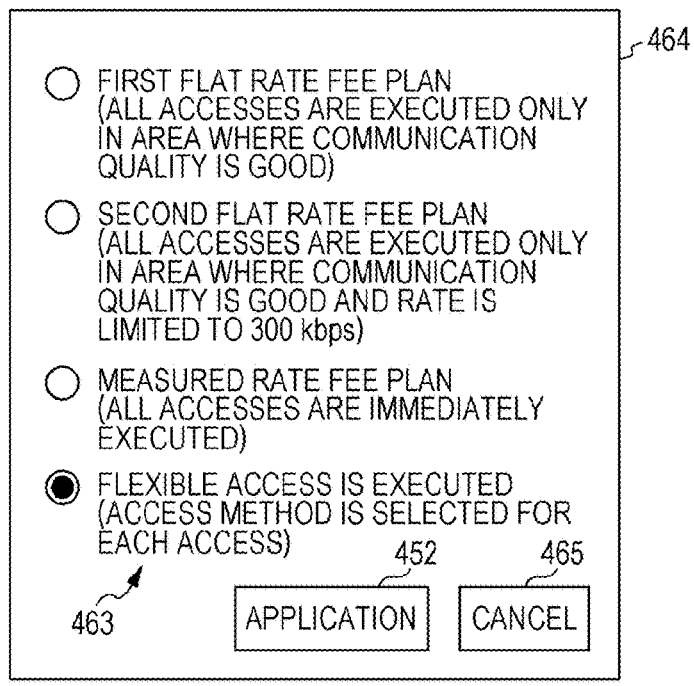

FIGS. 33A and 33B are diagrams illustrating a transition example of the display screen displayed on the display unit 250 according to the second embodiment of the present technology.

FIG. 33A shows an access request operation screen 300 configured to execute an access request for accessing a desired access destination via a predetermined network. Since the access request operation screen 300 is the same as the access request operation screen shown in FIG. 4, the detailed description thereof will not be repeated here.

FIG. 33B shows a fee plan setting screen 464 configured to set a fee plan when the radio communication apparatus accesses the desired access destination via the predetermined network. Since the fee plan setting screen 464 is the same as the fee plan setting screen 462 shown in FIG. 31B except for that a cancel button 465 is provided instead of the return button 453, the detailed description thereof will not be repeated here.

Here, it is supposed that the "measured rate fee plan" is set as the fee plan. In this case, when the execution button 303 in the optimum environment is pressed down on the access request operation screen 300 shown in FIG. 33A, a fee plan setting screen 454 shown in FIG. 33B is displayed. That is, in a case where the "measured rate fee plan" is set, the user is urged to change the fee plan into the "flexible access fee plan", when the user selects the execution of the access request at the timing at which the radio communication quality satisfies the given condition.

When the application button 452 is pressed down on the fee plan setting screen 464 shown in FIG. 33B, the fee plan is changed into the "flexible access fee plan" and the access method is changed into "FLEXIBLE ACCESS IS EXECUTED." Further, after the application button 452 is pressed down, the access request operation screen 300 shown in FIG. 33A is displayed again. However, a visual effect indicating that the execution button 303 in the optimum environment has been pressed down is exhibited on the access request operation screen 300 to the extent that the user recognize the visual effect. For example, the visual effect can be displayed by changing the color of the execution button 303 in the optimum environment. Further, the fact that the execution button 303 in the optimum environment has been pressed down is displayed.

When the execution button 302 is pressed down on the re-displayed access request operation screen 300, the access request is executed at the timing at which the radio communication quality satisfies the given condition.

When the cancel button 465 is pressed down on the fee plan setting screen 464 shown in FIG. 33B, the fee plan and the access method are not changed and the access request operation screen 300 shown in FIG. 33A is displayed again. In this case, the screen returns to the state where the execution button 303 in the optimum environment is not pressed down. Accordingly, when the execution button 302 is pressed down, the access request is immediately executed.

In this example, the case has been supposed in which the "measured rate fee plan" is set as the fee plan. However, the display may be transitioned even when the access method "ACCESS IS IMMEDIATELY EXECUTED" is set.

Process Example of Radio Communication Apparatus

FIG. 34 is a flowchart illustrating an example of the processing sequence of the setting process performed by the radio communication apparatus 200 according to the second embodiment of the present technology. In the processing sequence, for example, the flexible access fee is automatically set.

First, the control unit 230 determines whether an operation (for example, an operation of inputting the access destination information in the access destination information input region 301 shown in FIG. 33A) of inputting the access destination information is executed (step S1011). When the operation of inputting the access destination information is not executed, a monitoring process continues. On the other hand, when the operation of inputting the access destination information is executed (step S1011), the control unit 230 determines whether an operation of pressing down the execution button (for example, the execution button 303 in the optimum environment in FIG. 33A) in the optimum environment is executed (step S1012).

When the operation of pressing down the execution button in the optimum environment is executed (step S1012), the control unit 230 determines whether the measured rate fee plan is set (step S1013). When the measured rate fee plan is set (step S1013), the control unit 230 executes a setting process of setting the flexible access fee plan (step S1014).

On the other hand, when the operation of pressing down the execution button in the optimum environment is executed (step S1012), the set fee plan (for example, the first flat rate fee plan or the second flat rate fee plan) continues (step S1015). Further, even when the measured rate fee plan is not set (step S1013), the set fee plan continues (step S1015).

Calculation Example of Fee of Each Day when Flexible Access Fee Plan is Set

FIG. 32 shows the example in which the communication cost per month is calculated. Here, it is supposed that the access request is immediately executed only once for the number of accesses (for example, 10 times) of a given day. In this case, when the fee associated with all the access requests is calculated based on the communication unit cost of the measured rate fee plan, the user may not consider that the fee is the willed fee.

Figure 35:
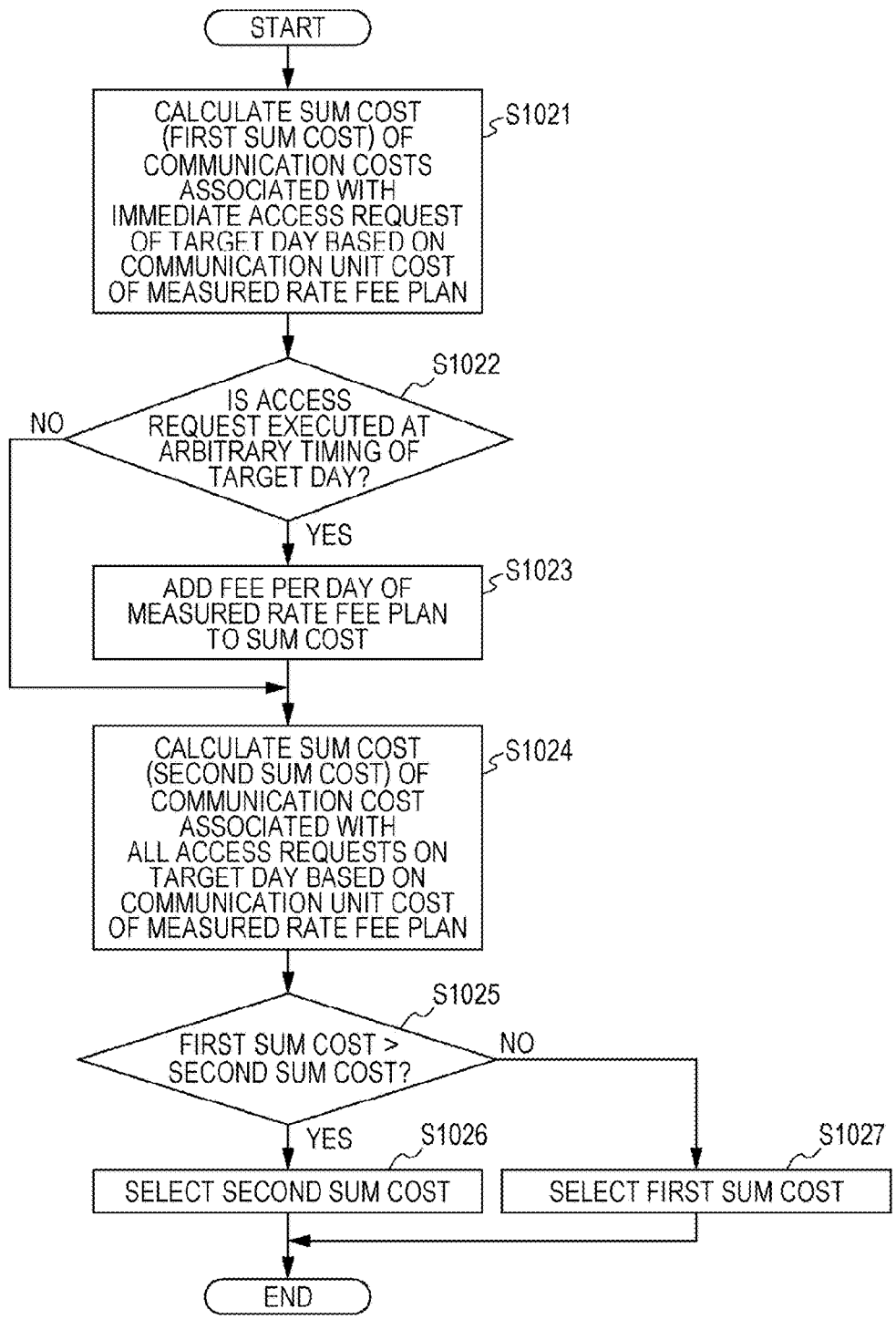
FIG. 35 is a flowchart illustrating an example of the processing sequence of the billing process performed by the network control apparatus according to the second embodiment of the present technology.

Accordingly, FIG. 35 shows an example of a billing method in which the flat rate fee plan is applied when the access request is executed at the timing at which the radio communication quality satisfies the given condition, whereas the measured rate fee plan is applied when the other access requests are executed. However, the fee calculated by applying both fee plans is compared to the fee calculated by applying the measured rate fee plan, and then the cheaper fee plan is selected.

Process Example of Network Control Apparatus

FIG. 35 is a flowchart illustrating an example of the processing sequence of the billing process performed by the network control apparatus 130 according to the second embodiment of the present technology. In the processing sequence, for example, the communication cost per month is calculated every day for the communication cost of the radio communication apparatus 200, when the flexible access fee plan is set. The processing sequence corresponds to step S1003 of the processing sequence shown in FIG. 32.

First, the sum cost (first sum cost) of the communication costs associated with the immediate access request at the target day is calculated based on the communication unit cost of the measured rate fee plan (step S1021).

Subsequently, it is determined whether the access request is executed at an arbitrary timing (the timing at which the radio communication quality satisfies the given condition) on the target day (step S1022). When the access request is executed at the arbitrary timing on the target day (step S1022), the day fee of the flat rate fee plan (for example, the first flat rate fee plan) is added to the first sum cost (step S1023). On the other hand, when the access request is executed at the arbitrary timing on the target day (step S1022), the process proceeds to step S1024.

Subsequently, the sum cost (second sum cost) of the communication costs associated with all the access requests on the target day is calculated based on the communication unit cost of the measured rate fee plan (step S1024). Subsequently, the first sum cost is compared to the second sum cost to determine whether the first sum cost is greater than the second sum cost (step S1025). When the first sum cost is greater than the second sum cost (step S1025), the second sum cost is selected (step S1026). On the other hand, when the first sum cost is equal to or less than the second sum cost (step S1025), the first sum cost is selected (step S1027).

In the second embodiment of the present technology, the control unit 230 sets the fee plan of the communication associated with the access request based on the execution timing of the access request of the user. In this way, by providing the privilege to the users selecting the execution of the access request at the timing at which the radio communication quality satisfies the given condition, the selection ratio can be improved. Thus, the radio communication resources can efficiently be utilized.

3. Third Embodiment

In the first and second embodiments of the present technology, the examples have hitherto been described in which the radio communication apparatus accesses the communication service provider based on the USIM information that the radio communication apparatus keeps. Here, it is supposed that in an area (or an area to which the radio communication apparatus is moved) where the radio communication apparatus is located, accessing another communication service provider is better in the communication environment than accessing the communication service provider associated with the USIM information that the radio communication apparatus currently keeps. In this case, it is supposed that the radio communication resources can efficiently be utilized by accessing another communication service provider in the area. Accordingly, in a third embodiment of the present technology, an example will be described in which the USIM information is changed in accordance with the area where the access request is executed. The configurations of a communication system, a radio communication apparatus, and the like according to the third embodiment of the present technology are almost the same as those shown in FIGS. 1 and 2 and the like. Therefore, the same reference numerals are given to the common constituents to those of the first embodiment of the present technology and the description thereof will not be partially repeated.

Configuration Example of Communication System

Figure 36:
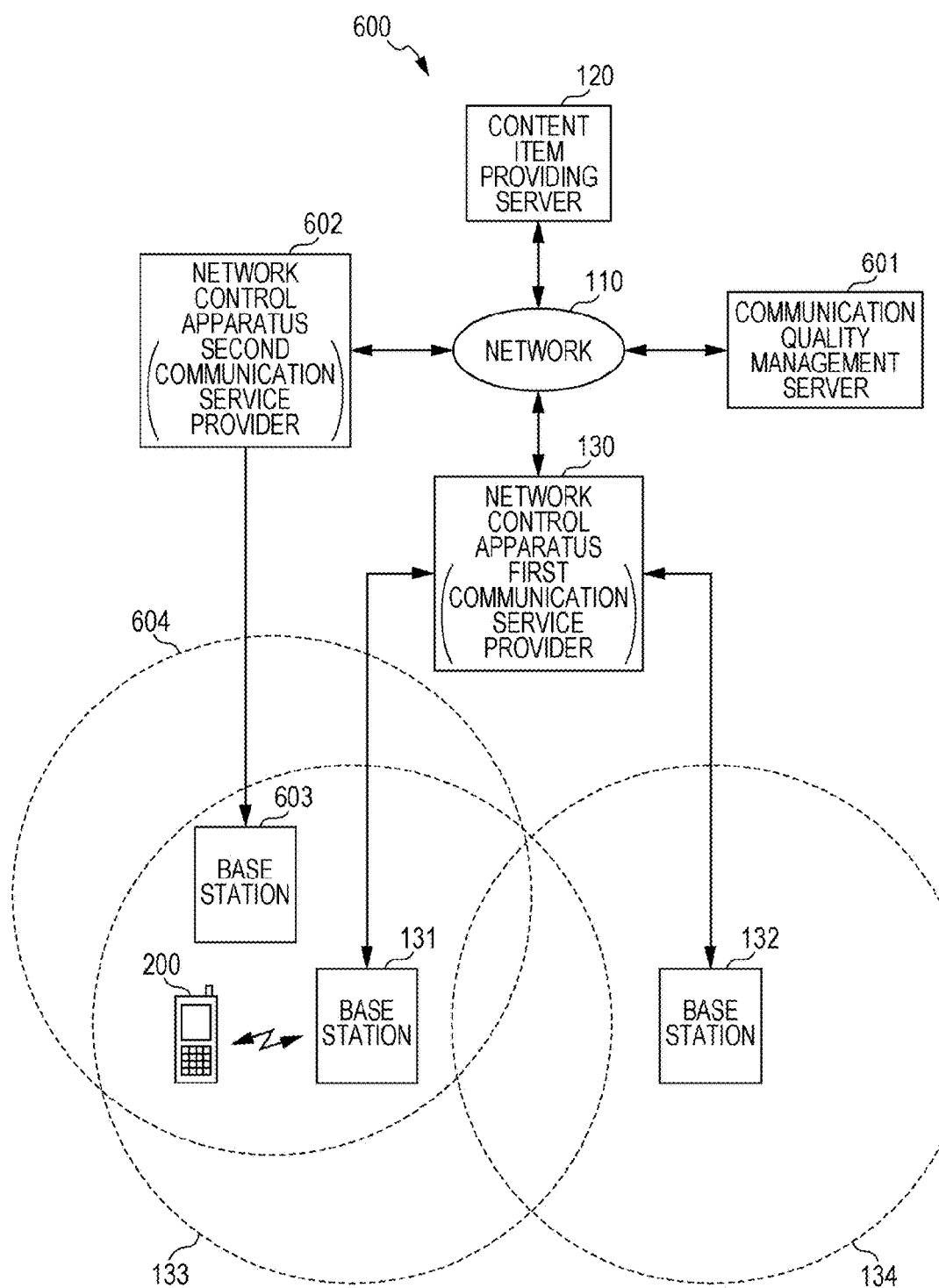
FIG. 36 is a block diagram illustrating an example of the configuration of a communication system according to a third embodiment of the present technology.

FIG. 36 is a block diagram illustrating the configuration example of a communication system 600 according to the third embodiment of the present technology. The communication system 600 is a modified example of the communication system 100 shown in FIG. 1. Therefore, the same reference numerals are given to the common constituents to those of the communication system 100 and the description thereof will not be partially repeated.

The communication system 600 includes a communication quality management server 601, a network control apparatus 602, and a base station 603.

The communication quality management server 601 is an information processing apparatus that manages the radio communication quality in the area where each radio communication apparatus accessing each base station through a radio line is located. The communication quality management server 601 provides information regarding the radio communication quality to each radio communication apparatus.

For example, the communication quality management server 601 acquires radio communication quality information (the information regarding the radio communication quality) and position information (the current position of the radio communication apparatus) from the plurality of radio communication apparatuses and specifies the area where each radio communication apparatus is located based on the information. The communication quality management server 601 monitors the radio communication quality of the area corresponding to the base station that each communication service provider administrates and detects whether there is an area where the radio communication quality satisfies the given condition. For example, the communication quality management server 601 can detect an area where the radio communication quality satisfies the given condition based on the radio communication quality information and the position information acquired from the plurality of radio communication apparatuses or the information from each base station. The communication quality management server 601 notifies the radio communication apparatus 200 that the radio communication quality is good at the timing at which the radio communication apparatus 200 arrives in the area, when the communication quality management server 601 detects the area where the radio communication quality satisfies the given condition. In this case, the notification is transmitted via the communication service provider associated with the USIM information that the radio communication apparatus 200. The notification includes information (communication service provider information) regarding the communication service provider associated with the base station corresponding to the area where the radio communication quality satisfies the given condition. It is supposed that the communication quality management server 601 is equipped by the communication service provider, an MVNO, or the like that provides the radio communication service.

The network control apparatus 602 is a communication control apparatus that is administrated by the second communication service provider that provides the radio access service. The network control apparatus 602 controls authentication of the radio communication apparatus accessed via the base station 603. The network control apparatus 602 accesses the authenticated radio communication apparatus to the network 110 via a gateway (not shown). The second communication service provider is, for example, a mobile communication service provider that provides a radio access service.

The base station 603 is a base station that is administrated by the second communication service provider and is a mobile communication base station (Node B) that accesses the radio communication apparatus, which keeps the USIM information of the second communication service provider, to the network control apparatus 602 through a radio line. FIG. 36 schematically shows the range, in which the radio waves of the base station 603 arrive, as a cell 604.

The radio communication apparatus 200 is configured to execute initial setting of parameters necessary for accessing a radio communication network administrated by the first communication service provider based on the contract with the first communication service provider that administrates the network control apparatus 130.

Example of Access Process in Communication System

Figure 37:
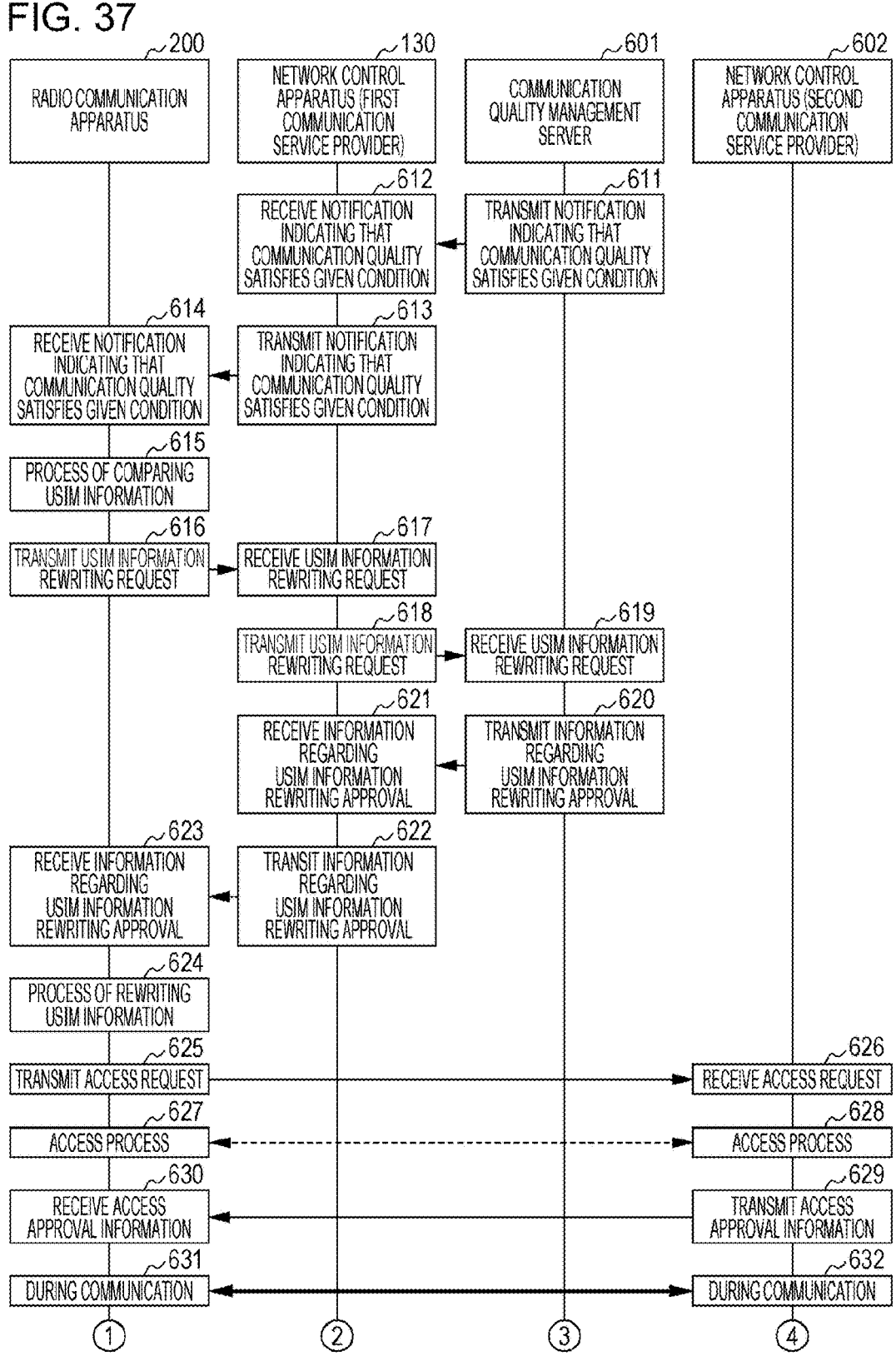
FIG. 37 is a sequence chart illustrating a communication processing example between apparatuses of the communication system according to the third embodiment of the present technology.
Figure 38:
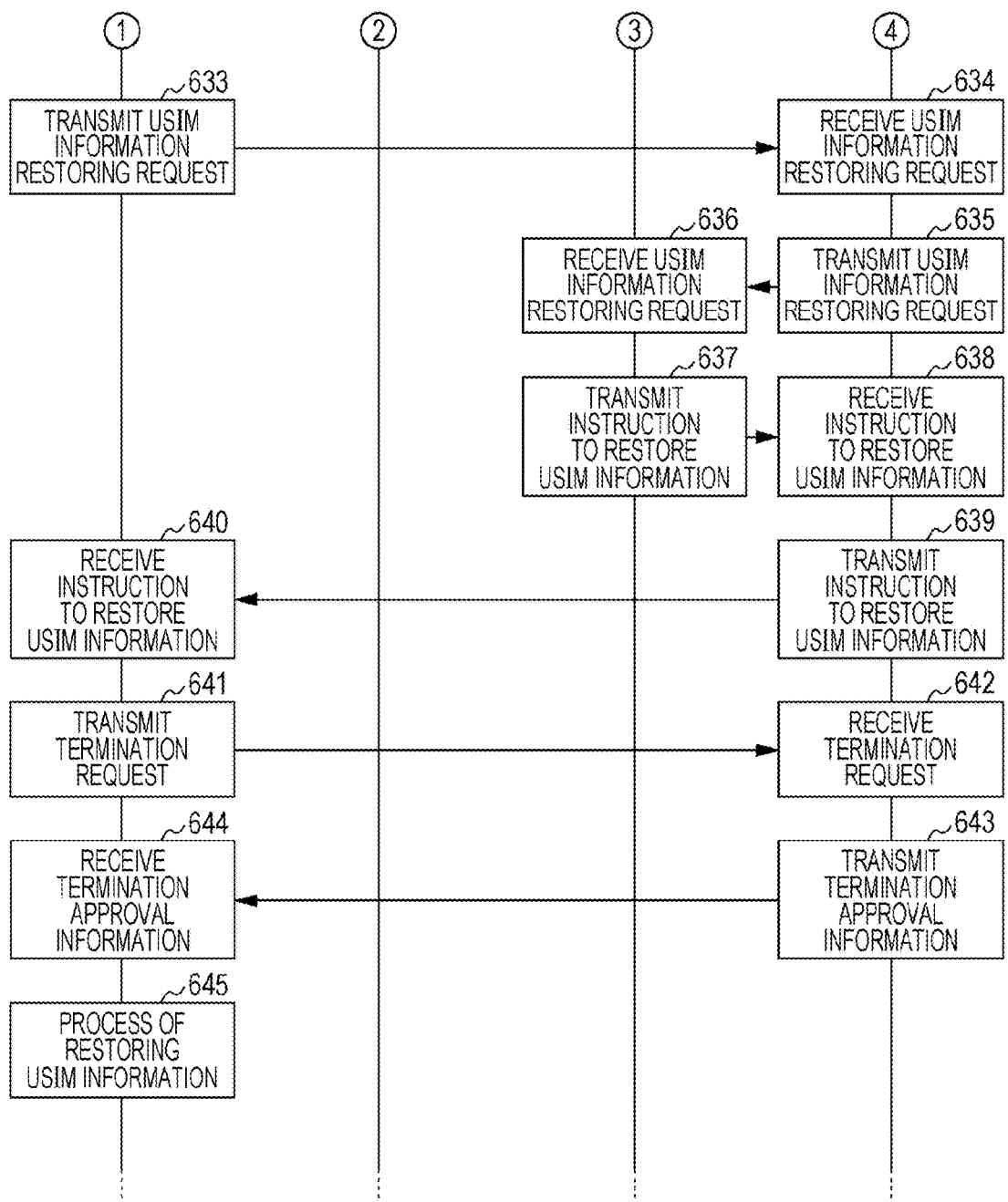
FIG. 38 is a sequence chart illustrating the communication processing example between the apparatuses of the communication system according to the third embodiment of the present technology.

FIGS. 37 and 38 are sequence charts illustrating a communication processing example between the apparatuses of the communication system 600 according to the third embodiment of the present technology. FIGS. 37 and 38 show an example in which the radio communication apparatus 200 automatically acquires the USIM information (contract authentication information) used to access the second communication service provider. FIGS. 37 and 38 show the example in which the access request registered in the process standby task is executed in the area where the radio communication quality satisfies the given condition.

First, the communication quality management server 601 acquires information from each base station via the communication service provider and monitors the radio communication quality in the area of each base station. When the radio communication apparatus 200 arrives in the area where the radio communication quality satisfies the given condition, the communication quality management server 601 transmits a notification indicating that the radio communication quality satisfies the given condition to the radio communication apparatus 200 (611 to 614). In this case, since the radio communication apparatus 200 keeps the USIM information associated with the first communication service provider, the notification is transmitted to the radio communication apparatus 200 via the network control apparatus 130 (611 to 614). Here, the notification indicating that the radio communication quality satisfies the given condition includes information (communication service provider information) regarding the communication service provider associated with the area where the radio communication quality satisfies the given condition. In this example, the area where the radio communication quality satisfies the given condition is assumed to be the area corresponding to the cell 604 shown in FIG. 36. That is, when the radio communication apparatus 200 is accessed to the base station 603 associated with the second communication service provider, it is assumed that the radio communication quality satisfies the given condition.

When the radio communication apparatus 200 receives the notification indicating that the radio communication quality satisfies the given condition (614), the control unit 230 executes a process of comparing the USIM information based on the communication service provider included in the received notification (615). That is, the control unit 230 determines whether the communication service provider associated with the USIM information stored in the USIM information storage unit 270 is the same as the communication service provider specified by the communication service provider information included in the received notification. In this example, as described above, the communication service provider (the first communication service provider) associated with the USIM information stored in the USIM information storage unit 270 is different from the communication service provider (the second communication service provider) associated with the received notification. In this case, the control unit 230 transmits a USIM information rewriting request for rewriting the USIM information of the communication service provider associated with the received notification to the communication quality management server 601 (616 to 619). When the two communication service providers compared to each other are the same as each other, the USIM information is not rewritten and the access request is executed.

When the communication quality management server 601 receives the USIM information rewriting request (619), the communication quality management server 601 authenticates the received USIM information rewriting request. When the USIM information rewriting request is authenticated, the communication quality management server 601 transmits information regarding USIM information rewriting approval to the radio communication apparatus 200 (620 to 623). The information regarding USIM information rewriting approval is information used to set the USIM information associated with the second communication service provider in the radio communication apparatus 200. The information regarding USIM information rewriting approval includes, for example, information (for example, the USIM information associated with the second communication service provider) necessary for accessing the base station 603 administrated by the second communication service provider. For example, when the information regarding USIM information rewriting approval includes the USIM information (the second communication service provider), valid USIM information is set by writing the USIM information in the USIM information storage unit 270. The valid USIM information may be set by keeping the USIM information associated with the second communication service provider in the radio communication apparatus 200 and validating the USIM information. In this case, the information regarding the USIM information rewriting approval includes setting information used to validate the USIM information associated with the second communication service provider. Based on the setting information, the process of validating the USIM information associated with the second communication service provider is executed.

Even when the USIM information rewriting request and the information regarding the USIM information rewriting approval are exchanged between the communication quality management server 601 and the radio communication apparatus 200, the communication is executed via the network control apparatus 130.

When the radio communication apparatus 200 receives the information regarding the USIM information rewriting approval (623), the USIM information rewriting unit 260 executes a rewriting process of rewriting the USIM information associated with the second communication service provider in the USIM information storage unit 270 under the control of the control unit 230 (624). In this way, the valid USIM information is set in the radio communication apparatus 200.

Subsequently, the control unit 230 executes the access request associated with the process standby task information stored in the process standby task information storage unit 280 based on the USIM information associated with the second communication service provider (625 and 626). In this case, the control unit 230 transmits the access request to the network control apparatus 602 (625 and 626), and thus the access process is executed between the radio communication apparatus 200 and the network control apparatus 602 (627 and 628).

Subsequently, the network control apparatus 602 transmits access approval information to the radio communication apparatus 200 (629 and 630) and executes the communication associated with the access request (631 and 632).

Subsequently, when the communication associated with the access request is terminated (631 and 632), the control unit 230 transmits a USIM information restoring request to the communication quality management server 601 via the network control apparatus 602 (633 to 636). The USIM information restoring request is information used to ask the restoration from the USIM information (the second communication service provider) newly set in the radio communication apparatus 200 to the original USIM information (the first communication service provider).

When the communication quality management server 601 receives the USIM information restoring request (636), the communication quality management server 601 transmits information regarding a USIM information restoring instruction to the radio communication apparatus 200 via the network control apparatus 602 (637 to 640). The USIM information restoring instruction is information used to give an instruction of the restoration to the original USIM information (the second communication service provider).

When the radio communication apparatus 200 receives the USIM information restoring instruction (640), the control unit 230 transmits a termination request to the network control apparatus 602 (641 and 642). When the network control apparatus 602 receives the termination request (642), the network control apparatus 602 transmits information termination approval information used to approve the termination to the radio communication apparatus 200 (643 and 644).

Subsequently, the USIM information rewriting unit 260 executes a restoring process of restoring the USIM information associated with the first communication service provider in the USIM information storage unit 270 under the control of the control unit 230 (645). In this way, the original USIM information (the first communication service provider) is set in the radio communication apparatus 200.

Thus, when the communication service provider associated with the kept USIM information is different from the communication service provider associated with the communication service provider included in the received notification, the control unit 230 sets the USIM information associated with the communication service provider included in the received notification. Then, the control unit 230 executes the access request after the setting. Thus, since the communication services provided from the plurality of communication service providers can be used, it is possible to use the broader area where the radio communication quality is good. Further, the communication quality management server 601 may acquire the information transmitted from each base station via the communication service provider and may also calculate the information based on the radio communication quality information acquired from the plurality of radio communication apparatuses.

Example of Access Process in Communication System

Figure 39:
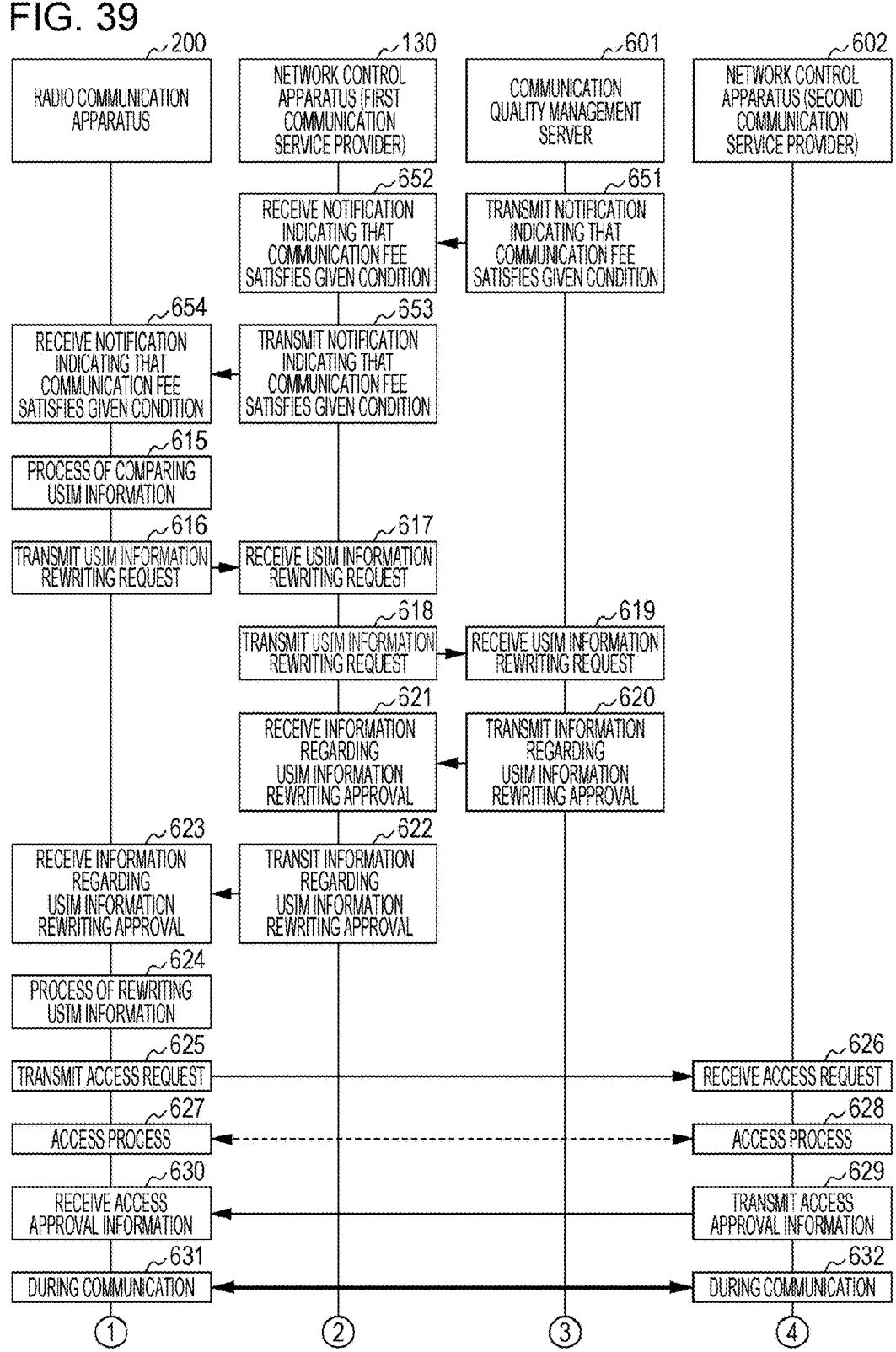
FIG. 39 is a sequence chart illustrating a communication processing example between the apparatuses of the communication system according to the third embodiment of the present technology.

FIG. 39 is a sequence chart illustrating a communication processing example between the apparatuses of the communication system 600 according to the third embodiment of the present technology. FIG. 39 shows an example in which the radio communication apparatus 200 automatically acquires the USIM information (contract authentication information) used to access the second communication service provider. FIG. 39 shows the example in which access request registered in the process standby task is executed in the area where the radio communication fee satisfies the given condition. Since the example shown in FIG. 39 is a modified example of the example of FIGS. 37 and 38, the same reference numerals are given to the common constituents to those of FIGS. 37 and 38 and the description thereof will not be partially repeated.

First, the communication quality management server 601 acquires information from each base station via the communication service provider and monitors the radio communication fee in the area of each base station. When the radio communication apparatus 200 arrives in the area where the radio communication fee satisfies the given condition, the communication quality management server 601 transmits a notification indicating that the radio communication fee satisfies the given condition to the radio communication apparatus 200 (651 to 654). Here, the notification indicating that the radio communication fee satisfies the given condition includes information (communication service provider information) regarding the communication service provider associated with the area where the radio communication fee satisfies the given condition.

Thus, since the communication services provided from the plurality of communication service providers can be used, it is possible to use the broader area where the radio communication fee is lower. Further, the communication quality management server 601 may acquire the information transmitted from each base station via the communication service provider and may also calculate the information based on the radio communication quality information acquired from the plurality of radio communication apparatuses.

In this example, the radio communication apparatus 200 manages the USIM information. However, the communication quality management server 601 may manage the USIM information stored in each radio communication apparatus. For example, the communication quality management server 601 may include a USIM information management database so as to store and manage the USIM information stored in each radio communication apparatus using the USIM information management database.

In this way, when the communication quality management server 601 manages the USIM information, the communication quality management server 601 can execute the process (615) of comparing the USIM information. Further, when the communication service providers are different from each other as the comparison result, the USIM rewriting instruction and the USIM rewriting approval are included in a notification (a notification indicating that the radio communication quality satisfies the given condition or a notification indicating that the radio communication fee satisfies the given condition) to be transmitted to the radio communication apparatus 200, and then the notification is transmitted.

Another information processing apparatus other than the communication quality management server 601 may manage the USIM information stored in each radio communication apparatus and transmit the setting information used to set the USIM information in each radio communication apparatus.

Operation Example of Radio Communication Apparatus

Figure 40:
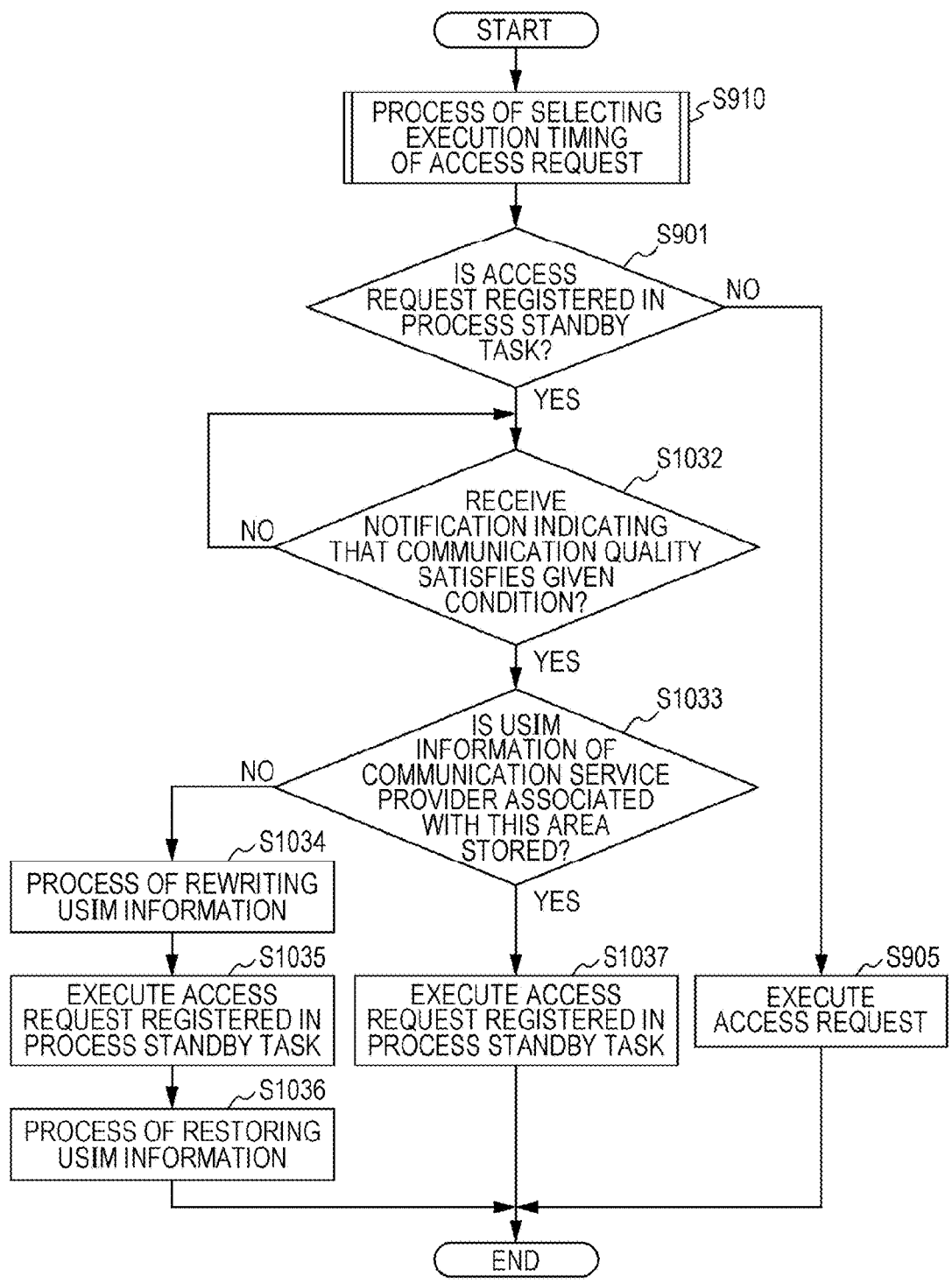
FIG. 40 is a flowchart illustrating an example of the processing sequence of a communication process performed by the radio communication apparatus according to the third embodiment of the present technology.

FIG. 40 is a flowchart illustrating an example of the processing sequence of a communication process performed by the radio communication apparatus 200 according to the third embodiment of the present technology. Since the processing sequence is a modified example of the processing sequence of FIG. 10, the same reference numerals are given to the common constituents to those of FIG. 10 and the description thereof will not be partially repeated. In the processing sequence, for example, the access request registered in the process standby task is executed in the area where the radio communication quality satisfies the given condition.

When the access request is registered in the process standby task (step S901), the control unit 230 determines whether the notification indicating that the radio communication quality satisfies the given condition is received from the communication quality management server 601 (step S1032). When the notification is not received, a monitoring process continues. On the other hand, when the notification is received from the communication quality management server 601 (step S1032), the control unit 230 determines whether the valid USIM information associated with the communication service provider specified by the communication service provider information included in the received notification is kept (step S1033). That is, the process of comparing the USIM information is executed based on the communication service provider information included in the received notification. The comparison process is a process of determining whether the communication service provider associated with the USIM information stored in the USIM information storage unit 270 is the same as the communication service provider specified by the communication service provider information included in the received notification.

When the valid USIM information associated with the communication service provider specified by the received notification is not kept (step S1033), the control unit 230 executes the rewriting process of rewriting the valid USIM information (step S1034). That is, the USIM information rewriting request is transmitted to the communication quality management server 601 and the information regarding the USIM information rewriting approval is transmitted from the communication quality management server 601. Then, the USIM information rewriting unit 260 executes the rewriting process of rewriting the valid USIM information associated with the communication service provider specified by the received notification in the USIM information storage unit 270.

Subsequently, the control unit 230 executes the access request associated with the process standby task information stored in the process standby task information storage unit 280 based on the rewritten USIM information (step S1035). That is, the access request is transmitted to the network control apparatus 602 so that the access process is executed between the radio communication apparatus 200 and the network control apparatus 602. Subsequently, the access approval information is transmitted from the network control apparatus 602 to the radio communication apparatus 200 so as to execute the communication associated with the access request.

Subsequently, the control unit 230 performs the restoring process of restoring the USIM information to the original USIM information (step S1036). That is, when the communication associated with the access request is terminated, the USIM information restoring request is transmitted to the communication quality management server 601 and the information regarding the USIM information restoring instruction is transmitted from the communication quality management server 601. Then, after the termination request and the termination approval information are exchanged, the USIM information rewriting unit 260 performs the restoring process of restoring the USIM information to the original USIM information in the USIM information storage unit 270.

On the other hand, when the valid USIM information associated with the communication service provider specified by the received notification is kept (step S1033), the control unit 230 executes the access request registered in the process standby task (step S1037).

Operation Example of Radio Communication Apparatus

Figure 41:
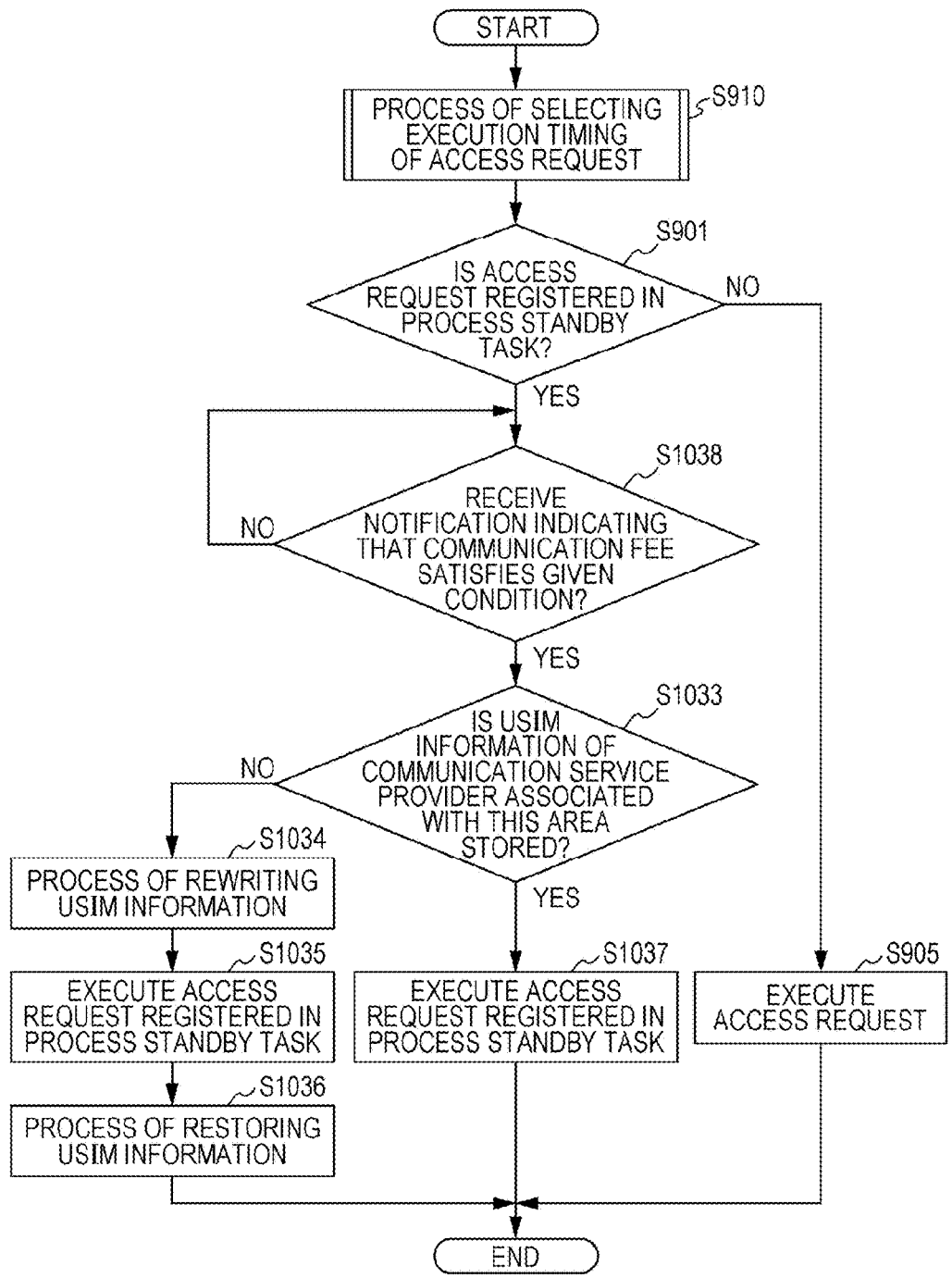
FIG. 41 is a flowchart illustrating an example of the processing sequence of a communication process performed by the radio communication apparatus according to the third embodiment of the present technology.

FIG. 41 is a flowchart illustrating an example of the processing sequence of a communication process performed by the radio communication apparatus 200 according to the third embodiment of the present technology. Since the processing sequence is a modified example of the processing sequence of FIG. 40, the same reference numerals are given to the common constituents to those of FIG. 40 and the description thereof will not be partially repeated. In the processing sequence, for example, the access request registered in the process standby task is executed in the area where the radio communication fee satisfies the given condition.

When the access request is registered in the process standby task (step S901), the control unit 230 determines whether the notification indicating that the radio communication fee satisfies the given condition is received from the communication quality management server 601 (step S1038). When the notification is not received, a monitoring process continues. On the other hand, when the notification is received from the communication quality management server 601 (step S1038), the process proceeds to step S1033.

Operation Example of Communication Quality Management Server

Figure 42:
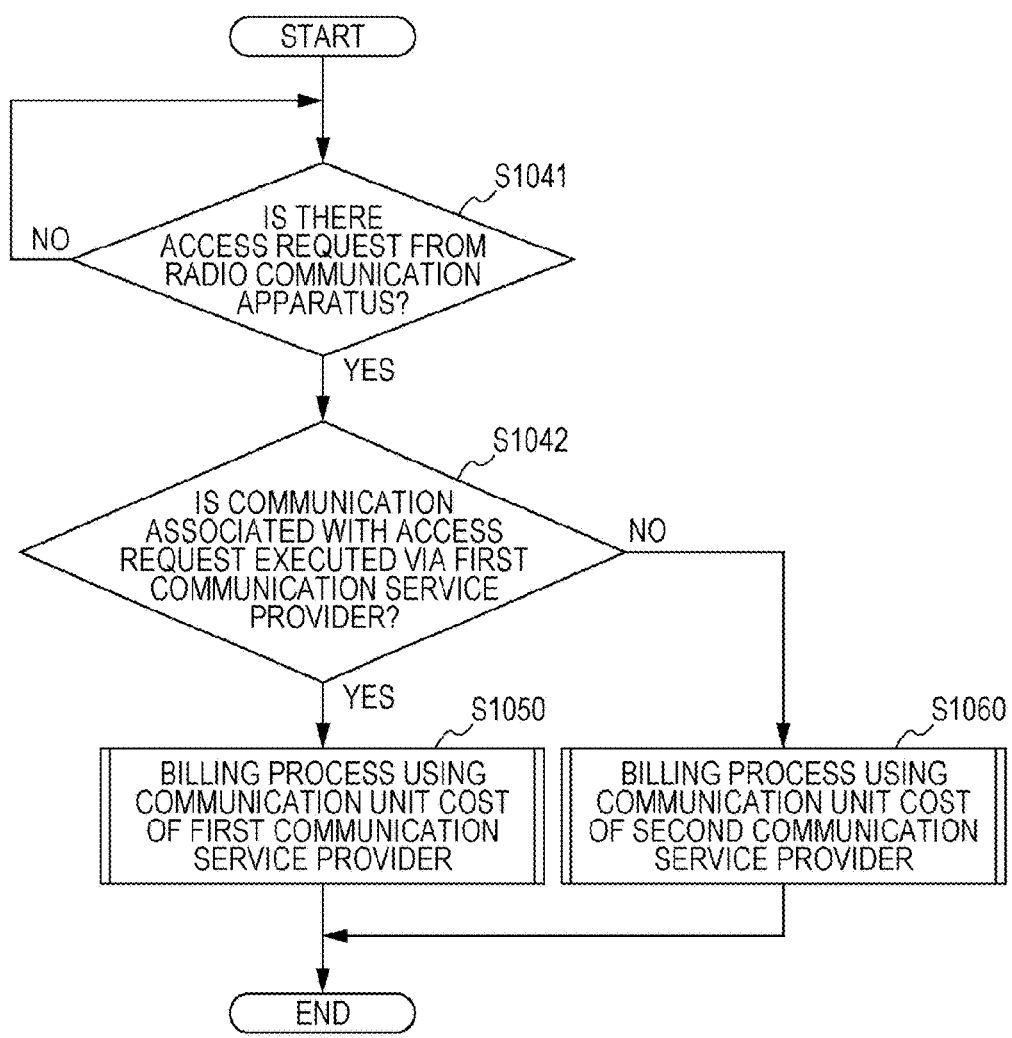
FIG. 42 is a flowchart illustrating an example of the processing sequence of a billing process performed by a communication quality management server according to the third embodiment of the present technology.

FIG. 42 is a flowchart illustrating an example of a processing sequence of the billing process performed by the communication quality management server 601 according to the third embodiment of the present technology. In the processing sequence, for example, the communication unit cost used for the billing process is changed depending on the conversion of the USIM information. Further, in the processing sequence, for example, the USIM information is changed between the first and second communication service providers.

First, it is determined whether the access request is executed from the radio communication apparatus (step S1041). When the access request is not executed, a monitoring process continues. On the other hand, when the access request is executed from the radio communication apparatus (step S1041), it is determined whether the communication associated with the access request is executed via the first communication service provider (step S1042).

When the communication associated with the access request is executed via the first communication service provider (step S1042), a billing process is executed based on the communication unit cost of the first communication service provider (step S1050). Further, when the communication associated with the access request is executed via the second communication service provider (step S1042), a billing process is executed based on the communication unit cost of the second communication service provider (step S1060). The billing processes will be described in detail with reference to FIGS. 43A and 43B.

Figure 43A:
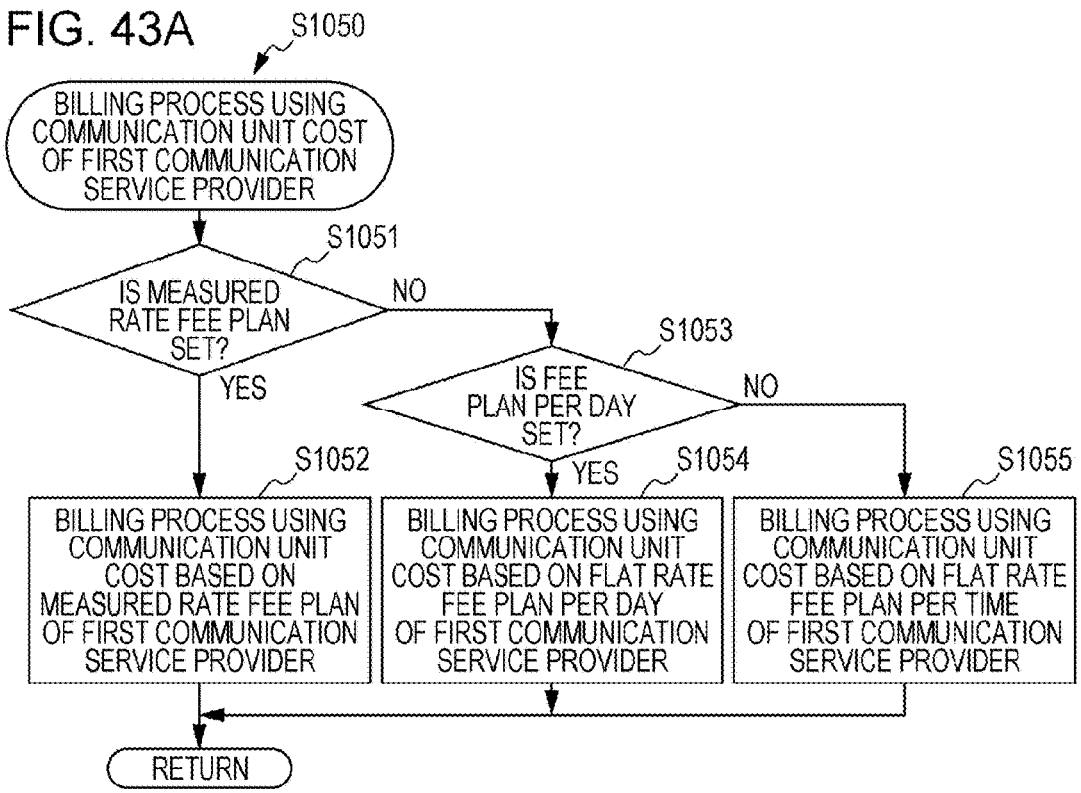
FIGS. 43A and 43B are flowcharts illustrating a billing process sequences in the processing sequence of the billing process performed by the communication quality management server according to the third embodiment of the present technology.
Figure 43B:
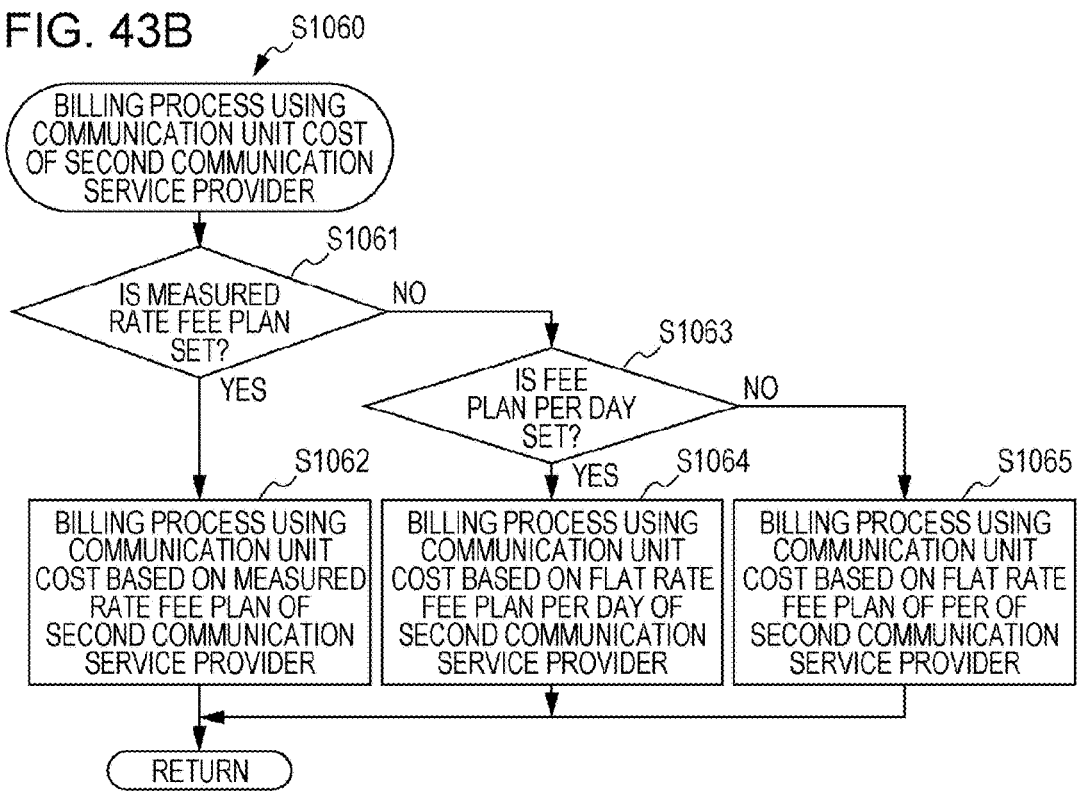

FIGS. 43A and 43B are flowcharts illustrating the billing process sequences (the processing sequence of step S1050 and step S1060 shown in FIGS. 42 and 43B) in the processing sequence of the billing process performed by the communication quality management server 601 according to the third embodiment of the present technology.

FIG. 43A shows the processing sequence of step S1050 shown in FIG. 42.

First, it is determined whether the fee plan set in the radio communication apparatus having executed the access request is the measured rate fee plan (step S1051). When the fee plan set in the radio communication apparatus is the measured rate fee plan (step S1051), the billing process is executed using the communication unit cost which is based on the measured rate fee plan of the first communication service provider (step S1052).

On the other hand, when the fee plan set in the radio communication apparatus is the measured rate fee plan (that is, the fee plan is the flat rate fee plan) (step S1051), it is determined whether the flat rate fee plan is a fee plan per day (step S1053). When the flat rate fee plan is the fee plan per day (step S1053), the billing process is executed using the communication cost unit which is based on the flat rate fee plan per day of the first communication service provider (step S1054).

When the flat rate fee plan is not the fee plan per day (that is, the flat rate fee plan is a fee plan per each hour) (step S1053), the billing process is executed using the communication unit cost which is based on the flat rate fee plan per hour of the first communication service provider (step S1055).

FIG. 43B shows the processing sequence of step S1060 shown in FIG. 42.

First, it is determined whether the fee plan set in the radio communication apparatus having executed the access request is the measured rate fee plan (step S1061). When the fee plan set in the radio communication apparatus is the measured rate fee plan (step S1061), the billing process is executed using the communication unit cost which is based on the measured rate fee plan of the second communication service provider (step S1062).

On the other hand, when the fee plan set in the radio communication apparatus is the measured rate fee plan (that is, the fee plan is the flat rate fee plan) (step S1061), it is determined whether the flat rate fee plan is a fee plan per day (step S1063). When the flat rate fee plan is the fee plan per day (step S1063), the billing process is executed using the communication cost unit which is based on the flat rate fee plan per day of the second communication service provider (step S1064).

When the flat rate fee plan is not the fee plan per day (that is, the flat rate fee plan is a fee plan per each hour) (step S1063), the billing process is executed using the communication unit cost which is based on the flat rate fee plan per hour of the second communication service provider (step S1065).

4. Fourth Embodiment

In the first to third embodiments of the present technology, the examples have hitherto been described in which the radio communication apparatus keeps the process standby task information and executes the access request based on the process standby task information. However, for example, it is supposed that the process standby tasks in one or the plurality of radio communication apparatuses are executed by another apparatus (for example, a server). Accordingly, in a fourth embodiment of the present technology, an example will be described in which the process standby task in the radio communication apparatus is alternatively executed by an apparatus other than the radio communication apparatus.

Configuration Example of Communication System

Figure 44:
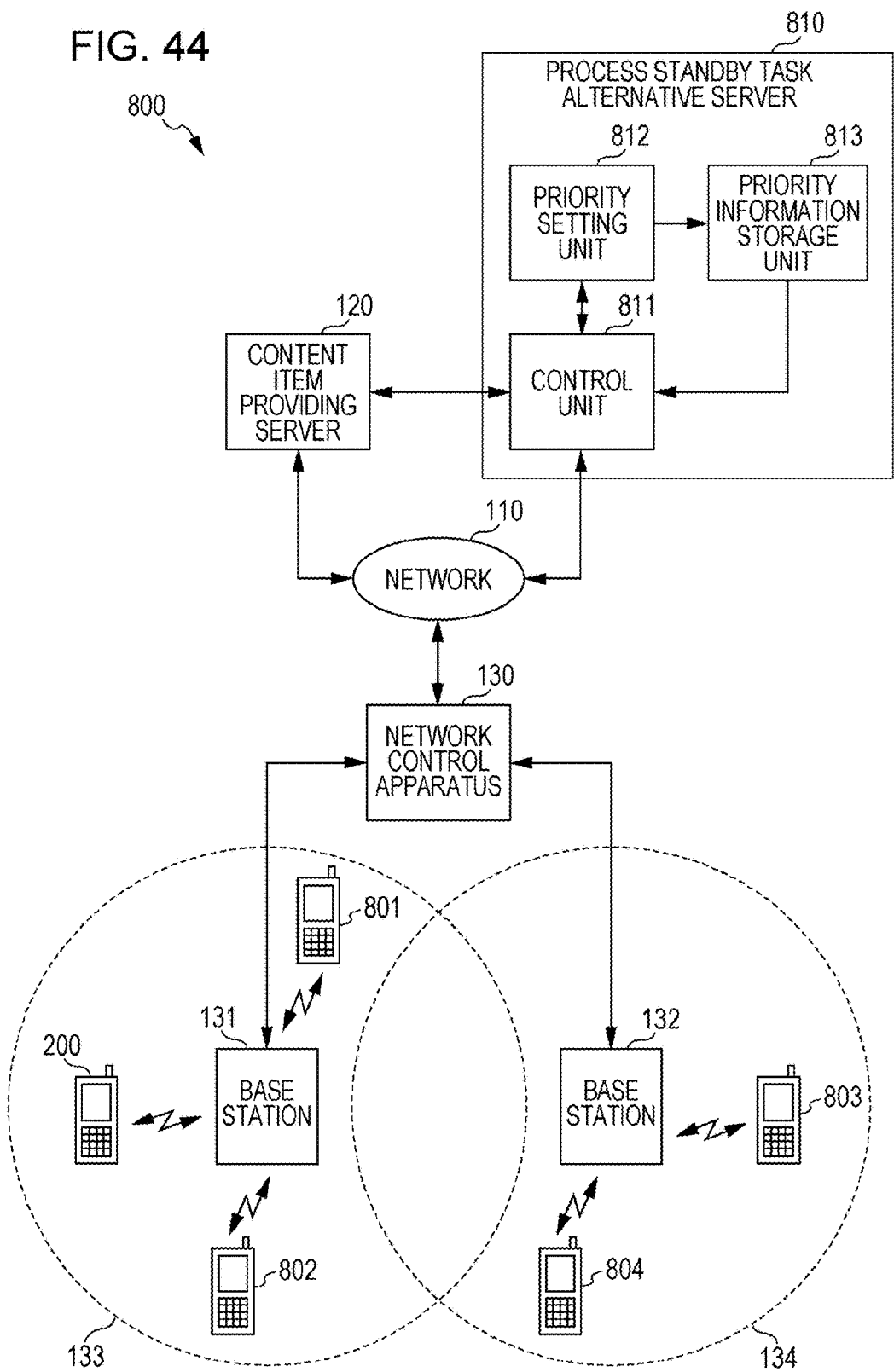
FIG. 44 is a block diagram illustrating an example of the configuration of a communication system according to a fourth embodiment of the present technology.

FIG. 44 is a diagram illustrating an example of the configuration of a communication system 800 according to the fourth embodiment of the present technology. The communication system 800 is a modified example of the communication system 100 shown in FIG. 1. The communication system 800 is different from the communication system 100 in that radio communication apparatuses 801 to 804 and a process standby task alternative server 810 are added. Therefore, the same reference numerals are given to the common constituents to those of the communication system 100 and the description thereof will not be partially repeated.

The communication system 800 includes the radio communication apparatuses 801 to 804 and the process standby task alternative server 810.

The radio communication apparatuses 801 to 804 are, for example, a cellular phone apparatus (for example, a cellular phone apparatus or a smart phone having a telephone call function and a data communication function) or a data communication apparatus (for example, a personal computer) having a radio communication function. Further, the radio communication apparatuses 801 to 804 are assumed to execute initial setting of parameters necessary for accessing the radio communication network administrated by the first communication service provider based on the contract (or the contract with a service provider providing a virtual communication service) with the first communication service provider.

The process standby task alternative server 810 is an information processing apparatus that acquires and manages the process standby task information stored in one or the plurality of radio communication apparatuses and alternatively executes the process standby task. For example, the process standby task alternative server 810 alternatively executes the process standby task, when the process standby task alternative server 810 receives the process standby task information stored in the process standby task information storage unit 280 of the radio communication apparatus 200. The process standby task alternative server 810 is an example of an information processing apparatus described in claims.

The process standby task alternative server 810 can access the content item providing server 120 through a wired communication line such as an optical fiber and can acquire content items from the content item providing server 120 via the wired communication line.

The process standby task alternative server 810 includes a control unit 811, a priority setting unit 812, and a priority information storage unit 813.

When the control unit 811 receives an alternative request (process standby task alternative request information) from the radio communication apparatus 200, the control unit 811 executes a process associated with the alternative request information. For example, it is supposed that the control unit 811 accesses a desired access destination via a predetermined network and receives the alternative request for acquiring desired content items from the access destination. In this case, the control unit 811 acquires the content items from the access destination and transmits the acquired content items to the radio communication apparatus 200 at the timing at which the predetermined condition is satisfied. Further, when the control unit 811 receives the alternative requests from the plurality of radio communication apparatuses, the control unit 811 acquires the content items in response to the respective alternative requests and transmits the acquired content items to the plurality of radio communication apparatuses at the timing at which the predetermined condition is satisfied. The control unit 811 is an example of a transmission control unit described in claims.

The priority setting unit 812 sets the priorities of the process standby tasks associated with the plurality of radio communication apparatuses in the transmission process for the radio communication apparatuses. Further, a method of setting the priority will be described in detail with reference to FIG. 48.

The priority information storage unit 813 is a storage unit that stores information (priority information) regarding the priorities set in the plurality of radio communication apparatuses (the radio communication apparatuses 200 and 801 to 804). The stored details of the priority information storage unit 813 will be described with reference to FIG. 45.

Example of Details of Priority Information Storage Unit

FIG. 45 is a diagram illustrating an example of the stored details of the priority information storage unit 813 according to the fourth embodiment of the present technology.

The priority information storage unit 813 is a storage unit that stores the information (priority information) regarding the priorities set in the plurality of radio communication apparatuses (the radio communication apparatuses 200 and 801 to 804). Specifically, the priority information storage unit 813 stores terminal identification information 814, a shortest arrival prediction time 815, and a priority 816 in association therewith for each radio communication apparatus.

The terminal identification information 814 is identification information used to distinguish the radio communication apparatuses from each other.

The shortest arrival prediction time 815 is the shortest arrival prediction time of each radio communication apparatus among arrival prediction times calculated for each radio communication apparatus by the priority setting unit 812.

The priority 816 is a priority set for each radio communication apparatus by the priority setting unit 812. The method of setting the priority will be described in detail with reference to FIG. 48.

Communication Example Between Apparatuses

Figure 46:
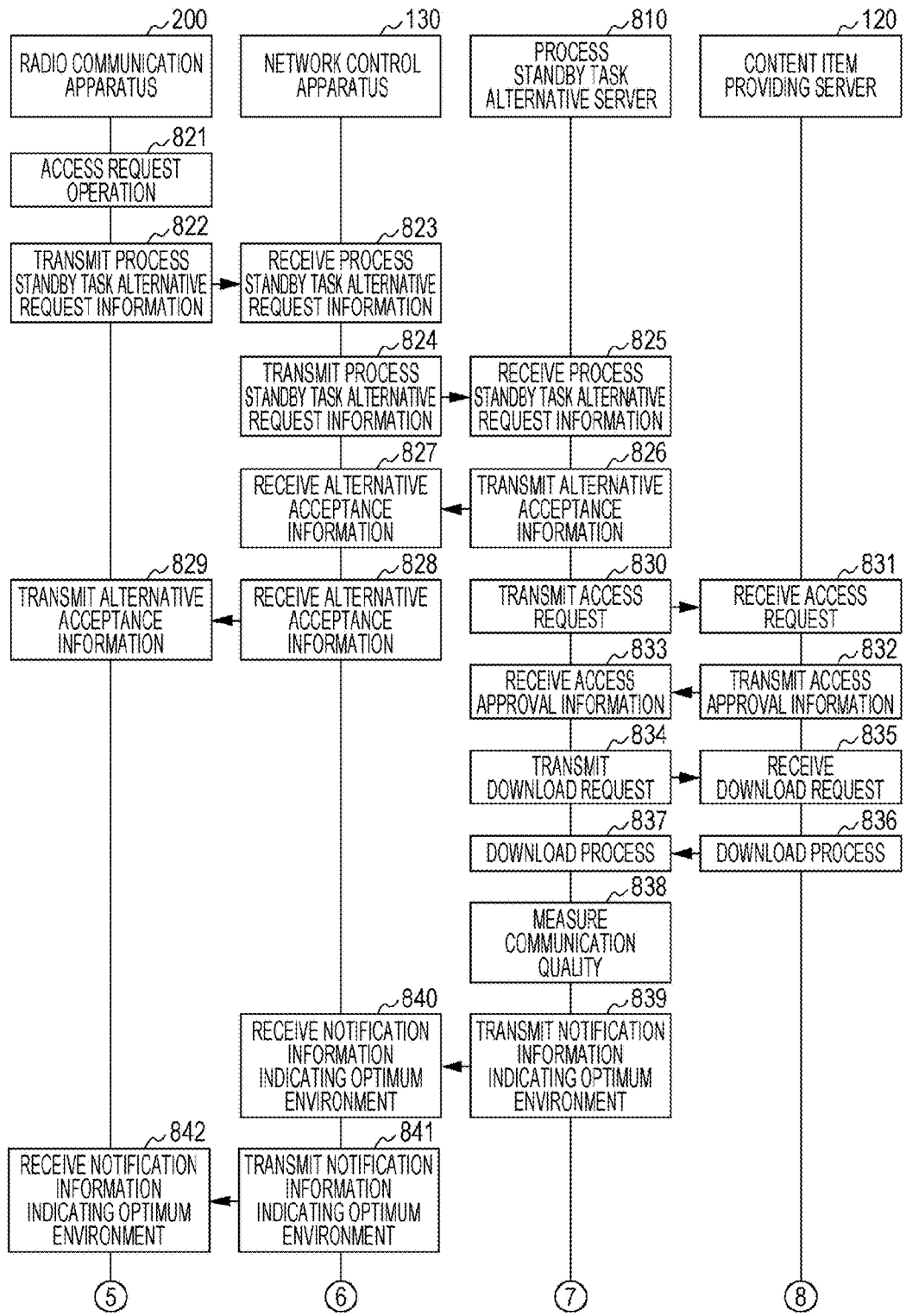
FIG. 46 is a sequence chart illustrating a communication processing example between apparatuses of the communication system according to the fourth embodiment of the present technology.
Figure 47:
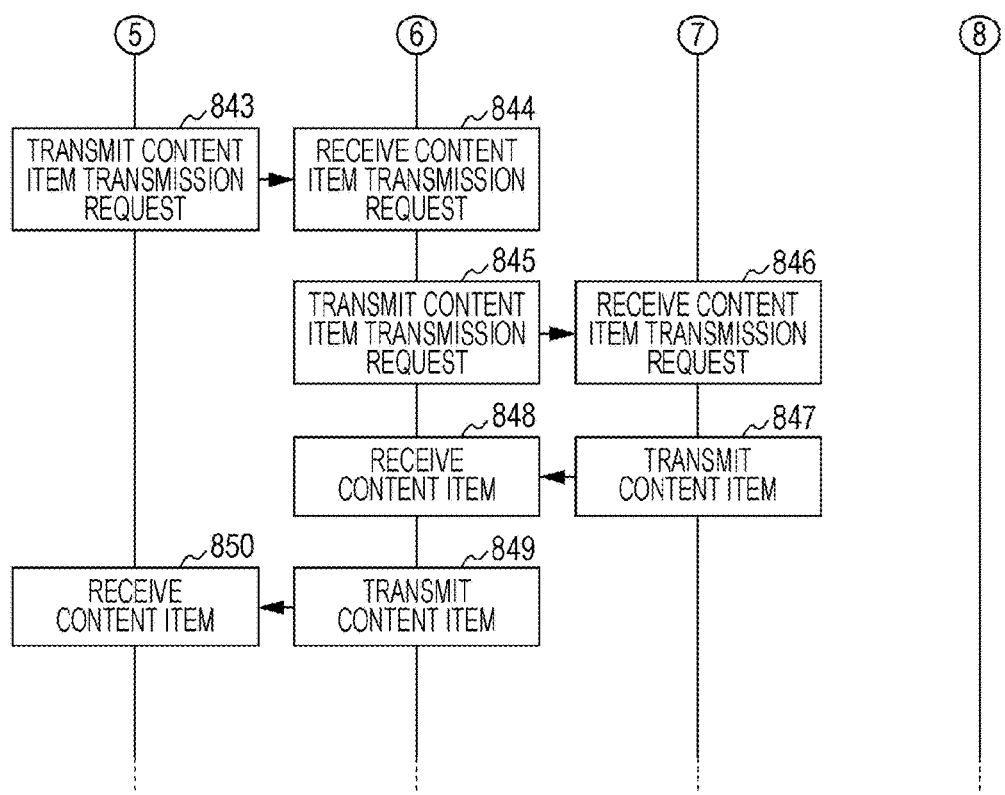
FIG. 47 is a sequence chart illustrating the communication processing example between the apparatuses of the communication system according to the fourth embodiment of the present technology.

FIGS. 46 and 47 are sequence charts illustrating the communication processing example between the apparatuses of the communication system 800 according to the fourth embodiment of the present technology.

First, an access request operation is executed in the radio communication apparatus 200 (821). For example, an operation (for example, an operation of inputting the access destination information in the access destination information input region 301 shown in FIG. 4) of inputting the access destination information is executed. Then, the operation of pressing down the execution button (for example, the execution button 303 in the optimum environment in FIG. 4) in the optimum environment is executed, and then the operation of pressing down the execution button (for example, the execution button 302 shown in FIG. 4) is executed. The access request associated with the input access destination information is registered in the process standby task through the access request operation. That is, the process standby task information associated with the access request is stored in the process standby task information storage unit 280.

Subsequently, the control unit 230 of the radio communication apparatus 200 transmits the process standby task alternative request information to the process standby task alternative server 810 via the network control apparatus 130 (822 to 825). The process standby task alternative request information is information used to give an alternative request of the process standby task registered in the process standby task to the process standby task alternative server 810 and includes the process standby task information.

In this way, the operation receiving unit 240 accesses the desired access destination via the predetermined network and receives the access request operation of executing the access request for acquiring the desired content items from the access destination at the timing at which the predetermined condition is satisfied. Then, when operation receiving unit 240 receives the access request operation, the control unit 230 executes a control such that an alternative request (process standby task alternative request information) for alternatively acquiring the content items is transmitted to the process standby task alternative server 810.

Only when the size of the content item associated with the process standby task is greater than a reference value, the process standby task alternative request information may be transmitted to the process standby task alternative server 810. In this case, when the size of the content item associated with the process standby task is equal to or less than the reference value, the radio communication apparatus 200 executes the process standby task.

When the process standby task alternative server 810 receives the process standby task alternative request information (825), the control unit 811 of the process standby task alternative server 810 transmits alternative acceptance information indicating acceptance of the request to the radio communication apparatus 200 via the network control apparatus 130 (826 to 829).

Then, the control unit 811 of the process standby task alternative server 810 transmits the access request associated with the process standby task alternative request information to the content item providing server 120 (830 and 831). When the content item providing server 120 receives the access request associated with the process standby task alternative information (831), the content item providing server 120 transmits access approval information indicating the approval of the access request to the process standby task alternative server 810 (832 and 833).

When the process standby task alternative server 810 receives the access approval information (833), the control unit 811 of the process standby task alternative server 810 transmits a download request of the content item associated with the process standby task alternative request information to the content item providing server 120 (834 and 835). When the content item providing server 120 receives the download request (835), the content item providing server 120 transmits the content item associated with the download request to the process standby task alternative server 810 (836 and 837). That is, a download process is executed.

Subsequently, the control unit 811 of the process standby task alternative server 810 acquires information supplied from each base station via the communication service provider and measures the radio communication quality in the area of each base station (838). When the radio communication apparatus 200 arrives in the area where the radio communication quality satisfies the given condition, the control unit 811 transmits a notification indicating that the radio communication quality satisfies the given condition to the radio communication apparatus 200 via the network control apparatus 130 (839 to 842). The control unit 811 of the process standby task alternative server 810 may use a method of calculating the radio communication quality based on the radio communication quality information acquired from the plurality of radio communication apparatuses when the control unit 811 measures the radio communication quality in the area of each base station.

When the radio communication apparatus 200 receives the notification indicating that the radio communication quality satisfies the given condition (842), the control unit 230 of the radio communication apparatus 200 transmits a content item transmission request to the process standby task alternative server 810 via the network control apparatus 130 (843 to 846). The content item transmission request is a request for transmitting the content item associated with the process standby task registered in the process standby task.

When the process standby task alternative server 810 receives the content item transmission request (846), the control unit 811 of the process standby task alternative server 810 transmits the content item associated with the content item transmission request to the radio communication apparatus 200 via the network control apparatus 130 (847 to 850).

In this way, the radio communication apparatus 200 gives the request for the process standby task to the process standby task alternative server 810. When the radio communication quality satisfies the given condition, the content item associated with the process standby task can be downloaded. Here, it is also supposed that the radio communication quality does not satisfy the given condition in the area where the radio communication apparatus 200 is located when the process standby task alternative request information is transmitted (822). Even in this case, since the size of the process standby task alternative request information is relatively small, the transmission process can be executed so that the burden on the radio communication resources is as small as possible. For example, it is supposed that the bottleneck of the communication rate occurs not in the radio communication but in the download process from the content item providing server. In this case, the content item can be downloaded rapidly by the multi-leveling and a high encoding ratio under the condition that the radio communication quality satisfies the given condition. As a consequence, it is possible to efficiently utilize the resources between the radio sections and to realize the communication in which the burden on the base station is not imposed.

Process Example of Process Standby Task Alternative Server

Figure 48:
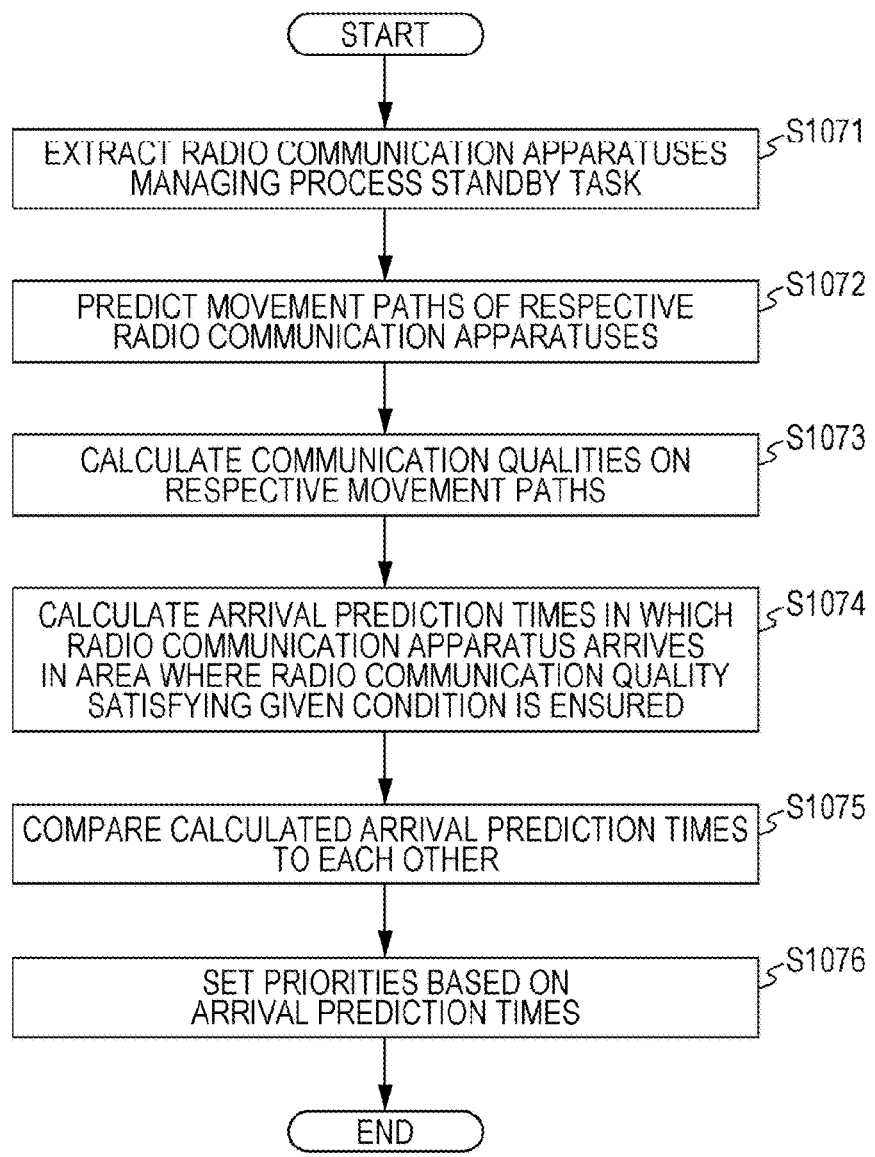
FIG. 48 is a flowchart illustrating an example of the processing sequence of a priority setting process performed by a process standby task alternative server according to the fourth embodiment of the present technology.

In FIGS. 46 and 47, the example has been described in which the process standby task associated with one radio communication apparatus 200 is alternatively executed by the process standby task alternative server 810. However, as shown in FIG. 44, when the process standby tasks associated with the plurality of radio communication apparatuses are alternatively executed by the process standby task alternative server 810, the process standby tasks are sequentially executed and the content items associated with the process standby tasks are transmitted to the respective radio communication apparatuses. FIG. 48 shows an example in which the priority of the transmission process for each radio communication apparatus is set, when the process standby tasks associated with the plurality of radio communication apparatuses are alternatively executed by the process standby task alternative server 810.

FIG. 48 is a flowchart illustrating an example of the processing sequence of the priority setting process performed by the process standby task alternative server 810 according to the fourth embodiment of the present technology.

First, the priority setting unit 812 extracts the radio communication apparatus managing the process standby task (step S1071). For example, the priority setting unit 812 extracts the radio communication apparatus for which the terminal identification information is stored in the terminal identification information 814 of the priority information storage unit 813.

Subsequently, the priority setting unit 812 predicts the movement path of each of the extracted radio communication apparatuses (step S1072). For example, the above-described prediction method can be used as a method of predicting the movement path.

Subsequently, the priority setting unit 812 calculates the radio communication quality along the obtained movement path for each radio communication apparatus (step S1073).

Subsequently, the priority setting unit 812 calculates an arrival prediction time, in which the radio communication apparatus arrives in the area where the radio communication quality satisfying the given condition is ensured among the calculated radio communication qualities, for each radio communication apparatus (step S1074).

Subsequently, the priority setting unit 812 compares the calculated arrival prediction times to each other (step S1075) and sets the priorities of the respective radio communication apparatuses based on the calculated arrival prediction times (step S1076). For example, the priorities are set in the order in which the calculated arrival prediction times are shorter. For example, the first priority is set to the radio communication apparatus for which the calculated arrival prediction time is the shortest. The lowest priority is set to the radio communication apparatus for which the calculated arrival prediction time is the longest.

In this way, the set priority order is stored in the priority 816 of the priority information storage unit 813. The process standby task alternative server 810 transmits the content item associated with the process standby task among the process standby tasks associated with the plurality of radio communication apparatuses to the radio communication apparatus in the order, in which the priority stored in the priority 816 of the priority information storage unit 813 is high.

By setting the priority of each radio communication apparatus based on the arrival prediction time in which the radio communication apparatus arrives in the area where the radio communication quality satisfying the given condition is ensured, the process standby task alternative server 810 can alternatively execute the process standby tasks associated with the plurality of radio communication apparatus efficiently.

The process standby task alternative server 810 can easily determine the degree of the future access frequency by sharing the number of process standby tasks. That is, the given condition of the radio communication quality can be varied for each radio communication apparatus based on the determined number of accesses. For example, when it is predicted that the plurality of radio communication apparatuses are concentrated at the same clock in the same area where the radio communication quality satisfying the given condition is ensured, an application can be embodied, for example, such that only the access process of an arbitrary radio communication apparatus can be activated rapidly in order to efficiently cope with the access processes.

Use Example of Process Standby Task Alternative Server Like Caching Server

In recent years, radio communication apparatuses which are connected to a public radio network or the like and are capable of downloading various kinds of content items have become widespread. For example, some radio communication apparatuses (electronic apparatuses) are able to download electronic books (content items) through radio communications and display the electronic books. Examples of the electronic book include periodical publications (for example, fashion magazines or comic books) and books such as novels.

For example, it is supposed that users desiring to buy an electronic book (for example, fashion books or comic books with many images) with many subscribers are concentrated on the release date of the electronic book. In this case, it is supposed that the downloads of the electronic book are concentrated since the electronic book is downloaded at overlapping timings. When the downloads are concentrated, the traffic increases in the radio network. In this case, it is supposed that the traffic is also concentrated on a fixed network including a core network as well as the radio network. For this reason, it is important to efficiently utilize the communication resources including the radio network and the fixed network.

It is desirable to efficiently utilize the communication resources. Further, to resolve the above-mentioned problem, the following configuration can be realized in the fourth embodiment of the present technology. In this embodiment of the present technology, the following configurations (Configuration Examples 1 to 8) can be realized to resolve the above-described problem.

Example of Configuration of Communication System

Figure 52:
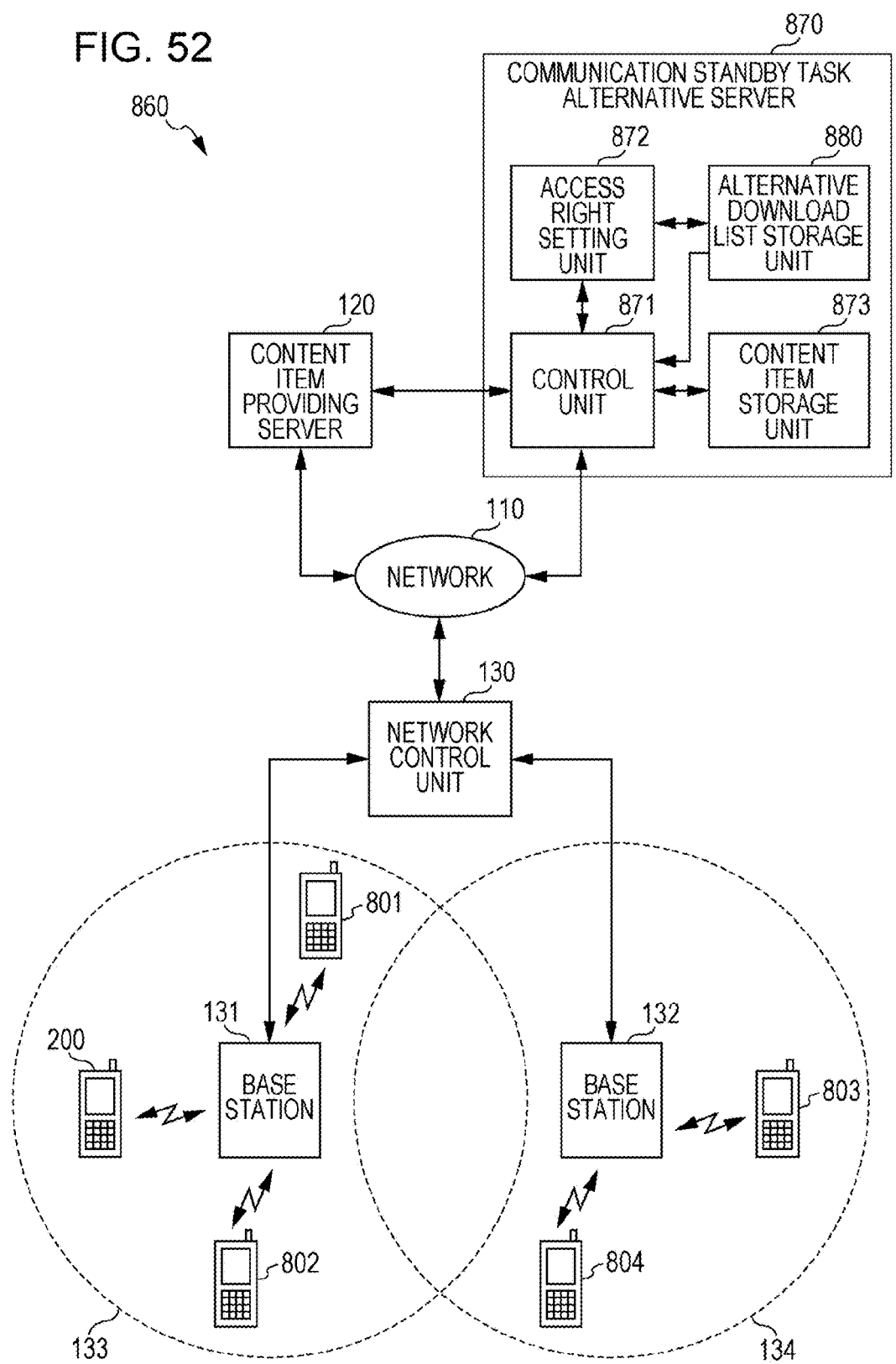
FIG. 52 is a block diagram illustrating an example of the configuration of a communication system according to the fourth embodiment of the present technology.

FIG. 52 is a diagram illustrating an example of the configuration of a communication system 860 according to the fourth embodiment of the present technology. The communication system 860 is a modification of the communication system 800 shown in FIG. 44. The communication system 860 is different from the communication system 800 in that a process standby task alternative server 870 is provided instead of the process standby task alternative server 810. Therefore, the same reference numerals are given to the common constituents to those of the communication system 800 and the description of the common constituents will partially not be described.

The process standby task alternative server 870 acquires and manages the process standby task information stored in one or the plurality of radio communication apparatuses and alternatively executes the process standby task, as in the process standby task alternative server 810. Further, the process standby task alternative server 870 can access the content item providing server 120 through a wired communication line such as an optical fiber and can acquire content items from the content item providing server 120 via the wired communication line.

The process standby task alternative server 870 includes a control unit 871, an access right setting unit 872, a content item storage unit 873, and an alternative download list storage unit 880.

When the control unit 871 receives an alternative request (process standby task alternative request information) from the radio communication apparatus 200, the control unit 871 executes a process associated with the alternative request information. The process associated with the alternative request will be described in detail with reference to FIGS. 53 and 54.

The access right setting unit 872 sets an access right of accessing (downloading) the content item stored in the content item storage unit 873 in the radio communication apparatus transmitting the alternative request (the process standby task alternative request information). A method of setting the access right will be described in detail with reference to FIGS. 53 and 54.

The content item storage unit 873 stores the content item associated with the alternative request (the process standby task alternative request information). That is, the content item acquired from the content item providing server 120 is stored in the content item storage unit 873 based on the alternative request (the process standby task alternative request information) transmitted from the radio communication apparatus.

The alternative download list storage unit 880 stores management information (alternative download list information) used to manage the content item associated with the alternative request (the process standby task alternative request information). Further, the stored details of the alternative download list storage unit 880 will be described in detail with reference to FIG. 53.

Example of Details of Alternative Download List Storage Unit

FIG. 53 is a diagram schematically illustrating an example of the stored details of the alternative download list storage unit 880 according to the fourth embodiment of the present technology.

The alternative download list storage unit 880 stores content item identification information 881, access right number information 882, and terminal identification information 883 in association with each other for each content item.

The content item identification information 881 is identification information used to identify each content item stored in the content item storage unit 873. Further, each content item stored in the content item storage unit 873 is acquired based on the alternative request (the process standby task alternative request information) transmitted from the radio communication apparatus.

The access right number information 882 is information regarding the number of access rights set in one content item stored in the content item storage unit 873. That is, the number of radio communication apparatuses of which the terminal identification information is stored in the terminal identification information 883 is stored in the access right number information 882.

The terminal identification information 883 is identification information used to identify each of the radio communication apparatuses. Further, instead of the terminal identification information 883, user identification information (user ID) used to identify each of users owning the radio communication apparatuses may be used. The valid period of the access right may be set in the radio communication apparatus and the set valid period may be stored in association with the terminal identification information 883. For example, a predetermined period (for example, three days) from a reception time of the alternative request (the process standby task alternative request information) can be set as the valid period. Further, the terminal identification information of which the valid period expires can automatically be deleted.

Hereinafter, a method of setting the access right will be described.

When the access right setting unit 872 receives the alternative request (the process standby task alternative request information) from the radio communication apparatus 200, the access right setting unit 872 registers and manages the content item (a content item alternatively downloaded) associated with the alternative request. For example, as shown in FIG. 53, the access right setting unit 872 generates and updates an alternative download list in the alternative download list storage unit 880.

Specifically, when the access right setting unit 872 receives the alternative request (the process standby task alternative request information) from the radio communication apparatus, the access right setting unit 872 confirms whether the same content item as the content item associated with the alternative request is registered in the alternative download list storage unit 880. As the confirmation result, it is supposed that the content item associated with the alternative request is registered in the alternative download list storage unit 880. In this case, the access right setting unit 872 sets the access right of accessing the content item registered in the alternative download list storage unit 880 in the radio communication apparatus transmitting the alternative request. For example, the terminal identification information of the radio communication apparatus transmitting the alternative request is stored in the terminal identification information 883 in association with the content item identification information of the content item associated with the alternative request. That is, when the content item associated with the alternative request is registered in the alternative download list storage unit 880, the access right is additionally set in the radio communication apparatus transmitting the alternative request.

On the other hand, it may be supposed that the content item associated with the alternative request is not registered in the alternative download list storage unit 880. In this case, the control unit 871 acquires the content item associated with the alternative request from the content item providing server 120 and stores the acquired content item in the content item storage unit 873. Further, the access right setting unit 872 registers the content item associated with the alternative request in the alternative download list storage unit 880 and sets the access right of accessing the content item in the radio communication apparatus transmitting the alternative request. For example, the content item identification information of the content item associated with the alternative request is stored in the content item identification information 881 and the terminal identification information of the radio communication apparatus transmitting the alternative request is stored in the terminal identification information 883 in association with the content item identification information. That is, when the content item associated with the alternative request is not registered in the alternative download list storage unit 880, the content item is newly registered and the access right is set in the radio communication apparatus transmitting the alternative request.

Here, it is supposed that the content item registered in the alternative download list storage unit 880 is transmitted to the radio communication apparatus in which the access right is set. In this case, the access right setting unit 872 deletes the access right (the access right set in the radio communication apparatus) registered in the alternative download list storage unit 880. For example, the terminal identification information of the radio communication apparatus associated with the content item is deleted from the terminal identification information 883 and the number in the access right number information 882 is reduced by 1.

The access right setting unit 872 deletes, from the alternative download list, the content item for which the number of access rights registered in the alternative download list storage unit 880 is 0. The control unit 871 deletes the content item deleted from the alternative download list from the content item storage unit 873.

In this way, the access right setting unit 872 stores the management information (the alternative download list) used to manage the content item associated with the alternative request in the alternative download list storage unit 880. Further, the access right setting unit 872 sets the access right of accessing the content item, of which the management information is stored in the alternative download list storage unit 880, in the radio communication apparatus transmitting the alternative request associated with the content item. Here, it is supposed that the received alternative request is an alternative request for acquiring the content item of which the management information is stored in the alternative download list storage unit 880. In this case, the access right setting unit 872 sets the access right of accessing the content item in the radio communication apparatus transmitting the alternative request. When the access right setting unit 872 transmits the content item, of which the management information is stored in the alternative download list storage unit 880, to the radio communication apparatus, the access right setting unit 872 deletes the access right of the content item set in the radio communication apparatus.

The control unit 871 transmits the content item, of which management information (the alternative download list) is stored in the alternative download list storage unit 880, to the radio communication apparatus at a timing at which a predetermined condition is satisfied. Here, the content item of which management information (the alternative download list) is stored in the alternative download list storage unit 880 is downloaded from the content item providing server 120 and is stored in the content item storage unit 873. Therefore, the control unit 871 does not execute the control to acquire the content item, when the control unit 871 receives the alternative request for acquiring the content item of which the management information (the alternative download list) is stored in the alternative download list storage unit 880. Further, the control unit 871 deletes the content item of which all of the access rights set by the access right setting unit 872 are deleted among the content items stored in the content item storage unit 873.

In this example, the access right setting unit 872 manages the access right of each radio communication apparatus in this way. Thus, even when the alternative request for the same content item is received from the plurality of radio communication apparatuses, it is possible to avoid the download of the same content item from the content item providing server 120 a plurality of times.

For example, a time difference occurs between the download process between the content item providing server 120 and the process standby task alternative server 870 and the transmission process from the process standby task alternative server 870 to the radio communication apparatus 200. Therefore, the download process between the content item providing server 120 and the process standby task alternative server 870 becomes intensive using the time difference. That is, since it is good to download the same content item once from the content item providing server 120, it is not necessary to execute the download process in response to each alternative request transmitted from the radio communication apparatus. Accordingly, it is possible to reduce the traffic between the content item providing server 120 and the process standby task alternative server 870.

Since the content item of which the number of access rights is zero is deleted from the process standby task alternative server 870, it is possible to prevent the content item from being used in another radio communication apparatus other than the radio communication apparatus transmitting the alternative request. That is, it is possible to prevent the content item from being stored in the process standby task alternative server 870 for a long time, thereby appropriately protecting the copyright of the content item.

Example of Process of Process Standby Task Alternative Server

Figure 54:
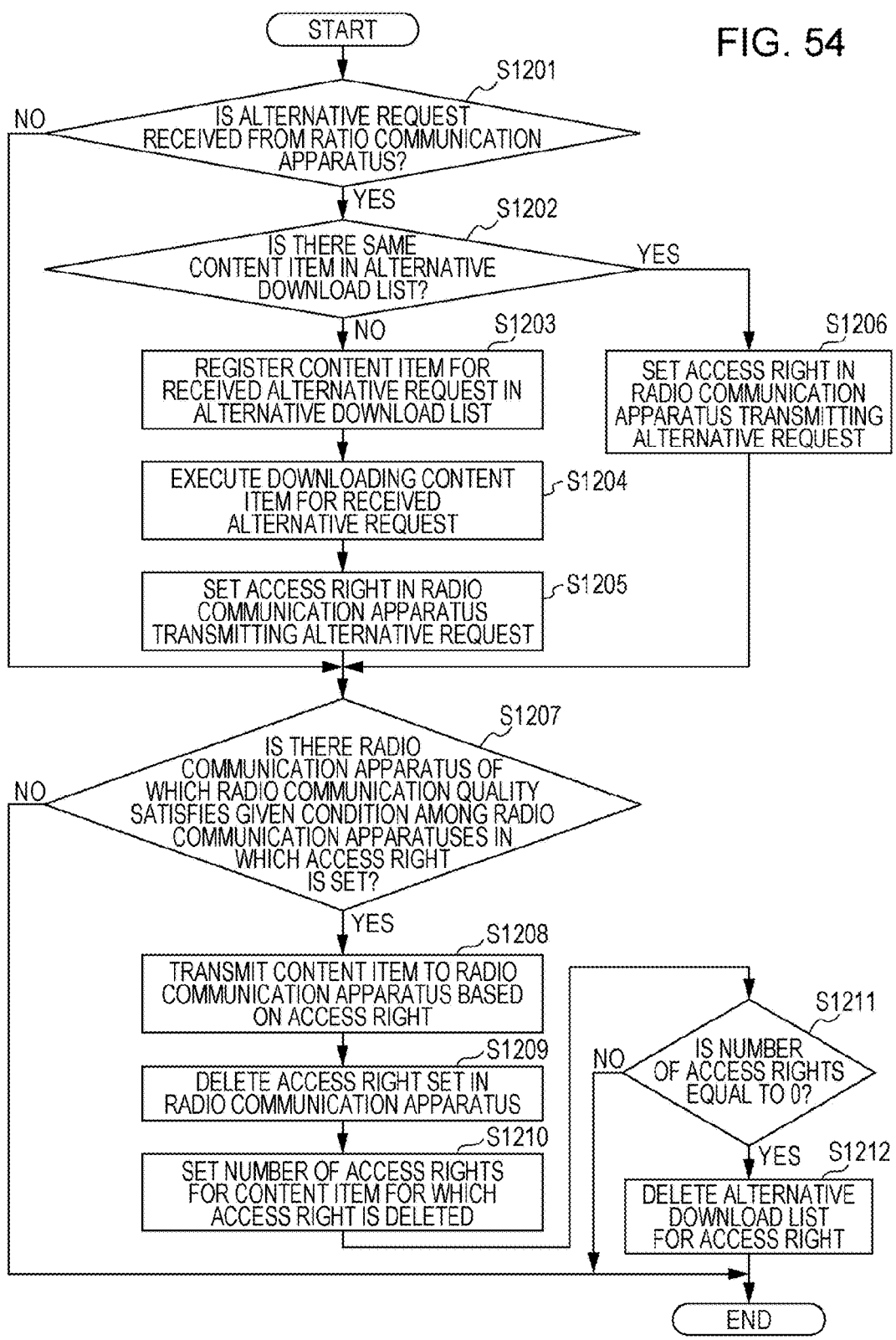
FIG. 54 is a flowchart illustrating an example of a processing sequence of an alternative download process performed by a process standby task alternative server according to the fourth embodiment of the present technology.

FIG. 54 is a flowchart illustrating an example of the processing sequence of an alternative download process performed by the process standby task alternative server 870 according to the fourth embodiment of the present technology.

First, the control unit 871 determines whether the alternative request (the process standby task alternative request information) is received from the radio communication apparatus (step S1201). When the alternative request is not received, the process proceeds to step S1207. On the other hand, when the alternative request is received from the radio communication apparatus (step S1201), the access right setting unit 872 determines whether the content item associated with the received alternative request is registered in the alternative download list storage unit 880 (step S1202).

When the content item associated with the received alternative request is not registered (step S1202), the access right setting unit 872 registers the content item associated with the alternative request in the alternative download list storage unit 880 (step S1203). Subsequently, the control unit 871 acquires the content item associated with the alternative request from the content item providing server 120 (step S1204). That is, the content item is downloaded (step S1204).

Subsequently, the access right setting unit 872 sets the access right for the content item newly registered in the alternative download list storage unit 880 in the radio communication apparatus transmitting the alternative request (step S1205).

On the other hand, when the content item associated with the received alternative request is registered (step S1202), the access right setting unit 872 sets the access right in the radio communication apparatus transmitting the alternative request (step S1206). That is, the access right setting unit 872 sets the access right for the content item (the content item associated with the alternative request) registered in the alternative download list storage unit 880 in the radio communication apparatus transmitting the alternative request (step S1206).

Subsequently, the control unit 871 determines whether there is a radio communication apparatus of which the radio communication quality satisfies a given condition among the radio communication apparatuses in which the access right is set (step S1207). That is, the control unit 871 determines whether there is a radio communication apparatus located in the area where the radio communication quality satisfies the given condition among the radio communication apparatuses registered in the alternative download list storage unit 880 (step S1207). When there is no radio communication apparatus of which the radio communication quality satisfies the given condition (step S1207), the alternative download process ends.

On the other hand, when there is no radio communication apparatus of which the radio communication quality satisfies the given condition (step S1207), the control unit 871 transmits the content item to the radio communication apparatus based on the access right set in the radio communication apparatus (step S1208). Further, when the plurality of access rights are set in the same radio communication apparatus, the content items associated with the plurality of access rights are sequentially transmitted.

Subsequently, the access right setting unit 872 deletes the access right (the access right for the content item) set in the radio communication apparatus transmitting the content item (step S1209). That is, the access right setting unit 872 deletes the terminal identification information of the radio communication apparatus from the alternative download list storage unit 880. Subsequently, the access right setting unit 872 calculates the number of access rights associated with the content item for which the access right is deleted (step S1210).

Subsequently, the access right setting unit 872 determines whether the calculated number of access rights is zero (step S1211). When the calculated number of access rights is not zero, the alternative download process ends. In this case, the calculated number of access rights is registered in the alternative download list storage unit 880 (the access right number information 882). On the other hand, when the calculated number of access rights is zero (step S1211), the access right setting unit 872 deletes the content item of which the number of access rights is zero from the alternative download list storage unit 880 (step S1212). Further, the control unit 871 deletes the content item of which the number of access rights is zero from the content item storage unit 873 (step S1212).

In this way, the content item is retained in the process standby task alternative server 870 until the number of access rights is zero, and the radio communication qualities of the other radio communication apparatuses are continuously monitored.

The process standby task alternative server 870 can be used as the caching server. Thus, the same content item can be prevented from being downloaded repeatedly from the content item providing server 120, and thus it is possible to reduce the traffic between the content item providing server 120 and the process standby task alternative server 870. Accordingly, for example, even when users desiring to buy an electronic book on the release day of the electronic book with many subscribers are concentrated, the traffic can be reduced in a fixed network. Thus, the communication resources including the radio network and the fixed network can be utilized efficiently.

As described above, according to the embodiment of the present technology, the following configurations (Configuration Examples 1 to 8) can be realized to resolve the above-described problem.

CONFIGURATION EXAMPLE 1

An information processing apparatus includes: a control unit that executes a control process of acquiring a desired content item from an access destination when accessing the desired access destination via a predetermined network and receiving, from a radio communication apparatus, an alternative request for acquiring the desired content item from the access destination; and a transmission control unit that transmits the acquired content item to the radio communication apparatus at a timing at which a predetermined condition is satisfied.

CONFIGURATION EXAMPLE 2

In the information processing apparatus described in Configuration Example 1, when the control unit receives the alternative requests from a plurality of the radio communication apparatuses, the control unit acquires the content items in response to the alternative requests. The transmission control unit transmits the acquired content items to the plurality of radio communication apparatuses at the timing at which the predetermined condition is satisfied.

CONFIGURATION EXAMPLE 3

The information processing apparatus described in Configuration Example 1 further includes an access right setting unit that stores management information used to manage a content item associated with the alternative request and sets an access right of accessing the content item for which the management information is stored in the storage unit in the radio communication apparatus transmitting the alternative request associated with the content item. The transmission control unit transmits the content item for which the management information is stored in the storage unit to the radio communication apparatus in which the access right is set at a timing at which the predetermined condition is satisfied.

CONFIGURATION EXAMPLE 4

In the information processing apparatus described in Configuration Example 3, the control unit does not execute control to acquire the content item when the alternative request for acquiring the content item of which the management information is stored in the storage unit is received. The access right setting unit sets the access right for accessing the content item in the radio communication apparatus transmitting the alternative request when the alternative request for acquiring the content item of which the management information is stored in the storage unit is received.

CONFIGURATION EXAMPLE 5

In the information processing apparatus described in Configuration Example 3 or 4, the access right setting unit deletes the access right of the content item set in the radio communication apparatus, when the content item of which the management information is stored in the storage unit is transmitted to the radio communication apparatus in which the access right is set.

CONFIGURATION EXAMPLE 6

In the information processing apparatus described in Configuration Example 5, the control unit deletes the content item of which all of the access rights set by the access right setting unit are deleted among the content items stored in the content item storage unit storing the acquired content items.

CONFIGURATION EXAMPLE 7

A communication system includes: a radio communication apparatus; and an information processing apparatus. The radio communication apparatus includes an operation receiving unit that receives an access request operation of accessing a desired access destination via a predetermined network and executing an access request for acquiring a desired content item from the access destination at a timing at which a predetermined condition is satisfied, and a control unit that executes a control process of transmitting an alternative request for alternatively acquiring the desired content item when the operation receiving unit receives the access request operation. When the information processing apparatus receives the alternative request from the radio communication apparatus, the information processing apparatus acquires the desired content item from the desired access destination and transmits the acquired content item to the radio communication apparatus at the timing at which a predetermined condition is satisfied.

CONFIGURATION EXAMPLE 8

A method of controlling an information processing apparatus includes: executing control to acquire a desired content item from an access destination when accessing a desired access destination via a predetermined network and receiving an alternative request for acquiring the desired content item from the access destination; and transmitting the acquired content item to the radio communication apparatus at a timing at which a predetermined condition is satisfied.

In the embodiments of the present technology, the integrally configured information processing apparatuses (for example, the content item providing server 120, the network control apparatuses 130 and 602, the communication quality management server 601, and the process standby task alternative servers 810 and 870) have been exemplified. However, the embodiments of the present technology can be applied even to an information processing system in which the respective units of the information processing apparatuses are configured by a plurality of apparatuses. Further, the embodiments of the present technology can be applied to portable radio communication apparatuses (for example, dedicated data communication terminal apparatuses) other than the cellular phones or fixed-type radio communication apparatuses (for example, radio communication apparatuses configured to collect data of automatic vending machines).

The above-described embodiments are just examples for embodying the present technology. A correspondence relationship is established between the specific factors of the embodiments and the specific factors of claims. Likewise, a correspondence relationship is established between the specific factors of claims and factors of the embodiments which are the same names as those of claims. However, the present technology is not limited to the above-described embodiments, but may be modified in various forms of the embodiments within the scope of the present technology without departing from the gist of the present technology.

The processing sequences described in the embodiments may be comprehended as a method having a series of sequences or may be comprehended as a program causing a computer to execute the series of sequences or a recording medium storing the program. Examples of the recording medium include a hard disk, a CD (Compact Disc), an MD (MiniDisc), and a DVD (Digital Versatile Disk). Further, a memory card, a Blue-ray Disc (registered trademark), and the like may be used.

The embodiments of the present technology can be realized as follows.

(1) A radio communication apparatus, comprising:
a receiving unit configured to receive information controlling a timing at which an access request for accessing an access destination over a network is to be executed; and a control unit configured to control execution of the access request with a timing controlled based at least in part on the information.

(2) In the radio communication apparatus described in (1), the information represents a first type of operation requesting that the access request be executed when a network condition is satisfied.

(3) In the radio communication apparatus described in (1) or (2), the network is a wireless network and the network condition is satisfied when a predetermined radio communication quality is available at a location of the radio communication apparatus.

(4) In the radio communication apparatus described in any of (1) to (3), the radio communication apparatus is configured to receive area information regarding an area in which the network condition is satisfied and to display a representation of the area in which the network condition is satisfied based on the area information.

(5) In the radio communication apparatus described in any of (1) to (4), the radio communication apparatus is configured to execute the access request to access a content item.

(6) In the radio communication apparatus described in any of (1) to (3) or (5), the radio communication apparatus is configured to determine whether a size of the content item exceeds a threshold and to set the network condition when the size of the content item exceeds the threshold.

(7) In the radio communication apparatus described in any of (1) to (3), further comprising a process standby task information storage unit configured to store process standby information that includes information regarding the network condition.

(8) In the radio communication apparatus described in any of (1), (2) or (7), the radio communication apparatus is configured to display the process standby information.

(9) In the radio communication apparatus described in any of (1), (2), (7) or (8), the receiving unit is configured to receive a deleting command to delete one or more portions of the process standby information, wherein the process standby task information storage unit is configured to delete the one or more portions of the process standby information in response to receiving the deleting command.

(10) In the radio communication apparatus described in any of (1) to (3) or (7), the radio communication apparatus is configured to display an indication that information representing the first type of operation has been received.

(11) In the radio communication apparatus described in any of (1) to (3), (7) or (10), the radio communication apparatus is configured to receive a notification that the network condition is satisfied from an information processing apparatus when the radio communication apparatus is within an area in which the network condition is satisfied.

(12) In the radio communication apparatus described in any of (1), (2) or (11), the notification includes communication service provider information regarding a communication service provider providing service in the area.

(13) In the radio communication apparatus described in any of (1) to (3), (7), (10) or (13), the network condition is satisfied when a fee for accessing the access destination at a location of the radio communication apparatus is below a threshold.

(14) In the radio communication apparatus described in (1) or (2), the radio communication apparatus is configured to execute the access request to access a content item and to synchronize the content item with a stored content item.

(15) In the radio communication apparatus described in (1), (2) or (14), the radio communication apparatus is configured to execute the access request to access a content item and to display information regarding a size of the content item.

(16) In the radio communication apparatus described in (1), (2), (14) or (15), the radio communication apparatus is configured to calculate and display an expected time for downloading a content item from the access destination.

(17) A control method for a radio communication apparatus, the method comprising:
receiving information controlling a timing at which an access request for accessing an access destination over a network is to be executed; and
controlling execution of the access request with a timing controlled based at least in part on the information.

(18) A computer readable storage apparatus having stored thereon instructions, which, when executed, perform a control method for a radio communication apparatus, the method comprising:
receiving information controlling a timing at which an access request for accessing an access destination over a network is to be executed; and
controlling execution of the access request with a timing controlled based at least in part on the information.

(19) An information processing apparatus, comprising:
a control unit configured to control acquiring a content item from an access destination and to receive, from a radio communication apparatus, a request for acquiring the content item from the access destination at a timing at which a condition is satisfied; and
a transmission control unit configured to control transmitting the content item to the radio communication apparatus at a timing at which the condition is satisfied.

(20) An information processing system, comprising:
a radio communication apparatus, including:
a receiving unit configured to receive information controlling a timing at which an access request for accessing an access destination over a network is to be executed; and
a control unit configured to control execution of the access request with a timing controlled based at least in part on the information, wherein the information processing system further comprises:
an information processing apparatus, including:
a control unit configured to control acquiring a content item from an access destination and to receive, from the radio communication apparatus, a request for acquiring the content item from the access destination at a timing at which a condition is satisfied; and
a transmission control unit configured to control transmitting the content item to the radio communication apparatus at a timing at which the condition is satisfied.

Furthermore, the embodiments of the present technology can be realized as follows.

(1) A radio communication apparatus includes: an operation receiving unit that receives a determination operation of determining a timing at which an access request for accessing a desired access destination via a predetermined network is executed; and a control unit that controls execution of the access request at the determined timing.

(2) In the radio communication apparatus described in (1), the operation receiving unit receives an access request operation of executing the access request. The control unit executes the access request at the determined timing when the operation receiving unit receives the access request operation.

(3) In the radio communication apparatus described in (2), the operation receiving unit receives, as the determination operation, one of a first operation of executing the access request immediately and a second operation of executing the access request at a timing at which a predetermined condition is satisfied. The control unit executes the access request immediately after the reception of the access request operation when the operation receiving unit receives the first operation, whereas the control unit executes the access request at the timing, at which the predetermined condition is satisfied, after the reception of the access request operation when the operation receiving unit receives the second operation.

(4) In the radio communication apparatus described in (3), the timing at which the predetermined condition is satisfied is a timing at which a predetermined radio communication quality is ensured in an area where the radio communication apparatus is located. The control unit determines whether the predetermined radio communication quality is ensured in the area where the radio communication apparatus is located when the operation receiving unit receives the second operation, and then the control unit executes the access request when determining that the predetermined radio communication quality is ensured in the area where the radio communication apparatus is located.

(5) In the radio communication apparatus described in (4), the control unit acquires area information regarding an area where the predetermined radio communication quality is ensured, as the area where the radio communication apparatus is located, and then displays the area where the predetermined radio communication quality is ensured on a display unit based on the acquired area information.

(6) In the radio communication apparatus described in any one of (3) to (5), the access request is an access request for acquiring a desired content item from the desired access destination via the network. Even when the operation receiving unit receives the first operation, the control unit executes the access request at the timing, at which the predetermined condition is satisfied, after the reception of the access request operation in a case where a size of the content item acquired in response to the access request is larger than a predetermined size serving as a reference.

(7) In the radio communication apparatus described in any one of (3) to (6), when the operation receiving unit receives the second operation, the control unit stores process standby information used to execute the access request at the timing, at which the predetermined condition is satisfied, in a storage unit. The control unit executes the access request based on the process standby information stored in the storage unit.

(8) In the radio communication apparatus described in (7), the control unit displays a list of the process standby information stored in the storage unit on a display unit.

(9) In the radio communication apparatus described in (8), the operation receiving unit receives a deletion operation of deleting one piece or plural pieces of process standby information among the list of the process standby information displayed on the display unit. When the operation receiving unit receives the deletion operation, the control unit deletes the process standby information associated with the deletion operation from the storage unit.

(10) In The radio communication apparatus described in any one of (3) to (9), when the operation receiving unit receives the second operation, the control unit displays the fact indicating the execution of the access request at the timing, at which the predetermined condition is satisfied, on the display unit until the control unit executes the access request after the reception of the access request operation.

(11) In the radio communication apparatus described in (3), the timing at which the predetermined condition is satisfied is a timing at which a predetermined radio communication quality is ensured in an area where the radio communication apparatus is located. When the operation receiving unit receives the second operation, the control unit executes the access request when receiving a notification from an information processing apparatus which detects an area where the predetermined radio communication quality is ensured and transmits the notification indicating that the predetermined radio communication quality is ensured in the detected area to the radio communication apparatus located in the detected area.

(12) In the radio communication apparatus described in (11), the information processing apparatus allows communication service provider information regarding a communication service provider associated with the detected area and associated with a base station ensuring the predetermined radio communication quality to be contained in the notification and transmits the notification. When a communication service provider associated with kept contract authentication information is different from the communication service provider associated with the communication service provider information contained in the received notification, the control unit sets contract authentication information associated with the communication service provider information contained in the received notification and executes the access request after the setting.

(13) In the radio communication apparatus described in (3), the timing at which the predetermined condition is satisfied is a timing at which a predetermined radio communication fee is charged in an area where the radio communication apparatus is located. The control unit determines whether the area where the radio communication apparatus is located is the area where the predetermined radio communication fee is charged when the operation receiving unit receives the second operation, and then the control unit executes the access request when determining that the area where the radio communication apparatus is located is the area where the predetermined radio communication fee is charged.

(14) The radio communication apparatus described in (1), further includes a storage unit that stores a content item. The access request is an access request for accessing the desired access destination and synchronizing a content item of the access destination with the content item stored in the storage unit. The operation receiving unit receives, as the determination operation, one of a first operation of executing the access request at a synchronization setting time and a second operation of executing the access request at a timing at which a predetermined condition is satisfied. The control unit executes the access request at the synchronization setting time when the operation receiving unit receives the first operation, whereas the control unit executes the access request at the timing at which the predetermined condition is satisfied after the synchronization setting time elapses when the operation receiving unit receives the second operation.

(15) In the radio communication apparatus described in any one of (1) to (14), the control unit sets a fee plan regarding communication associated with the access request based on the determined timing.

(16) In the radio communication apparatus described in any one of (3) to (13), the control unit acquires size information regarding a size of the content item from the desired access destination via the network and displays the size of the content item on a display unit. The operation receiving unit receives the first operation or the second operation after the control unit displays the size of the content item.

(17) In the radio communication apparatus described in any one of (3) to (13), the control unit calculates an expected value of a communication rate of the area where the radio communication apparatus is located via the network, acquires size information regarding a size of the content item from the desired access destination via the network, calculates an expected time necessary for downloading the content item based on the size information and the calculated expected value of the communication rate, and displays the calculated expected time on the display unit. The operation receiving unit receives the first operation or the second operation after the control unit displays the calculated expected time.

(18) An information processing apparatus includes: a control unit that executes a control process of acquiring a desired content item from an access destination when accessing the desired access destination via a predetermined network and receiving, from a radio communication apparatus, an alternative request for acquiring the desired content item from the access destination, and a transmission control unit that transmits the acquired content item to the radio communication apparatus at a timing at which a predetermined condition is satisfied.

(19) In the information processing apparatus described in (18), when the control unit receives the alternative requests from a plurality of the radio communication apparatuses, the control unit acquires the content items in response to each alternative request. The transmission control unit transmits the acquired content items to the plurality of radio communication apparatuses at the timing at which the predetermined condition is satisfied.

(20) A control method of a radio communication apparatus includes: receiving a determination operation of determining a timing at which an access request for accessing a desired access destination via a predetermined network is executed; and controlling execution of the access request at the determined timing.

The embodiments of the present technology can be realized as follows.

(21) In the radio communication apparatus described in any one of (3) to (10), a timing at which the predetermined condition is satisfied is a timing at which the area where the radio communication apparatus is located has a predetermined radio communication quality. The control unit changes the predetermined radio communication quality based on at least one of a kind of application, a size of the content item, and a remaining amount of battery capacity.

The present disclosure contains subject matter related to that disclosed in Japanese Priority Patent Application JP 2011-117582 filed in the Japan Patent Office on May 26, 2011 and Japanese Priority Patent Application JP 2012-001776 filed in the Japan Patent Office on Jan. 10, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A radio communication apparatus, comprising:
circuitry configured to:
receive area information regarding an area in which a radio communication quality exceeds a threshold;
display a representation of the area in which the radio communication quality exceeds the threshold based on the area information;
and
control execution of an access request for accessing an access destination over a network with a timing controlled based on a condition allowing execution of the access request for access to content only in areas where the radio communication quality exceeds the threshold.

2. The radio communication apparatus of claim 1, wherein the radio communication apparatus is configured to execute the access request to access a content item.

3. The radio communication apparatus of claim 1, wherein the radio communication apparatus is configured to execute the access request to synchronize a content item via the network.

4. The radio communication apparatus of claim 3, wherein synchronizing the content item via the network comprises synchronizing a content item stored in the radio communication apparatus with a content item stored in a second apparatus.

5. The radio communication apparatus of claim 1, wherein the timing is a timing at which the radio communication apparatus arrives in an area with a predetermined radio communication quality.

6. The radio communication apparatus of claim 1, further comprising controlling execution of the access request based at least in part on a size of a content item.

7. The radio communication apparatus of claim 1, wherein the received information comprises radio communication quality information for the network, position information for the radio communication apparatus, or both.

8. The radio communication apparatus of claim 1, wherein the received information comprises area information regarding an area in which the radio communication quality exceeds a threshold.

9. The radio communication apparatus of claim 1, wherein the radio communication apparatus is configured to receive a notification from an information processing device when the radio communication apparatus is within an area in which the radio communication quality exceeds the threshold.

10. The radio communication apparatus of claim 9, wherein the notification includes communication service provider information regarding a communication service provider providing service in an area.

11. The radio communication apparatus of claim 1, wherein the radio communication apparatus comprises a movable data communication apparatus having a radio communication function.

12. A computer readable storage device having stored thereon instructions, which, when executed, perform a control method for a radio communication apparatus, the method comprising:
receiving area information regarding an area in which a radio communication quality exceeds a threshold;
display a representation of the area in which the radio communication quality exceeds the threshold based on the area information;
and
controlling execution of an access request for accessing an access destination over a network with a timing controlled based on a condition allowing execution of the access request for access to content only in areas where the radio communication quality exceeds the threshold.

13. The computer readable storage device of claim 12, wherein the timing is a timing at which the radio communication apparatus arrives in an area with a predetermined radio communication quality.

14. The computer readable storage device of claim 12, the method comprising executing the access request to synchronize a content item stored in the radio communication apparatus with a content item stored in a second apparatus.

15. The computer readable storage device of claim 12, wherein the received information comprises radio communication quality information for the network, position information for the radio communication apparatus, or both.

16. The radio communication apparatus of claim 1, wherein the circuitry is configured to:
 receive information controlling execution of the access request based on the condition allowing execution of the access request for access to content only in areas where the radio communication quality exceeds the threshold; and
 display, in response to the received information, the representation of the area in which the radio communication quality exceeds the threshold based on the area information.

17. The radio communication apparatus of claim 1, wherein the circuitry is configured to, absent receiving information controlling execution of the access request based on the condition, control execution of the access request such that the access request is not restricted to executing only in areas where the radio communication quality exceeds the threshold.

18. The computer readable storage device of claim 12, the method comprising:
 receiving information controlling execution of the access request based on the condition allowing execution of the access request for access to content only in areas where the radio communication quality exceeds the threshold; and
 displaying, in response to the received information, the representation of the area in which the radio communication quality exceeds the threshold based on the area information.

19. The computer readable storage device of claim 12, wherein controlling execution comprises, absent receiving information controlling execution of the access request based on the condition, controlling execution of the access request such that the access request is not restricted to executing in areas where the radio communication quality exceeds the threshold.

20. A radio communication method, comprising:
 receiving area information regarding an area in which a radio communication quality exceeds a threshold;
 displaying a representation of the area in which the radio communication quality exceeds the threshold based on the area information; and
 controlling execution of an access request for accessing an access destination over a network with a timing controlled based on a condition allowing execution of the access request for access to content only in areas where the radio communication quality exceeds the threshold.

* * * * *